(12) United States Patent
Bennett et al.

(10) Patent No.: US 11,194,107 B2
(45) Date of Patent: Dec. 7, 2021

(54) HIGH-DENSITY FAUS AND OPTICAL INTERCONNECTION DEVICES EMPLOYING SMALL DIAMETER LOW ATTENUATION OPTICAL FIBER

(71) Applicant: CORNING INCORPORATED, Corning, NY (US)

(72) Inventors: Kevin Wallace Bennett, Hammondsport, NY (US); Scott Robertson Bickham, Corning, NY (US); Ximao Feng, San Mateo, CA (US); Wen-Lung Kuang, Taoyuan (TW); Pushkar Tandon, Painted Post, NY (US); Ruchi Tandon, Painted Post, NY (US); Shudong Xiao, Fremont, CA (US); Bryan William Wakefield, Lindley, NY (US); Andy Fenglei Zhou, Fremont, CA (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 16/993,810

(22) Filed: Aug. 14, 2020

(65) Prior Publication Data

US 2021/0055490 A1 Feb. 25, 2021

Related U.S. Application Data

(60) Provisional application No. 62/889,531, filed on Aug. 20, 2019.

(51) Int. Cl.
*G02B 6/02* (2006.01)
*G02B 6/028* (2006.01)
(Continued)

(52) U.S. Cl.
CPC .......... *G02B 6/43* (2013.01); *G02B 6/02004* (2013.01); *G02B 6/03694* (2013.01);
(Continued)

(58) Field of Classification Search
CPC .............. G02B 6/02004; G02B 6/0281; G02B 6/0365; G02B 6/03694; G02B 6/3636;
(Continued)

(56) References Cited

U.S. PATENT DOCUMENTS

| 4,474,830 A | 10/1984 | Taylor |
| 4,585,165 A | 4/1986 | Iversen |

(Continued)

FOREIGN PATENT DOCUMENTS

| CN | 107272111 A | 10/2017 |
| WO | 2017/003982 A2 | 1/2017 |

(Continued)

OTHER PUBLICATIONS

Baldauf et al.; "Relationship of Mechanical Characteristics of Dual Coated Single Mode Optical Fibers and Microbending Loss"; IEICE Transactions on Communications, vol. E76-B, No. 4; pp. 352-357; (1993.

(Continued)

*Primary Examiner* — Ryan A Lepisto
(74) *Attorney, Agent, or Firm* — Grant A. Gildehaus

(57) ABSTRACT

The high-density FAU comprises a support substrate having a grooved front-end section that supports glass end sections of the small diameter low-attenuation optical fibers. A cover is disposed on the front-end section and secured thereto to hold the glass end sections in place. The substrate and the cover can be made of the same glass or glasses having about the same CTE. The glass end sections have a diameter d4 so that the pitch P2 of the fibers at the front end of the FAU can be equal to or greater than d4, wherein $d4=2r_4$, with $r_4$ being (Continued)

the radius of the glass end section as defined by the optical fiber cladding. The glass end section has a radius $r_4$ less than 45 microns, allowing for a high-density FAU and a high-density optical interconnection device.

26 Claims, 18 Drawing Sheets

(51) Int. Cl.

| | |
|---|---|
| *G02B 6/036* | (2006.01) |
| *G02B 6/38* | (2006.01) |
| *G02B 6/40* | (2006.01) |
| *G02B 6/42* | (2006.01) |
| *G02B 6/43* | (2006.01) |
| *G02B 6/44* | (2006.01) |
| *H04B 10/80* | (2013.01) |
| *G02B 6/36* | (2006.01) |

(52) U.S. Cl.
CPC ............ *G02B 6/368* (2013.01); *G02B 6/3636* (2013.01); *H04B 10/801* (2013.01); *G02B 6/0281* (2013.01); *G02B 6/0365* (2013.01); *G02B 6/3839* (2013.01); *G02B 6/3861* (2013.01); *G02B 6/403* (2013.01); *G02B 6/4202* (2013.01); *G02B 6/423* (2013.01); *G02B 6/4403* (2013.01)

(58) Field of Classification Search
CPC .... G02B 6/368; G02B 6/3839; G02B 6/3861; G02B 6/403; G02B 6/4202; G02B 6/423; G02B 6/4249; G02B 6/43; G02B 6/4403
See application file for complete search history.

(56) References Cited

U.S. PATENT DOCUMENTS

| | | | |
|---|---|---|---|
| 4,609,718 A | 9/1986 | Bishop et al. | |
| 4,629,287 A | 12/1986 | Bishop | |
| 4,798,852 A | 1/1989 | Zimmerman et al. | |
| 4,962,992 A | 10/1990 | Chapin et al. | |
| 5,104,433 A | 4/1992 | Chapin et al. | |
| 5,410,567 A | 4/1995 | Brundage et al. | |
| 6,027,062 A | 2/2000 | Bacon et al. | |
| 6,045,269 A * | 4/2000 | Watanabe | G02B 6/3839 385/59 |
| 6,288,835 B1 | 9/2001 | Nilsson et al. | |
| 6,316,516 B1 | 11/2001 | Chien et al. | |
| 6,326,416 B1 | 12/2001 | Chien et al. | |
| 6,539,152 B1 | 3/2003 | Fewkes et al. | |
| 6,563,996 B1 | 5/2003 | Winningham | |
| 6,757,471 B2 * | 6/2004 | Jeong | G02B 6/30 385/137 |
| 6,795,634 B2 * | 9/2004 | Jeong | G02B 6/3636 385/137 |
| 6,882,790 B2 * | 4/2005 | Niiyama | G02B 6/30 385/137 |
| 7,373,053 B2 * | 5/2008 | Takahashi | G02B 6/368 385/137 |
| 7,536,076 B2 | 5/2009 | Khrapko et al. | |
| 7,565,820 B2 | 7/2009 | Foster et al. | |
| 7,620,282 B2 * | 11/2009 | Bickham | G02B 6/0365 385/124 |
| 7,805,039 B2 | 9/2010 | Sanders et al. | |
| 7,832,675 B2 | 11/2010 | Bumgarner et al. | |
| 7,876,994 B2 * | 1/2011 | Hiroi | G02B 6/3636 385/137 |
| 8,428,411 B2 * | 4/2013 | de Montmorillon | G02B 6/0365 385/124 |
| 9,057,817 B2 * | 6/2015 | Bookbinder | C08F 222/1025 |
| 9,097,834 B2 | 8/2015 | Hirano et al. | |
| 9,139,466 B2 | 9/2015 | Hirano et al. | |
| 9,389,382 B2 | 7/2016 | Blazer et al. | |
| 9,512,033 B2 | 12/2016 | Hirano et al. | |
| 9,709,750 B1 * | 7/2017 | Kuang | G02B 6/3652 |
| 9,841,558 B2 * | 12/2017 | Tanaka | C03C 25/1065 |
| 10,048,455 B2 * | 8/2018 | Pfnuer | G02B 6/4243 |
| 10,718,908 B2 * | 7/2020 | Yang | G02B 6/3636 |
| 10,816,743 B2 * | 10/2020 | Bickham | G02B 6/4243 |
| 10,942,316 B1 * | 3/2021 | Feng | G02B 6/3809 |
| 11,054,573 B2 * | 7/2021 | Bickham | G02B 6/0281 |
| 2002/0076189 A1 * | 6/2002 | McMullin | G02B 6/3822 385/137 |
| 2002/0159731 A1 | 10/2002 | Gruner-Nielsen et al. | |
| 2003/0077059 A1 | 4/2003 | Chien et al. | |
| 2003/0118307 A1 | 6/2003 | Gruner-Nielsen et al. | |
| 2003/0123839 A1 | 7/2003 | Chou et al. | |
| 2003/0156814 A1 * | 8/2003 | Yoon | G02B 6/3652 385/137 |
| 2004/0005127 A1 | 1/2004 | Kliner et al. | |
| 2007/0077016 A1 | 4/2007 | Bickham et al. | |
| 2008/0310805 A1 * | 12/2008 | Sugizaki | G02B 6/4436 385/115 |
| 2010/0082138 A1 | 4/2010 | Hayes et al. | |
| 2011/0188822 A1 | 8/2011 | Konstadinidis et al. | |
| 2014/0294355 A1 | 10/2014 | Bickham et al. | |
| 2014/0370287 A1 | 12/2014 | Tamura et al. | |
| 2015/0277031 A1 * | 10/2015 | Bookbinder | C03C 25/285 385/115 |
| 2015/0315061 A1 | 11/2015 | Hoover et al. | |
| 2016/0231503 A1 | 8/2016 | Sillard et al. | |
| 2017/0242187 A1 | 8/2017 | Iwaguchi et al. | |
| 2018/0127593 A1 | 5/2018 | Chen et al. | |
| 2018/0128970 A1 | 5/2018 | Homma et al. | |
| 2019/0033515 A1 | 1/2019 | Sillard et al. | |
| 2019/0170934 A1 | 6/2019 | Pastouret et al. | |
| 2019/0331848 A1 * | 10/2019 | Bennett | G02B 6/0365 |
| 2019/0331849 A1 * | 10/2019 | Bennett | G02B 6/02009 |
| 2019/0331850 A1 * | 10/2019 | Bennett | G02B 6/02395 |
| 2020/0064546 A1 | 2/2020 | Chien et al. | |
| 2020/0224037 A1 | 7/2020 | Chen et al. | |
| 2020/0271858 A1 * | 8/2020 | Bickham | G02B 6/0365 |
| 2021/0231896 A1 * | 7/2021 | Bickham | G02B 6/02395 |

FOREIGN PATENT DOCUMENTS

| | | |
|---|---|---|
| WO | 2018/089290 A1 | 5/2018 |
| WO | 2020/069053 A1 | 4/2020 |
| WO | 2020/150037 A1 | 7/2020 |
| WO | 2020/171942 A1 | 8/2020 |
| WO | 2020/171943 A1 | 8/2020 |

OTHER PUBLICATIONS

Bennett et al.; "Small Diameter Low Attenuation Optical Fiber"; Filed as U.S. Appl. No. 16/391,859 on Apr. 23, 2019; 66 Pages—Listed in ID as D28911.

Bickham et al.; "Small Diameter Fiber Optic Cables Having Low-Friction Cable Jackets and Optical Fibers With Reduced Cladding and Coating Diameters" Filed as U.S. Appl. No. 62/738,174 on Sep. 28, 2018; 69 Pages—Listed in ID as ID29091.

Olshansky; "Distortion Losses in Cabled Optical Fibers," Applied Optics vol. 14, p. 20 Jan. 1975.

* cited by examiner

HIGH-DENSITY FAUS AND OPTICAL INTERCONNECTION DEVICES EMPLOYING SMALL DIAMETER LOW ATTENUATION OPTICAL FIBER

PRIORITY APPLICATION

This application claims the benefit of priority of U.S. Provisional Application No. 62/889,531, filed on Aug. 20, 2019, the content of which is relied upon and incorporated herein by reference in its entirety.

FIELD OF INVENTION

The present disclosure relates generally to optical fibers. More particularly, this disclosure relates to high-density fiber array units (FAUs) and optical interconnection devices employing small diameter low attenuation optical fibers having a refractive index profile with a depressed-index cladding region, a low modulus primary coating, and a high modulus secondary coating.

TECHNICAL BACKGROUND

Optical fibers ("fibers") with small cladding and coating diameters are attractive for reducing the size of cables, decreasing cable cost, and increasing the bandwidth density of optical interconnects. It is also desirable to use thinner layers as primary and/or secondary coatings in reduced-cladding diameter fibers. However, the smaller cladding diameter increases the microbending sensitivity, and thinner primary and coating diameter further compromise the microbend performance as well as the protective function of the coatings. As a result, commercially available reduced-cladding diameter fibers tend to have small mode field diameters, high numerical apertures and/or high cutoff wavelengths to reduce bend sensitivity at long wavelengths above 1530 nm.

Single-mode optical fibers having a reduced cladding and coating diameters, low attenuation, low bend losses, a G.657-compliant mode field diameter and a low cutoff wavelength have been proposed in U.S. Provisional Patent Application No. 62/726,664, entitled "small diameter low attenuation optical fiber," filed on Sep. 4, 2018, and which is incorporated by reference herein.

Fiber support devices and fiber interconnection devices that employ such fibers are therefore needed so that the fibers can be effectively used in optical telecommunications and optical device applications.

SUMMARY

The present disclosure discloses an FAU that operably supports small diameter low-attenuation fibers. The FAU comprises a support substrate having a substrate central axis, a first-end (front-end) section with a substantially planar first top surface (first surface) and a front end (first end) and a back-end (second-end) section with a back (second) end and a substantially planar second top surface (second surface) that is substantially parallel to the substantially planar first top surface. At least a portion of the substantially planar first top surface includes substantially parallel grooves that run substantially in the direction of the substrate central axis. A plurality of the fibers is supported by the support substrate, with each fiber having a glass end section with a diameter d4 and residing within one of the grooves of the front-end section. The fibers define a fiber pitch P2≥d4 at the front end of the front-end section. The FAU includes a cover disposed on the front-end section and the glass end sections of the fibers. The cover and the support substrate can be made of glass, and in an example can be made of the same glass or different glasses having substantially the same coefficients of thermal expansion (CTE). An example glass for the cover and substrate is silica glass. A bonding agent is operably disposed to bond the fibers and the cover to the support substrate.

A connector housing can at least partially surround the FAU to define a high-density optical interconnection device, i.e., a high-density optical fiber connector. The FAU can be optically coupled to a photonic device having optical waveguides to establish optical communication between the fibers of the FAU and the optical waveguides of the photonic device.

In an embodiment, the FAU comprises: a) a support substrate made of glass and having a first-end section with grooves formed therein and a first end, and a second-end section adjacent the first-end section; b) a plurality of fibers supported by the support substrate, with each fiber having a coated section supported by the second-end section of the support substrate and a glass end section of diameter d4≤90 microns residing within one of the grooves of the first-end section to define a fiber pitch P2≥d4 at the first end of the first-end section; c) a cover made of glass and disposed on the first-end section and the glass end sections of the fibers; and d) a bonding agent operably disposed to bond the plurality of the fibers and the cover to the support substrate; wherein each fiber has a core, a cladding immediately surrounding the core, said cladding defining the diameter d4, a primary coating immediately surrounding the cladding and having an elastic modulus $E_P$, a secondary coating immediately surrounding the primary coating and having an elastic modulus $E_S > E_P$. In an example, the cover and support substrate are made of glass, such as silica.

In an example of the FAUs disclosed herein, the fibers have an outer cladding diameter of 90 microns or less (e.g., or 85 microns or less, or 70 microns or less) and possess large mode field diameters without experiencing significant bending-induced signal degradation. The coated fiber may comprise an internal glass region (glass cladding) having an outer radius not greater than 45 microns (for example not greater than 42 microns, or not greater than 35 microns, or not greater than 34 microns, or not greater than 32.5 microns) which is surrounded by primary and secondary coatings. Representative fibers may include, in concentric order, a glass core, a glass cladding, a primary coating surrounding the glass cladding, and a secondary coating surrounding the primary coating. The glass cladding may include a first inner cladding region and a second inner cladding region. The first inner cladding region may have an outer radius not greater than 16 microns, or not greater than 14 microns, or not greater than 12 microns, or not greater than 10 microns, or not greater than 8 microns. The fiber core has a higher refractive index than the maximum refractive index of the first inner cladding region. The fiber core also has a higher refractive index than the maximum refractive index of the outer cladding region. The second inner cladding regions may have a lower refractive index than the first inner cladding region. The second inner cladding regions may have a lower refractive index than the outer cladding region. The primary coating may be formed from a low modulus material and the secondary coating may be formed from a high modulus material.

According to some embodiments the fibers can comprise:
a) a core having an outer radius $r_1$;
b) a cladding surrounding said core and having an outer radius $r_4$, wherein $r_4$ is less than 45 microns and wherein $d4 = 2r_4$;
c) a primary coating surrounding said cladding and having an outer radius $r_5$ and a thickness $tP > 10$ microns, an in situ modulus $E_P$, wherein $E_P \leq 0.35$ MPa, and a spring constant $\chi_P \leq 1.6$ MPa, where $\chi_P = 2E_P \cdot r_4/tP$;
d) a secondary coating surrounding said primary coating and having an outer radius $r_6$ and a thickness $tS = r_6 - r_5$, and an in situ modulus of 1200 MPa or greater, wherein $tS > 10$ microns and said outer radius $r_6 \leq 85$ microns;
e) a mode field diameter MFD greater than 8.2 microns at 1310 nm;
f) a fiber cutoff wavelength of less than 1310 nm; and
g) a bend loss, when wrapped around a mandrel having a diameter of 10 mm, of less than 1.0 dB/turn at a wavelength of 1550 nm.

According to some embodiments the fiber has the mode field diameter MFD $\leq 9.5$ microns at a wavelength of 1310 nm, for example MFD $\leq 9.2$ microns, or MFD $\leq 9.0$ microns. According to some embodiments the fiber has the mode field diameter MFD $\geq 8.4$ microns at a wavelength of 1310 nm, for example MFD $\leq 9.2$ microns, or MFD $\leq 9.0$ microns.

According to some embodiments the cladding includes a first inner cladding region having an outer radius $r_2$, and a second inner cladding region surrounding said first inner cladding region and having an outer radius $r_3$, said second inner cladding region having a relative refractive index $\Delta_3$ with a minimum value $\Delta_{3MIN}$, wherein $\Delta_{3MIN} < -0.2\%$.

According to some embodiments $tS > 10$ microns. According to some embodiments, $r_4$ is less than 45 microns. According to some embodiments, $r_4$ is not greater than 42 microns, or not greater than 40 microns, or not greater than 35 microns, or not greater than 32.5 microns, or not greater than 30 microns. According to some embodiments, 25 microns $\leq r_4 \leq 45$ microns, or 30 microns $\leq r_4 \leq 42$ microns, or 35 microns $\leq r_4 \leq 42$ microns, or 38 microns $\leq r_4 \leq 42$ microns, or 25 microns $\leq r_4 \leq 35$ microns. According to some embodiments, $r_6 \leq 80$ microns. According to some embodiments, 75 microns $\leq r_6 \leq 85$ microns. According to some embodiments, 39 microns $\leq r_4 \leq 41$ microns and 75 microns $\leq r_6 \leq 85$ microns. According to some embodiments, 30 microns $\leq r_4 \leq 35$ microns and 60 microns $\leq r_6 \leq 70$ microns.

According to some embodiments $0.5 \leq tP/tS \leq 1.5$.

According to some embodiments, $\chi_P < 1.3$ MPa., or $\chi_P \leq 1$ MPa, or $\chi_P \leq 0.9$ MPa, or $\chi_P \leq 0.8$ MPa. According to some embodiments, 0.5 MPa $\leq \chi_P \leq 1.3$ MPa. According to some embodiments, 0.5 MPa $\leq \chi_P \leq 1.1$ MPa. According to some embodiments, 0.5 MPa $\leq \chi_P \leq 1$ MPa. According to some embodiments, 0.5 MPa $\leq \chi_P \leq 0.9$ MPa.

According to some embodiments, the cladding includes a first inner cladding region having an inner radius $r_1$, an outer radius $r_2$ and an outer cladding region surrounding the first inner cladding region and having the outer radius $r_4$, the inner cladding region having a relative refractive index $\Delta_2$ with a minimum value $\Delta_{2MIN}$, and a maximum value $\Delta_{2MAX}$ wherein $\Delta_{2MAX} < 0.1\%$ and $\Delta_{2MIN} > -0.1\%$. According to some embodiments, $\Delta_{2MAX} < 0.05\%$ and $\Delta_{2MIN} > -0.05\%$. According to some embodiments the refractive index $\Delta_2$ is substantially constant between the inner radius $r_1$ and the outer radius $r_2$. According to some embodiments, $r_2 > 8$ microns. According to other embodiments, $r_2 > 9$ microns, or $r_2 > 10$ microns. According to some embodiments, $r_2 < 12$ microns. According to other embodiments, $r_2 < 11$ microns, or $r_2 < 10$ microns, or 8 microns $< r_2 < 12$ microns, or 9 microns $< r_2 < 11$ microns.

According to some embodiments, the cladding includes a second inner cladding region surrounding the first inner cladding region and having an outer radius $r_3$, the second inner cladding region having a relative refractive index $\Delta_3$ with a minimum value $\Delta_{3MIN}$, and a maximum value $\Delta_{3MAX}$ wherein $\Delta_{3MAX} < -0.2\%$ and $\Delta_{3MIN} > -0.7\%$. According to some embodiments, $\Delta_{3MAX} < -0.25\%$ and $\Delta_{3MIN} > -0.6\%$. According to other embodiments, $\Delta_{3MAX} < -0.3\%$ and $\Delta_{3MIN} > -0.5\%$. According to some embodiments the second inner cladding region is directly adjacent to the first inner cladding region and has an inner radius $r_2$. According to some embodiments, $r_3 < 20$ microns. According to other embodiments, $r_3 < 18$ microns, or $r_3 < 16$ microns or $r_3 < 15$ microns.

According to some embodiments the fiber exhibits a bend loss at a wavelength of 1550 nm, when turned about a mandrel having a diameter of 10 mm, of less than 1.0 dB/turn. According to other embodiments the fiber exhibits a bend loss at a wavelength of 1550 nm when turned about a mandrel having a diameter of 10 mm less than 0.5 dB/turn, or less than 0.3 dB/turn or even less than 0.2 dB/turn.

According to some embodiments the fiber exhibits a mode field diameter at a wavelength of 1310 nm greater than 8.2 microns. According to other embodiments the fiber exhibits a mode field diameter at a wavelength of 1310 nm greater than 8.4 microns, or greater than 8.6 microns. According to some embodiments the fiber exhibits a mode field diameter at a wavelength of 1310 nm less than 9.5 microns. According to other embodiments the fiber exhibits a mode field diameter at a wavelength of 1310 nm less than 9.2 microns, or less than 9.0 microns.

According to some embodiments the fiber exhibits a fiber cutoff wavelength less than 1310 nm. According to other embodiments the fiber exhibits a fiber cutoff wavelength less than 1300 nm, or less than 1280 nm. According to some embodiments the fiber exhibits a fiber cutoff wavelength greater than 1150 nm. According to other embodiments the fiber exhibits a fiber cutoff wavelength greater than 1200 nm, or greater than 1220 nm.

According to some embodiments the fiber exhibits an attenuation at 1550 nm less than 1.0 dB/km. According to other embodiments the fiber exhibits an attenuation at 1550 nm less than 0.7 dB/km, or less than 0.5 dB/km, or less than 0.4 dB/km, or less than 0.3 dB/km or even less than 0.25 dB/km. According to some embodiments the fiber exhibits an attenuation at 1600 nm less than 1.0 dB/km. According to other embodiments the fiber exhibits an attenuation at 1600 nm less than 0.7 dB/km, or less than 0.5 dB/km, or less than 0.4 dB/km, or less than 0.3 dB/km or even less than 0.25 dB/km.

According to some embodiments, the primary coating has an in situ modulus $E_P$ of 0.3 MPa or less. According to some embodiments, the secondary coating has an in situ modulus $E_S$ of 1800 MPa or greater.

The core may include silica glass or a silica-based glass. Silica-based glass may be silica glass modified with an alkali metal (e.g. Na, K), an alkaline earth metal (e.g. Mg, Ca), a column III element (e.g. B), or a column V element (e.g. P); or a dopant. The refractive index across the core may be constant or variable. The core refractive index may be at a maximum at or near the center of the core and continuously decreases in the direction of the outer core boundary. The core may include an updopant, for example, germania ($GeO_2$). The core refractive index profile may be or may approximate a Gaussian profile, may be an α profile, may be a step index profile, or may be a rounded step-index profile.

The cladding may include silica glass or a silica-based glass. The silica-based glass may be silica glass modified with an alkali metal (e.g. Na, K), an alkaline earth metal (e.g. Mg, Ca), a halogen (e.g. F, Cl), or other dopants (e.g. B, P, Al, Ti).

According to some embodiments, the cladding may include an inner cladding region and an outer cladding region, where the inner cladding region may have a lower refractive index than the outer cladding region. The inner cladding region may have a constant or continuously varying refractive index. The cladding may include a region that forms a reduced index trench in the index profile of the coated fiber. The outer cladding region may have a substantially constant refractive index.

The cladding may include a first inner cladding region adjacent the core and a second cladding region disposed between the first inner cladding region and the outer cladding region. The refractive index of the second inner cladding region may be lower than the refractive index of the first inner cladding region. The refractive index of the second inner cladding region may be lower than the refractive index of the outer cladding region. The refractive index of the second inner cladding region may be lower than the refractive indices of the first inner cladding region and the outer cladding region. The refractive index of the second inner cladding region may form a trench in the index profile of the coated fiber. The trench is a region of depressed refractive index relative to the outer cladding region.

The refractive index profiles of the core and cladding may be achieved through control of a spatial distribution of updopants and/or downdopants in silica or silica-based glass. The core may be updoped substantially with $GeO_2$, resulting in a refractive index delta (due to Ge) relative to pure silica given by the following equation $Delta_{Ge}\% = 0.0601 * $wt. % of $GeO_2$. The second inner cladding region may be downdoped substantially with Fluorine (F), resulting in a refractive index delta (due to F), relative to pure silica, given by the following equation:

$$Delta_F\% = -0.3053 * \text{wt. \% of F}.$$

The primary coating may be formed from a curable composition that includes an oligomer and a monomer. The oligomer may be a urethane acrylate or a urethane acrylate with acrylate substitutions. The urethane acrylate with acrylate substitutions may be a urethane methacrylate. The oligomer may include urethane groups. The oligomer may be a urethane acrylate that includes one or more urethane groups. The oligomer may be a urethane acrylate with acrylate substitutions that includes one or more urethane groups. Urethane groups may be formed as a reaction product of an isocyanate group and an alcohol group.

The primary coating may have an in situ modulus of elasticity (also referred to herein as elastic modulus) $E_P$ of 0.35 MPa or less, or 0.3 MPa or less, or 0.25 MPa or less, or 0.20 MPa or less, or 0.19 MPa or less, or 0.18 MPa or less, or 0.17 MPa or less, or 0.16 MPa or less, or 0.15 MPa or less. The glass transition temperature of the primary coating may be −15° C. or less, or −25° C. or less, or −30° C. or less, or −40° C. or less. The glass transition temperature of the primary coating may be greater than −60° C., or greater than −50° C., or greater than −40° C. The glass transition temperature of the primary coating may be or between −60° C. and −15° C., or between −60° C. and −30° C., or between −60° C. and −40° C., or between −50° C. and −15° C., or between −50° C. and −30° C., or between −50° C. and −40° C.

The secondary coating may be formed from a curable secondary composition that includes one or more monomers. The one or more monomers may include bisphenol-A diacrylate, or a substituted bisphenol-A diacrylate, or an alkoxylated bisphenol-A diacrylate. The alkoxylated bisphenol-A diacrylate may be an ethoxylated bisphenol-A diacrylate. The curable secondary composition may further include an oligomer. The oligomer may be a urethane acrylate or a urethane acrylate with acrylate substitutions. The secondary composition may be free of urethane groups, urethane acrylate compounds, urethane oligomers or urethane acrylate oligomers.

The secondary coating may be a material with a higher modulus of elasticity and higher glass transition temperature than the primary coating. The in situ modulus of elasticity $E_S$ of the secondary coating may be 1200 MPa or greater, and preferably 1300 MPa or greater, or 1500 MPa or greater, or 1800 MPa or greater, or 2100 MPa or greater, or 2400 MPa or greater, or 2700 MPa or greater. The secondary coating may have an in situ modulus between about 1500 MPa and 10,000 MPa, or between 1500 MPa and 5000 MPa. The in situ glass transition temperature of the secondary coating may be at least 50° C., or at least 55° C., or at least 60° C. or between 55° C. and 65° C.

The radius of the coated fiber may coincide with the outer diameter of the secondary coating. The radius of the coated fiber may be 85 microns or less, or 80 microns or less, or 75 microns or less. In some embodiments the radius of the coated fiber may be between 75 and 85 microns. In some embodiments the radius of the coated fiber may be between 55 and 75 microns. In other embodiments the radius of the coated fiber may be between 60 and 70 microns.

The radius of the coated fiber may coincide with the outer diameter of a tertiary coating that may comprise a UV-curable ink. The radius of the coated fiber may be 85 microns or less, or 80 microns or less, or 75 microns or less. In some embodiments the radius of the coated fiber may be between 75 and 85 microns. In other embodiments the radius of the coated fiber may be between 60 and 75 microns. In other embodiments the radius of the coated fiber may be between 60 and 65 microns.

Within the coated fiber, the glass radius (coinciding with the outer diameter of the cladding) may be less than 45 microns, or less than 42 microns, or less than 40 microns, or not greater than 38 microns. In some embodiments the glass radius (or the outer radius of the outer cladding) of the fiber may be at least 24 microns, and in some embodiments at least 30 microns. In some embodiments the glass radius (or the outer radius of the outer cladding) of the fiber may be between 24 microns and 35 microns, or between 27 microns and 35 microns, or between 30 microns and 35 microns or between 24 and 26 microns. The glass may be surrounded by the primary coating. According to some embodiments the primary coating has a thickness tP greater than 12 microns, or greater than 15 microns, or greater than 20 microns, for example 15 microns ≤tP≤35 microns, 15 microns ≤tP≤30 microns, or 20 microns ≤tP≤30 microns, 20 microns ≤tP≤35 microns, or 25 microns ≤tP≤35 microns. The balance of the coated fiber diameter may be provided by the secondary coating or by the combination of the secondary and the (optional) tertiary coating. According to some exemplary embodiments the secondary coating has thickness tS greater than 10 microns, or greater than 12 microns, or greater than 15 microns, for example 10 microns to 15 microns, 10 microns to 20 microns, 12 microns to 20 microns, or 15 microns to 25 microns. In some embodiments an optional tertiary coating is situated over the secondary coating, and in such embodiments the outer radius of the coated fiber is the outer radius of the tertiary coating. In some embodiments the tertiary coating has a thickness tT of 5 microns or less (e.g., 2 to 5 microns or 3 to 4 microns). According to at least some embodiments, the ratio tP/(tS+tT) is preferably 0.5<tP/(tS+tT)<1.5.

Coated fibers in accordance with the present disclosure may be reduced diameter fibers that exhibit low attenuation and low bending losses while providing a mode field diameter that minimizes losses associated with splicing and connecting to standard single-mode fibers. The mode field diameter (MFD) at 1310 nm may be greater than 8.2 microns, greater than 8.4 microns, or greater than 8.6 microns. For example, in some embodiments, 8.2 microns ≤MFD≤9.5 microns, or 8.2 microns ≤MFD≤9.2 microns, or 8.2 microns ≤MFD≤9.0 microns, at 1310 nm.

The coated fibers may exhibit a macrobend loss at 1550 nm of less than 1.0 dB/turn when wrapped around a mandrel with a diameter of 10 mm, or less than 0.5 dB/turn when wrapped around a mandrel with a diameter of 10 mm. In some embodiments the coated fibers may exhibit a macrobend loss at 1550 nm of less than less than 0.25 dB/turn when wrapped around a mandrel with a diameter of 15 mm., In some embodiments the coated fibers may exhibit a macrobend loss at 1550 nm less than 0.15 dB/turn when wrapped around a mandrel with a diameter of 20 mm.

The optical and mechanical characteristics of the fibers of the present disclosure may be compliant with the G.657 standard. The coated fibers may have a cabled cutoff wavelength of 1260 nm or less. The fibers may have a zero dispersion wavelength Xo in the range 1300 nm≤$\lambda_0$≤1324 nm.

Additional features and advantages will be set forth in the detailed description which follows, and in part will be apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description explain the principles and operation of the various embodiments.

DETAILED DESCRIPTION

Figure 1:
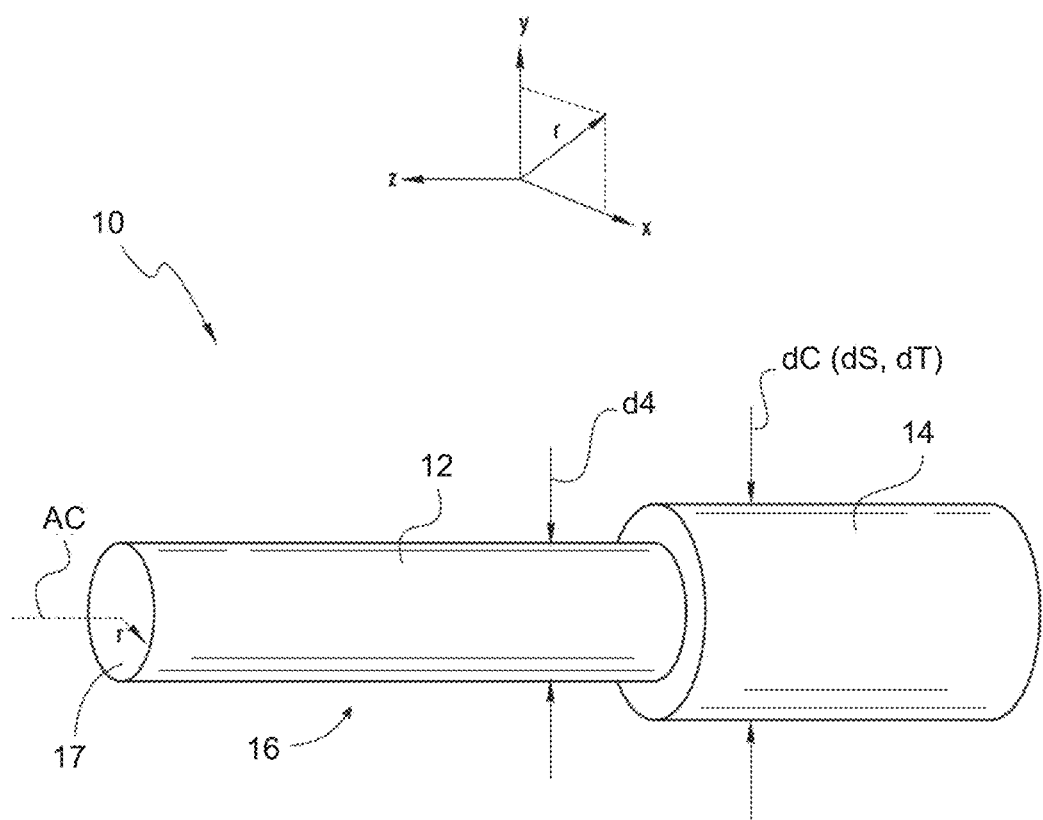
FIG. 1 is a schematic elevated view of an example small diameter optical fiber ("fiber") showing an exposed glass end section and a non-glass protective coating section surrounding the remaining portion of the glass section.

The present disclosure concerns coated optical fibers that may combine small cladding and coating diameters, a large mode field diameter, low fiber cutoff wavelength, low attenuation and low macrobend loss. These optical fibers are referred to below in some cases as small diameter low-attenuation optical fibers or just "fibers" for short, unless otherwise noted.

The claims set forth below are incorporated by reference into this Detailed Description section.

Cartesian coordinates are shown in some of the Figures for reference and ease of explanation and are not intended to be limiting as to direction or orientation.

Terms like front, back, top, bottom, side, etc. are relative terms used for convenience and ease of explanation and are not intended to be limiting.

A brief explanation of selected terminology used herein is now presented.

The abbreviation μm stands for "micron" or "micrometer," while the abbreviation nm stands for nanometer.

The term "modulus" means "elastic modulus." The modulus of the primary coating is denoted $E_P$ while the modulus of the secondary coating is denoted $E_S$. In an example, $E_P < E_S$.

The terms "optical interconnect device," "optical interconnection device" and "optical connector" are used synonymously herein and described a device that facilitates optical communication between one or more first optical components and one or more second optical components. Example optical components include optical fibers, optical waveguides, light sources, light receivers, transceivers, passive optical elements, active optical elements, etc.

The "refractive index profile" is the relationship between refractive index or relative refractive index and fiber radius.

The "relative refractive index delta" is defined as $$\Delta\% = 100\frac{n^2(r) - n_s^2}{2n^2(r)}$$

where n(r) is the refractive index of the fiber at the radial distance r from the fiber centerline, unless otherwise specified, and $n_s$=1.444 is the refractive index of pure silica at a wavelength of 1550 nm. As used herein, the relative refractive index percent (also referred herein as the relative refractive index) is represented by Δ (or "delta"), Δ% (or "delta %"), or %, all of which are used interchangeably herein, and its values are given in units of percent or %, unless otherwise specified. Relative refractive index may also be expressed as Δ(r) or Δ(r) %.

"Chromatic dispersion", which may also be referred to as "dispersion", of a waveguide fiber is the sum of the material dispersion, the waveguide dispersion, and the intermodal dispersion at a wavelength λ. In the case of single-mode waveguide fibers, the inter-modal dispersion is zero. Dispersion values in a two-mode regime assume intermodal dispersion is zero. The zero dispersion wavelength ($λ_0$) is the wavelength at which the dispersion has a value of zero. Dispersion slope is the rate of change of dispersion with respect to wavelength.

The term "α-profile" refers to a relative refractive index profile Δ(r) that has the following functional form:

$$\Delta(r) = \Delta(r_0)\left[1 - \left[\frac{|r - r_0|}{(r_1 - r_0)}\right]^{\alpha}\right]$$

where $r_o$ is the point at which Δ(r) is maximum, $r_1$ is the point at which Δ(r) is zero, and r is in the range $r_i \leq r \leq r_f$, where $r_i$ is the initial point of the α-profile, $r_f$ is the final point of the α-profile, and a is a real number. In some embodiments $r_i$=0 and $r_f$=$r_1$.

The mode field diameter (MFD) is measured using the Petermann II method and is determined from:

$$MFD = 2w$$

$$w^2 = 2\frac{\int_0^\infty (f(r))^2 r dr}{\int_0^\infty \left(\frac{df(r)}{dr}\right)^2 r dr}$$

where f(r) is the transverse electric field distribution of the LP01 mode and r is the radial position in the fiber.

The microbend resistance of a waveguide fiber may be gauged by induced attenuation under prescribed test conditions. Various tests are used to assess microbending losses including the lateral load microbend test, wire mesh covered drum microbend test, and mandrel wrap test.

In the lateral load test, a prescribed length of waveguide fiber is placed between two flat plates. A #70 wire mesh is attached to one of the plates. A known length of waveguide fiber is sandwiched between the plates, and a reference attenuation at a selected wavelength (typically within the range of 1200-1700 nm, e.g., 1310 nm or 1550 nm or 1625 nm) is measured while the plates are pressed together with a force of 30 Newtons. A 70 Newton force is then applied to the plates, and the increase in attenuation at the selected wavelength in dB/m is measured. The measured increase in attenuation is the lateral load wire mesh (LLWM) attenuation of the waveguide.

In the wire mesh covered drum test, a 400 mm diameter aluminum drum is wrapped with wire mesh. The mesh is wrapped tightly without stretching. The wire mesh should be intact without holes, dips, or damage. The wire mesh material used in the measurements herein was made from corrosion-resistant type 304 stainless steel woven wire cloth and had the following characteristics: mesh per linear inch: 165×165, wire diameter: 0.0019", width opening: 0.0041", and open area %: 44.0. A prescribed length (750 m) of waveguide fiber is wound at 1 m/s on the wire mesh drum at 0.050 cm take-up pitch while applying 80 (+/−1) grams of tension. The ends of the prescribed length of fiber are taped to maintain tension and there are no fiber crossovers. The attenuation of the optical fiber is measured at a selected wavelength (typically within the range of 1200-1700 nm, e.g., 1310 nm or 1550 nm or 1625 nm). A reference attenuation is measured for the optical fiber wound on a smooth drum (i.e. a drum without a wire mesh). The increase in fiber attenuation (in dB/km) in the measurement performed on the drum with the wire mesh relative to the measurement performed on the smooth drum is reported as the wire mesh covered drum attenuation of the fiber at the selected wavelength.

The macrobend performance of the fiber can be gauged by measuring the induced attenuation increase in a mandrel wrap test. In the mandrel wrap test, the fiber is wrapped one or more times around a cylindrical mandrel having a specified diameter, and the increase in attenuation at a specified wavelength due to the bending is determined. Attenuation in the mandrel wrap test is expressed in units of dB/turn, where one turn refers to one revolution of the fiber about the mandrel.

The fiber and cabled fiber cutoff wavelengths can be measured according to the procedures defined in FOTP-80 IEC-60793-1-44 Optical Fibres—Part 1-44: Measurement Methods and Test Procedures—Cut-Off Wavelength. All methods require a reference measurement, which in the case of a bend-insensitive single-mode fiber should be the multimode-reference technique rather than the bend-reference technique.

The present disclosure provides reduced diameter coated fibers with excellent microbending and macrobending performance and a mode field diameter that may permit splicing and connecting to G.657 single-mode fibers (e.g. Corning® SMF-28e+@ and Corning® SMF-28@ Ultra) with minimal losses. The coated fibers of the present disclosure may overcome trade-offs in the mode field diameter (MFD), attenuation and/or bending losses that have accompanied efforts in the prior art to manufacture optical fibers with a reduced cladding diameter. With the present coated fibers, small cladding and coating diameters may be achievable without sacrificing mode field diameter or bending performance. The present disclosure accordingly may provide compact coated fibers that can be assembled in high density configurations for internal installations and yet provide good matching and low losses when integrated with external single-mode fibers. Different profile designs that are described result in good fiber microbend and macrobend performance even when the thicknesses of the coating layers are small. Mechanical properties, compositions, and geometry of reduced-thickness primary and secondary coating layers that may yield low microbending and macrobending losses and good puncture resistance are disclosed. Unless otherwise specified, all wavelength-dependent results are based on a wavelength of 1550 nm.

Small Diameter Low-Attenuation Optical Fiber

FIG. 1 is a schematic elevated view of an example of the small diameter low-attenuation optical fiber ("fiber") 10 disclosed herein and showing an exposed glass section 12 with a diameter d4=2r$_4$ (see FIG. 3) and a non-glass protective coating section 14 with a diameter dC surrounding the glass section. The fiber 10 has a centerline AC that runs in the z-direction. A radial polar coordinate r extends perpendicular to the z-axis. The fiber 10 is assumed to be circularly symmetric about the z-axis (and thus the centerline AC) so that the angular polar coordinate is not needed. The fiber 10 of FIG. 10 has an end section 16 with an end face 17. The end section 16 has the coating section 14 removed and so can also be referred to as a bare section or bare glass section or stripped section or glass end section.

The embodiments of the coated fibers 10 may include a cladding having two regions and a refractive index profile that differs in these two regions. The design of the refractive index profile of the cladding may include a refractive index trench that diminishes the sensitivity of the coated fiber to bending, which may enable use of a primary coating and/or secondary coating with reduced thickness relative to commercially available fibers. The thinner coating thickness of the optical fiber embodiments described herein advantageously provides compact coated fibers that can be densely packed and/or readily installed in existing fiber infrastructures. The mechanical properties of the primary coating are selected such that good microbending performance of the coated fiber is achieved, even when the thickness of the primary coating is reduced. The mechanical properties of the secondary coating are selected such that good puncture resistance of the coated fiber is achieved, even when the thickness of the secondary coating is reduced.

The coated fibers of the present disclosure may include a core, a cladding, a primary coating, and a secondary coating, where the cladding may include two or more regions with differing refractive index profiles and where the primary and secondary coatings have different elastic moduli $E_P$ and $E_S$, respectively.

Figure 2A:
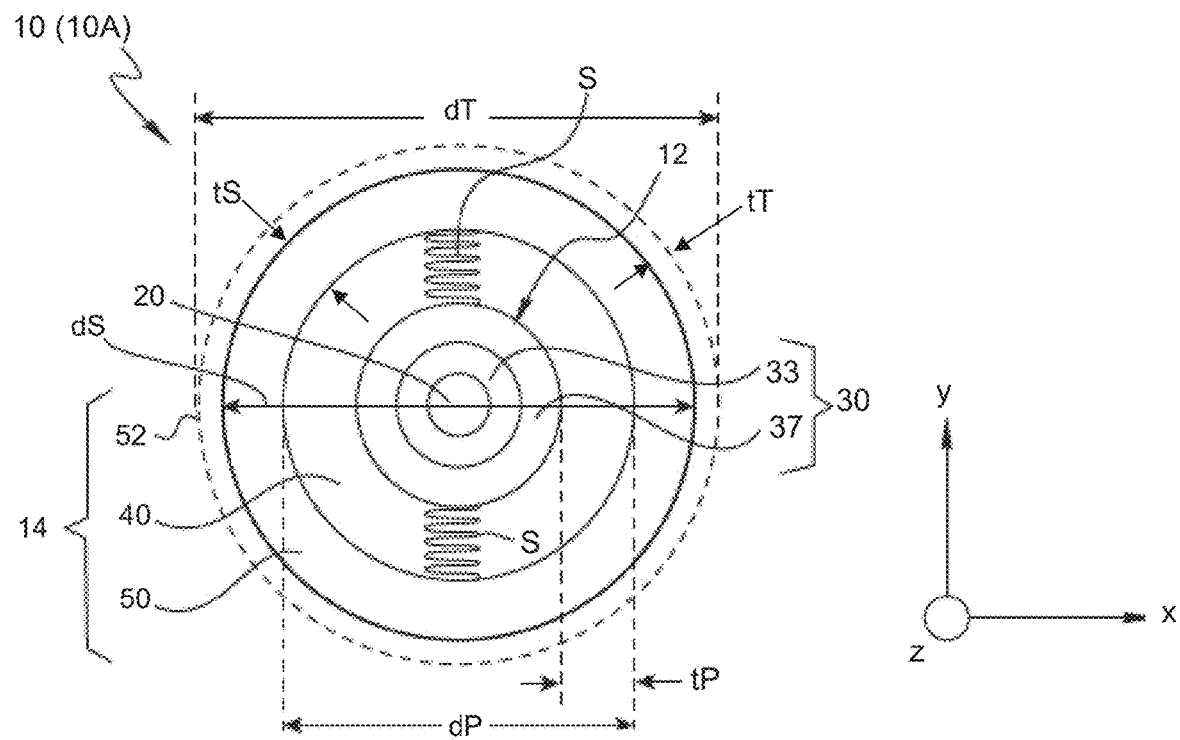
FIG. 2A is a schematic depiction in cross-section of an example fiber having a core, an inner cladding region, an outer cladding region, a primary coating and a secondary coating.

FIG. 2A is a schematic cross-sectional depiction of a first embodiment of a fiber 10 in accordance with the present disclosure. The first embodiment of the fiber 10 (denoted 10A) includes core 20, a cladding 30, a primary coating 40, and a secondary coating 50. Cladding 30 includes inner cladding region 33 and outer cladding region 37. The core 20 and cladding 30 constitute the glass section 12 while the primary coating 40, secondary coating 50 and optional tertiary coating 52 constitute the coating section 14. The primary coating 40 has a diameter dP and a radial thickness tP. The secondary coating 50 has a diameter dS and a radial thickness tS. An optional tertiary coating 52 has a thickness tT.

Figure 2B:
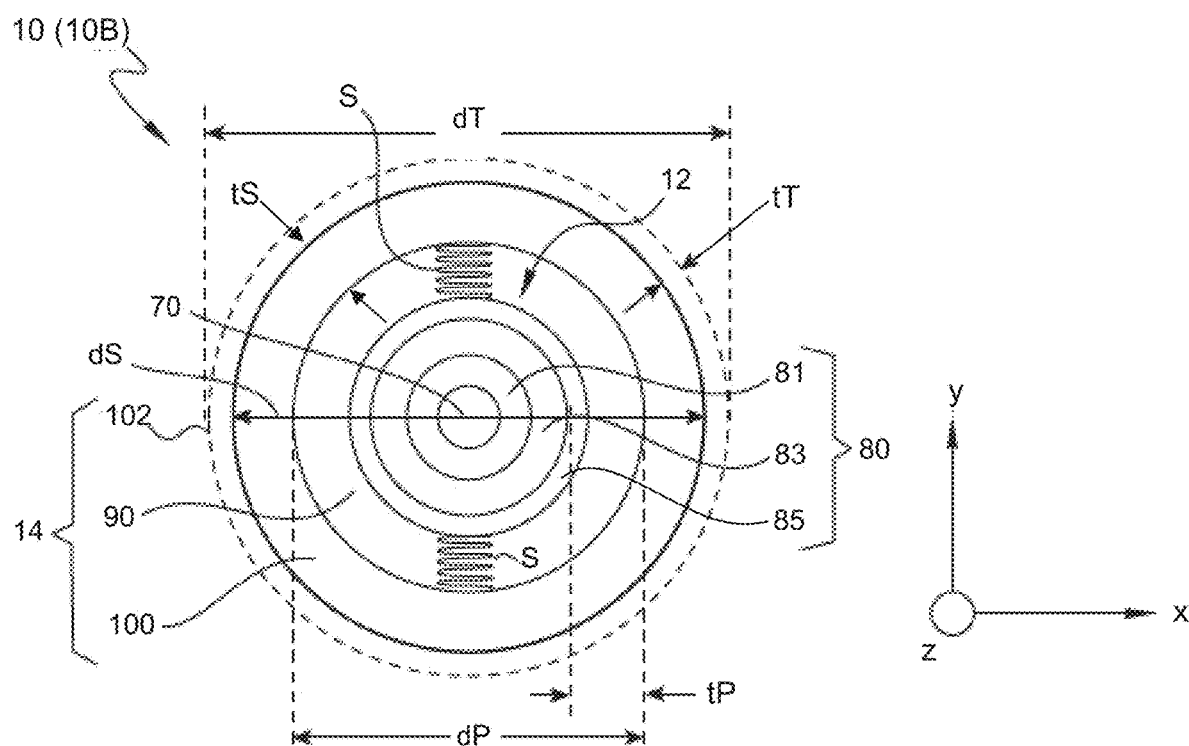
FIG. 2B is a schematic depiction in cross-section of another example fiber having a core, two inner cladding regions, an outer cladding region, a primary coating and a secondary coating.

FIG. 2B is a schematic cross-section of a second embodiment of the fiber 10, denoted as fiber 10B. The fiber 10B shown in FIG. 2B includes a core 70, a cladding 80, a primary coating 90 and a secondary coating 100. The cladding 80 includes first inner cladding region 81, second inner cladding region 83, and outer cladding region 85. The cladding 70 constitute the glass section 12 while the primary, secondary and optional tertiary coatings 90, 100 and 102 constitute the coating section 14. The primary coating 90 has a diameter dP, the secondary coating 50 or 100 has a diameter dS, and the tertiary coating 52 or 102 has a diameter dT and a thickness tT.

With reference again also to FIG. 1, in one example, the diameter dC of the coating section 14 is defined by the diameter dS when the secondary coating 50 or 100 is the outermost coating, and in another example by the diameter dT when the tertiary coating 52 or 102 is the outermost coating. In the discussion below, reference to the core or the cladding is for both the first example embodiment fiber 10A and the second example fiber embodiment 10B unless otherwise noted.

The core and cladding may be silica or silica-based glass and may optionally include an updopant or a downdopant. Silica-based glass may be silica glass modified by an alkali or alkaline earth element, one or more halogens, or other dopants. The radius of the core may be in the range of 3.6 to 5.4 microns, for example 4 to 5 microns or 4.2 to 4.8 microns. The refractive index across the core may be constant or variable. The core refractive index may be at a maximum at or near the center of the core and may continuously decrease in the direction of the outer core boundary. The core refractive index profile may be or may approximate a Gaussian profile, an α-profile, a step profile or a rounded step index profile with an alpha value in the range between 6 and 12. The maximum or peak refractive index delta of the core $\Delta_{1MAX}$ may be in the range from 0.32% to 0.42%, or from 0.34% to 0.40%, or from 0.35% to 0.39%.

The core region may be characterized by a core profile volume, $V_1$, in units of %-microns$^2$, equal to:

$$V_1 = 2\int_0^{r1} \Delta(r)\, r\, dr$$

The magnitude $|V_1|$ of the core volume may be at least 5.8%-microns$^2$, or at least 6.0%-microns$^2$, or at least 6.2%-microns$^2$. The magnitude $|V_1|$ of the core volume may also be less than 6.8%-microns$^2$, or less than 6.6%-microns$^2$, or between 5.8%-microns$^2$ and 6.8%-microns$^2$, or between 6.0%-microns$^2$ and 6.6%-microns$^2$.

The glass cladding may include two or more regions that differ in refractive index profile and may extend to an outer radius of not greater than 45 microns, or not greater than 42 microns, or not greater than 40 microns, or not greater than 35 microns, or not greater than 32.5 microns, or not greater than 30 microns. According to some embodiments the outer radius of the glass cladding is between 25 microns and 45 microns, or between 30 microns and 42 microns, or between 35 microns and 42 microns, or between 38 microns and 42 microns, or between 25 microns and 35 microns. According to some embodiments, at least one region of the glass cladding 30, 80 is down-doped relative to silica (for example, by F or B).

The cladding 30, 80 may include at least one inner cladding region surrounded by an outer cladding region, where the inner cladding region may have a lower refractive index than the outer cladding region. The refractive index of the inner cladding region may be constant or continuously varying. The refractive index of the inner cladding region may form a trench in the refractive index profile of the coated fiber. The trench is a depressed index region and may be approximately rectangular or triangular. The outer cladding region may have a constant or continuously varying refractive index. The minimum refractive index of the inner core region may be less than the maximum refractive index of the outer cladding region.

The cladding may include a first inner cladding region adjacent the core and a second inner cladding region disposed between the first inner cladding region and the outer cladding region. The refractive index of the second inner cladding region may be lower than the refractive index of the first inner cladding region (see, e.g., FIG. 3 and FIG. 4.) The minimum refractive index of the second inner cladding region may be lower than the maximum refractive index of the first inner cladding region. The refractive index of the second inner cladding region may be lower than the refractive index of the outer cladding region. The minimum refractive index of the second inner cladding region may be lower than the maximum refractive index of the outer cladding region. The refractive index of the second inner cladding region may be lower than the refractive indices of the first inner cladding region and the outer cladding region. The minimum refractive index of the second inner cladding region may be lower than the maximum refractive indices of the first inner cladding region and the outer cladding region.

The refractive index of the second inner cladding region may be constant or varying (e.g., continually varying). The refractive index of the second inner cladding region may form a trench in the refractive index profile of the coated fiber. The trench is a depressed index region and may be rectangular or triangular. The relative refractive index delta of the trench $\Delta_3$ may be less than −0.2%, less than −0.25%, less than −0.3% or less than −0.35%. The relative refractive index delta of the trench $\Delta_3$ may be greater than −0.6%, greater than −0.55%, greater than −0.5%, greater than −0.45%, or between −0.2% and −0.6%, or between −0.25% and −0.55%, or between −0.3% and −0.5%. The inside radius of the trench $r_2$ may be greater than 9.0 microns, or greater than 9.4 microns, or greater than 9.8 microns. The inside radius of the trench $r_2$ may be less than 11.2 microns, or less than 10.8 microns, or less than 10.4 microns, or between 9.0 and 11.2 micron, or between 9.4 and 10.8 microns. The outside radius of the trench $r_3$ may be greater than 14.0 microns, or greater than 14.5 microns, or greater than 15.0 microns. The outside radius of the trench $r_3$ may be less than 18.0 microns, or less than 17.5 microns, or less than 17.0 microns, or between 14.0 and 18.0 micron, or between 15.0 and 17.0 microns.

The depressed index region may be characterized by a profile trench volume, $V_3$, in units of %-microns$^2$, equal to:

$$V_3 = 2\int_{r2}^{r3} \Delta(r)\, r\, dr$$

The magnitude $|V_3|$ of the trench volume may be at least 40%-microns$^2$, or at least 45%-microns$^2$, or at least 50%-microns$^2$. The magnitude $|V_3|$ of the trench volume may also be less than 75%-microns$^2$, or less than 70%-microns$^2$, or between 40%-microns$^2$ and 70%-microns$^2$.

The primary coating 40, 90 of the optical fiber 10 is structured to act as a spring (shown schematically as a spring S in FIGS. 2A and 2B) that couples the glass portion (i.e., cladding 30, 80) of the optical fiber to the secondary coating 50, 100.

Commercially-available optical fibers with small outer cladding diameters and small coated fiber diameters suffer from microbending losses unless the mode field diameter is reduced or the cutoff wavelength is increased. Improving microbending losses for such fibers has been difficult if the total thickness of the primary and secondary coatings has a smaller value than the 58.5-62.5 micron value for standard telecommunication fibers. Decreasing the modulus of the primary coating can help reduce the microbending sensitivity of the fiber, but the thickness of the primary coating can only be increased if there is a concomitant decrease in the thickness of secondary coating given the constraint on the total thickness of the two coating layers. Decreasing the secondary coating thickness is undesirable because it reduces puncture resistance of the coated fiber. However, applicants discovered that optical fibers with small outer coating diameters (≤170 microns), and a small outer cladding diameter (≤90 microns) can have surprisingly good microbending and good resistance to puncture if the thicknesses of the primary and secondary coatings are each at least about 10 microns. In some embodiments, the relative coating thickness, tP/tS, is in the range 0.5 tP/tS 1.5.

More specifically, the embodiments of the optical fiber have a primary coating 40, 90, that has an in situ elastic modulus $E_P$ of 0.35 MPa or less and a minimum thickness of tP of 10 microns (e.g., a thickness of 12.5 microns, 15 microns, 17.5 microns, or 20 microns), and in these embodiments the primary coating 30, 90 (acts as a "spring" that couples the stiff glass portion (e.g., cladding 30, 80) to the relatively stiff secondary coating 50, 100 that has an in situ elastic modulus greater than 1200 MPa, or greater than 1400 MPa, or greater than 1500 MPa, or even greater than 1800 MPa. The spring constant of the primary coating 40, 90 is defined as $\chi_P = E_P * d4/tP$, where d4 is the diameter of the glass portion of the fiber (i.e., it is the outer diameter of the glass cladding or $2r_4$), and tP and $E_P$ are the thickness and modulus, respectively, of the primary coating 40, 90. In the fiber embodiments described the spring constant of the primary coating has a value $\chi_P \leq 1.6$ MPa (preferably $\chi_P \leq 1.2$ MPa, more preferably $\chi_P \leq 1.0$ MPa, and even more preferably $\chi_P \leq 0.8$ MPa), which is desirable for improved microbending resistance (lower microbending losses), since a small spring constant provides lower degree of coupling between the glass portion of the fiber and the secondary coating.

Therefore, according to the embodiments discussed herein, when the optical fiber has an outer coating diameter ≤170 microns, and an outer glass cladding diameter ≤90 microns, a secondary coating 50, 100 with in situ elastic modulus greater than 1200 MPa (and preferably >1500 MPa) and a thickness tS greater or equal to 10 microns, and a primary coating 40, 90 with an situ elastic modulus $E_P \leq 0.35$ MPa, a spring constant $\chi_P \leq 1.6$ MPa and a thickness of at least 10 microns (e.g., 10 microns ≤tP≤15 microns). It is even more preferable that $\chi_P < 1.5$ MPa or $\chi_P \leq 1.4$ MPa, or $\chi_P \leq 1.3$ MPa, or $\chi_P \leq 1.2$ MPa. In at least some embodiments disclosed herein the primary coating has a spring constant $\chi_P \leq 1.1$ MPa, $\chi_P \leq 1.0$ MPa, $\chi_P \leq 0.9$ MPa, $\chi_P \leq 0.8$ MPa, $\chi_P \leq 0.7$ MPa, or $\chi_P \leq 0.6$ MPa. For example, in some embodiments, 0.5 MPa≤$\chi_P$≤1.5 MPa; 0.5 MPa≤$\chi_P$≤1.2 MPa; 0.6 MPa≤$\chi_P$≤1.0 MPa. Alternatively, if the optical fiber has an additional coating (tertiary coating) situated on top of the secondary coating (e.g., an ink or a coating containing ink) with a thickness tT, then the sum of the secondary and tertiary coating thickness (tS+tT) is preferably ≥10 microns, and more preferably ≤12 microns, for example 12 microns ≤(tS+tT)≤30 microns. The combined cross-sectional areas of the secondary and optional tertiary coating layers for the embodiments of fibers disclosed herein is preferably 20000 sq. microns or greater, more preferably 25000 sq. microns or greater and even more preferably 30000 sq. microns or greater, which advantageously ensures that the fiber has sufficient puncture resistance.

In some embodiments, tT is between 0 and 6 microns, for example, tT=3 microns, 4 microns, or 5 microns.

Table 1A below provides some exemplary embodiments of the optical fibers that have an outer cladding diameter of about 80 microns (i.e., $r_4$=40 microns), an outer coating diameter less than 170 microns, low attenuation and excellent bending performance. These fibers have: primary coating situ modulus $E_P \leq 0.35$ MPa, primary coating thickness tP such that 10 microns ≤tP≤30 microns; a primary coating spring constant $\chi_P \leq 1.6$ MPa (e.g., $\chi_P \leq 1.2<$MPa, ≤1.0 MPa and even ≤0.8 MPa), a secondary coating diameter in the range between about 155 and 165 microns, a secondary coating situ modulus $E_P \geq 1200$ MPa, and a secondary coating thickness tS such that 10 microns ≤tS≤30 microns. The tertiary coating thickness tT in these embodiments is in the range between 0 and 6 microns (i.e., in some embodiments there is no tertiary coating, thus the tertiary coating thickness tT=0). Other fiber embodiments contain a tertiary coating with a thickness tT between 2 and 6 microns. In these exemplary embodiments the sum tS+tT is between 10 and 30 microns, i.e., 12 microns ≤(tS+tT)≤30 microns. In some embodiments, the puncture resistance load of the optical fiber is greater than 20 grams. In some embodiments, the puncture resistance load of the fiber is greater than 25 grams. In some embodiments, the puncture resistance load of the fiber is greater than 30 grams. The combined cross-sectional areas of the secondary and optional tertiary coating layers for the embodiments of fibers disclosed in Table 1A is also greater than 20000 sq. microns, which further improves the puncture resistance.

TABLE 1A

| Parameter | Example 1 | Example 2 | Example 3 | Example 4 | Example 5 |
|---|---|---|---|---|---|
| Outer Cladding Diameter (2r₄ = d4, microns) | 80 | 80.5 | 80 | 80 | 80.5 |
| Primary Coating in situ Modulus ($E_P$, MPa) | 0.26 | 0.2 | 0.3 | 0.2 | 0.2 |
| Primary Coating Thickness (tP, microns) | 20 | 20 | 15 | 25 | 25 |
| Primary Coating Diameter (dP, microns) | 120 | 120.5 | 110 | 130 | 130.5 |
| Primary Coating Spring Constant ($\chi_P$, MPa) | 1.04 | 0.805 | 1.60 | 0.64 | 0.64 |
| Secondary Coating Thickness (tS, microns) | 22.5 | 18.5 | 22.5 | 12.5 | 17.5 |
| Secondary Coating Diameter (dS, microns) | 165 | 157 | 155 | 155 | 165 |
| Secondary Coating in situ Modulus (Es, MPa) | 1400 | 1800 | 1600 | 1500 | 1250 |
| Tertiary Coating Thickness (tT, microns) | 0 | 4 | 5 | 5 | 0 |
| Secondary + Tertiary Coating Thickness (tS + tT, microns) | 22.5 | 22.5 | 27.5 | 17.5 | 17.5 |
| Ratio of Primary Coating Thickness to (Secondary + Tertiary) Coating Thickness [tP/(tS + tT)] | 0.89 | 0.89 | 0.55 | 1.43 | 1.43 |
| Secondary + Tertiary Coating Cross Sectional Area (sq. microns) | 40291 | 39913 | 47517 | 32437 | 32028 |
| Coated Fiber Diameter (2r₆, microns) | 165 | 165 | 165 | 165 | 165 |

Figure 3:
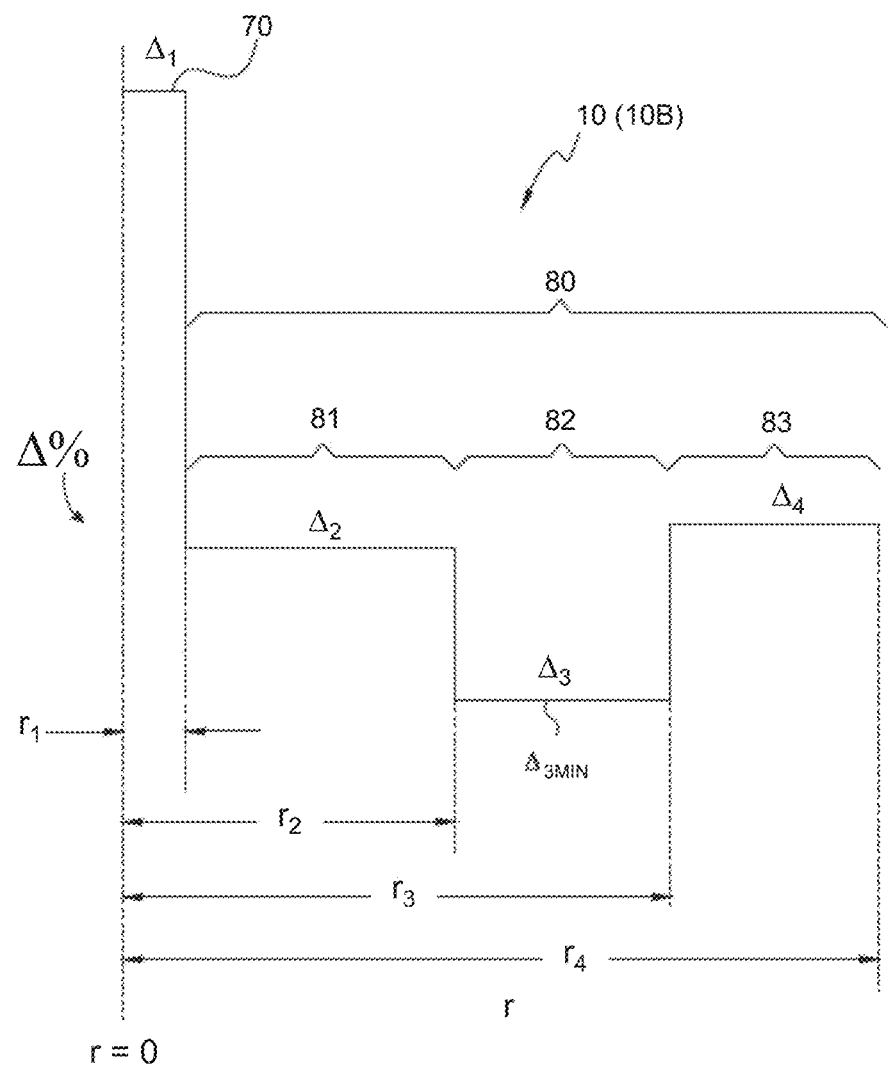
FIG. 3 is a schematic depiction of an illustrative core-cladding refractive index profile (Δ% vs radius r) according to exemplary embodiments corresponding to the fibers of FIG. 2B.

An exemplary refractive core-cladding index profile of such fibers is shown schematically in FIG. 3. The refractive index profile parameters and modelled attributes of several exemplary embodiments corresponding to FIG. 3 are given in Tables 1B and 1C. The optical properties of these exemplary fiber embodiments are as follows: the mode field diameter MFD at 1310 nm is between 8.2 and 9.4 microns; the mode field diameter MFD at 1550 nm is between 9.2 and 10.4 microns, the zero dispersion wavelength is between 1302 and 1320 nm; the fiber cutoff is between 1180 and 1300 nm; and the macrobend loss at 1550 nm is less than 0.5 dB/turn when the fiber is wrapped around a mandrel having a diameter of 10 mm.

The fiber embodiments of Tables 1B and 1C (Fiber 1-Fiber 10) can be constructed, for example, with an outer cladding diameter $2R_4$ of about 80-81 microns as described in Table 1A and utilizing the primary and secondary coatings of Table 1A.

In some exemplary embodiment of Fibers 1-Fibers 10 is $\Delta_4$ (0%)=0, and the outer cladding is made of pure silica. In other exemplary embodiments of Fibers 1-Fibers 10, $2R_4$ has a value of about 80-81 microns and the outer cladding can be updoped or down doped relative to pure silica, but $\Delta_4 > \Delta_{3MIN}$.

TABLE 1B

| | Fiber 1 | Fiber 2 | Fiber 3 | Fiber 4 | Fiber 5 |
|---|---|---|---|---|---|
| $\Delta_{1MAX}$ (%) | 0.399 | 0.401 | 0.394 | 0.391 | 0.382 |
| $r_1$ | 4.33 | 4.38 | 4.26 | 4.37 | 4.29 |
| $V_1$ (%-microns$^2$) | 6.23 | 6.43 | 6.08 | 6.29 | 5.82 |
| Alpha | 10.07 | 10.28 | 11.32 | 10.85 | 9.81 |
| $\Delta_2$ (%) | 0 | 0 | 0 | 0 | 0 |
| $\Delta_3$ (%) | −0.443 | −0.394 | −0.383 | −0.417 | −0.292 |
| $r_2$ | 9.04 | 9.38 | 10.47 | 10.19 | 10.64 |
| $r_3$ | 14.71 | 14.90 | 15.88 | 16.28 | 17.83 |
| $V_3$ (%-microns$^2$) | −59.7 | −52.8 | −54.6 | −67.1 | −59.8 |
| MFD at 1310 nm (microns) | 8.45 | 8.50 | 8.52 | 8.59 | 8.61 |
| MFD at 1550 nm (microns) | 9.43 | 9.49 | 9.61 | 9.65 | 9.76 |
| Dispersion at 1310 nm (ps/nm/km) | 0.56 | 0.51 | −0.18 | 0.22 | −0.47 |
| Dispersion Slope at 1310 nm (ps/nm$^2$/km) | 0.090 | 0.090 | 0.088 | 0.089 | 0.088 |
| Zero Dispersion Wavelength (nm) | 1304 | 1304 | 1312 | 1307 | 1315 |
| Theoretical Cutoff Wavelength (nm) | 1245 | 1269 | 1248 | 1264 | 1224 |
| Fiber Cutoff Wavelength (nm) | 1240 | 1260 | 1240 | 1260 | 1220 |
| Bend Loss at 1550 nm for 10 mm diameter mandrel (dB/turn) | 0.049 | 0.072 | 0.082 | 0.03 | 0.078 |

TABLE 1C

| | Fiber 6 | Fiber 7 | Fiber 8 | Fiber 9 | Fiber 10 |
|---|---|---|---|---|---|
| $\Delta_{1MAX}$ (%) | 0.371 | 0.382 | 0.368 | 0.352 | 0.334 |
| $r_1$ | 4.37 | 4.70 | 4.51 | 4.51 | 4.57 |
| $V_1$ (%-microns$^2$) | 5.94 | 6.71 | 6.23 | 5.98 | 5.89 |
| Alpha | 10.48 | 7.74 | 9.97 | 10.07 | 11.00 |
| $\Delta_2$ (%) | 0 | 0 | 0 | 0 | 0 |
| $\Delta_3$ (%) | −0.375 | −0.385 | −0.333 | −0.360 | −0.365 |
| $r_2$ | 9.61 | 11.02 | 9.98 | 9.93 | 10.19 |
| $r_3$ | 14.28 | 15.13 | 15.27 | 14.59 | 14.62 |
| $V_3$ (%-microns$^2$) | −41.8 | −41.4 | −44.5 | −41.2 | −40.1 |
| MFD at 1310 nm (microns) | 8.71 | 8.83 | 8.84 | 8.96 | 9.17 |
| MFD at 1550 nm (microns) | 9.77 | 9.91 | 9.91 | 10.05 | 10.29 |
| Dispersion at 1310 nm (ps/nm/km) | 0.28 | 0.46 | 0.46 | 0.47 | 0.59 |
| Dispersion Slope at 1310 nm (ps/nm$^2$/km) | 0.090 | 0.089 | 0.089 | 0.090 | 0.090 |
| Zero Dispersion Wavelength (nm) | 1307 | 1305 | 1305 | 1305 | 1303 |
| Theoretical Cutoff Wavelength (nm) | 1224 | 1305 | 1254 | 1228 | 1219 |
| Fiber Cutoff Wavelength (nm) | 1210 | 1280 | 1240 | 1210 | 1200 |
| Bend Loss at 1550 nm for 10 mm diameter mandrel (dB/turn) | 0.32 | 0.2 | 0.234 | 0.446 | 0.672 |

Table 1D below provides some exemplary embodiments of the optical fibers that have an outer cladding diameter between 60 and 65 microns (i.e., 30<$r_4$<32.5 microns), primary coating diameter ($2r_5$) between 85 and 110 microns, an outer coating diameter ($2r_6$) of 135 microns or less, low attenuation and excellent bending performance. Table 1D fibers have: primary coatings in situ modulus of ≤0.35 MPa, primary coating thickness tP such that 10 microns ≤tP≤25 microns; primary coating spring constant $\chi_P$≤1.6 MPa (e.g., $\chi_P$≤1.2 MPa, $\chi_P$≤1.0 MPa, or even $\chi_P$≤0.8 MPa), secondary coating diameter in the range between about 110 and 135 microns, a secondary coating situ modulus ≥1200 MPa, and a secondary coating thickness tS such that 10 microns ≤tS≤20 microns. The tertiary coating thickness tT in these embodiments is between 0 and 6 microns (i.e., in some embodiments there is no tertiary coating, thus the tertiary coating thickness tT=0). Other fiber embodiments contain a tertiary coating with a thickness tT between 2 and 6 microns.

In the exemplary embodiments fibers of Table 1D the sum (tS+tT) is between 10 microns and 30 microns, i.e., 10 microns ≤(tS+tT)≤30 microns. In some of these embodiments, the puncture resistance load of the optical fiber is greater than 20 grams. In some embodiments, the puncture resistance load of the fiber is greater than 25 grams. In some embodiments, the puncture resistance load of the fiber is greater than 30 grams. The combined cross-sectional areas of the secondary and optional tertiary coating layers for the embodiments of fibers disclosed in Table 1D are greater than 17000 sq. microns, which further improves the puncture resistance.

An exemplary refractive core-cladding index profile of such fibers is shown schematically in FIG. 3. The exemplary refractive index profile parameters and modelled attributes of several exemplary embodiments corresponding to FIG. 3 are given in Tables 1B and 1C. The fibers embodiments of Tables 1B and 1C (Fiber 1-Fiber 10) can be constructed, for example, with an outer cladding diameter $2R_4$ of about 62-63 microns as described in Table D when be utilized with primary and secondary coatings of Table 1D. In some exemplary embodiment of Fibers 1-Fibers 10 is $\Delta_4$ (%)=0, $2R_4$ of about 60-65 microns, and the outer cladding is made of pure silica. In other exemplary embodiments of Fibers 1-Fibers 10, $2R_4$ has a value of about 60-65 microns and the outer cladding can be updoped or down doped relative to pure silica, but $\Delta_4 > \Delta_{3MIN}$.

TABLE 1D

| Parameter | Example 6 | Example 7 | Example 8 | Example 9 | Example 10 |
|---|---|---|---|---|---|
| Outer Cladding Diameter ($2r_4$ = d4, microns) | 62.5 | 63 | 62.5 | 62.5 | 63 |
| Primary Coating in situ Modulus ($E_P$, MPa) | 0.26 | 0.3 | 0.2 | 0.2 | 0.2 |
| Primary Coating Thickness (tP, microns) | 18 | 20 | 15 | 19.75 | 13 |
| Primary Coating Diameter (dP, microns) | 98.5 | 103 | 92.5 | 102 | 89 |
| Primary Coating Spring Constant ($\chi_P$, MPa) | 0.90 | 0.95 | 0.83 | 0.63 | 0.97 |
| Secondary Coating Thickness (tS, microns) | 18.25 | 13.5 | 9.75 | 12.5 | 11.5 |
| Secondary Coating Diameter (dS, microns) | 135 | 130 | 112 | 127 | 112 |
| Secondary Coating in situ Modulus ($E_S$, MPa) | 1800 | 1300 | 1600 | 2000 | 1900 |
| Tertiary Coating Thickness (tT, microns) | 0 | 0 | 4 | 4 | 4 |
| Secondary + Tertiary Coating Thickness (tS + tT, microns) | 18.25 | 13.5 | 13.75 | 16.5 | 15.5 |
| Ratio of Primary Coating Thickness to (Secondary + Tertiary) Coating Thickness [tP/(tS + tT)] | 0.99 | 1.48 | 1.09 | 1.20 | 0.84 |

TABLE 1D-continued

| Parameter | Example 6 | Example 7 | Example 8 | Example 9 | Example 10 |
|---|---|---|---|---|---|
| Secondary + Tertiary Coating Cross Sectional Area (sq. microns) | 26775 | 19764 | 18359 | 24570 | 20354 |
| Coated Fiber Diameter (2$r_6$, microns) | 135 | 130 | 120 | 135 | 120 |

Table 1E below provides five exemplary embodiments of the optical fibers that have an outer cladding diameter between about 45 microns and 55 microns, for example, between 48 microns to 52 microns, (i.e., 22.5 microns ≤$r_4$≤27.5 microns, or 24 microns ≤$r_4$≤26 microns), an outer coating diameter (2$r_6$) of 130 microns or less, low attenuation and excellent bending performance. Table 1E fibers have: primary coating in situ elastic modulus of ≤0.35 MPa, primary coating thickness tP such that 10 microns ≤tP≤25 microns; primary coating spring constant $\Psi_P$≤1.6 MPa (e.g., $\chi_P$≤1.2 MPa, $\chi_P$≤1.0 MPa and even $\chi_P$≤0.8 MPa), a secondary coating diameter of about 100-125 microns, a secondary coating situ modulus ≥1200 MPa, and a secondary coating thickness tS such that 10 microns ≤tS≤20 microns. The tertiary coating thickness tT in these embodiments is 0-6 microns (i.e., in some embodiments there is no tertiary coating, thus tertiary coating thickness tT=0). Other fiber embodiments contain a tertiary coating with a thickness tT between 2 and 6 microns. In the exemplary embodiments fibers of Table 1E, the sum (tS+tT) is between 10 microns and 20 microns, i.e., 10 microns ≤(tS+tP)≤20 microns. In some of these embodiments, the puncture resistance load of the optical fiber is greater than 20 grams. In some embodiments, the puncture resistance load of the fiber is greater than 25 grams. In some embodiments, the puncture resistance load of the fiber is greater than 30 grams. The combined cross-sectional areas of the secondary and optional tertiary coating layers for the embodiments of fibers disclosed in Table 1E are greater than 17000 sq. microns, which further improves the puncture resistance.

TABLE 1E

| Parameter | Example 11 | Example 12 | Example 13 | Example 14 | Example 15 |
|---|---|---|---|---|---|
| Outer Cladding Diameter (2$r_4$ = d4, microns) | 50 | 50.5 | 50 | 50 | 50.5 |
| Primary Coating in situ Modulus ($E_P$, MPa) | 0.26 | 0.3 | 0.2 | 0.2 | 0.2 |
| Primary Coating Thickness (tP, microns) | 20 | 20 | 15 | 22.5 | 12.5 |
| Primary Coating Diameter (dP, microns) | 90 | 90.5 | 80 | 95 | 75.5 |
| Primary Coating Spring Constant ($\chi_P$, MPa) | 0.65 | 0.76 | 0.67 | 0.44 | 0.81 |
| Secondary Coating Thickness (tS, microns) | 17.5 | 14.75 | 11 | 13.5 | 13.25 |
| Secondary Coating Diameter (dS, microns) | 125 | 120 | 102 | 122 | 102 |
| Secondary Coating in situ Modulus ($E_S$, MPa) | 1650 | 1500 | 1350 | 1500 | 1700 |
| Tertiary Coating Thickness (tT, microns) | 0 | 0 | 4 | 4 | 4 |
| Secondary + Tertiary Coating Thickness (tS + tT, microns) | 17.5 | 14.75 | 15 | 17.5 | 17.25 |
| Ratio of Primary Coating Thickness to (Secondary + Tertiary) Coating Thickness [tP/(tS + tT)] | 1.14 | 1.36 | 1.00 | 1.29 | 0.72 |

TABLE 1E-continued

| Parameter | Example 11 | Example 12 | Example 13 | Example 14 | Example 15 |
|---|---|---|---|---|---|
| Secondary + Tertiary Coating Cross Sectional Area (sq. microns) | 23640 | 19509 | 17907 | 24740 | 20105 |
| Coated Fiber Diameter (2$r_6$, microns) | 125 | 120 | 110 | 130 | 110 |

The primary coatings of the fiber embodiments of Tables 1A, 1D, and 1E have in situ moduli of elasticity less than 0.35 MPa, for example less than 0.2 MPa and even more preferably less than 0.15 MPa, with glass transition temperatures between −25° C. and −35° C. The optical fibers are bend insensitive—i.e., the fiber profiles disclosed herein when used in combination with the low modulus primary coatings result in excellent macrobend and microbend properties. This facilitates the use of thinner primary coating layers, in conjunction with sufficiently thick secondary coatings to achieve acceptable puncture resistance for these applications when the secondary coating has an in situ elastic modulus greater than 1200 MPa, preferably greater than 1500 MPa, more preferably greater than 1700 MPa, and even more preferably greater than 1800 MPa. The fibers exhibit a wire mesh drum microbending attenuation at 1550 nm less than 1.0 dB/km, or in some embodiments less than 0.5 dB/km, with the coated fiber advantageously exhibiting a puncture resistance load greater than 30 grams.

The fibers embodiments of Tables 1B and 1C (Fiber 1-Fiber 10) can be constructed, for example, with an outer cladding diameter 2$R_4$ of about 45-55 microns, or as described above or shown in Table 1E, when be utilized with primary and secondary coatings of Table 1E. In some of these exemplary embodiment of Fibers 1-Fibers 10 is $\Delta_4$ (%)=0, and the outer cladding is made of pure silica. In other exemplary embodiments of Fibers 1-Fibers 10 the outer cladding can be updoped or down doped relative to pure silica, but $\Delta_4 > \Delta_{3MIN}$.

Figure 4:
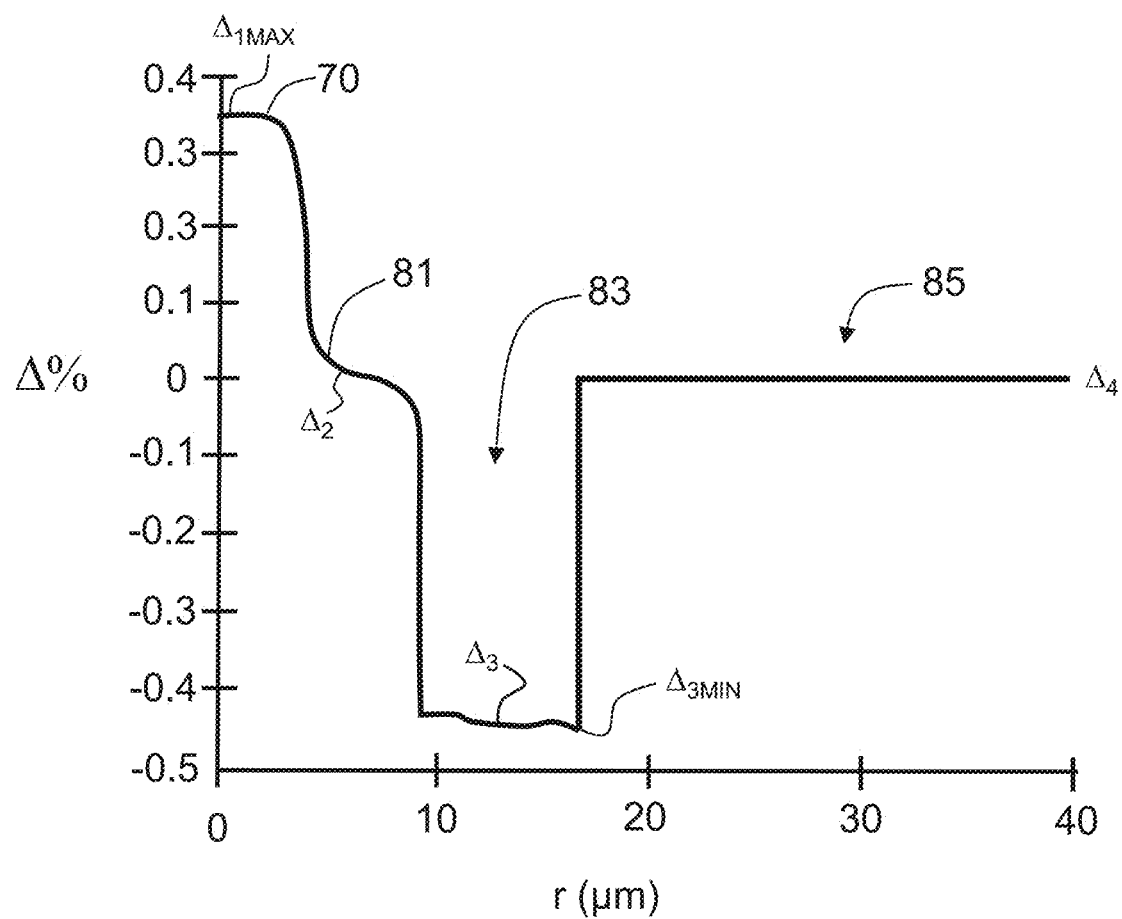
FIG. 4 is an illustrative modeled refractive index core-cladding refractive index profile (Δ% vs radius r (microns, μm)) according to one exemplary embodiments of the fiber that has the cross-section corresponding to the example fiber of FIG. 2B.

As described above, two exemplary embodiments of refractive index profiles for the core and cladding are presented in FIGS. 3 and 4.

More specifically, FIG. 3 is a schematic illustration of one embodiment of an example fiber refractive index profile. More specifically, FIG. 3 shows a refractive index profile, expressed in $\Delta$% relative to pure silica glass, for the second-embodiment fiber 10B having a core 70 with outer radius $r_1$ and relative refractive index $\Delta_1$, and a cladding 80 having a first inner cladding region 81 extending from radial position $r_1$ to radial position $r_2$ and having relative refractive index $\Delta_2$, a second inner cladding region 83 extending from radial position $r_2$ to radial position $r_3$ and having relative refractive index $\Delta_3$, and an outer cladding region 85 extending from radial position $r_3$ to radial position $r_4$ and having relative refractive index $\Delta_4$.

Figure 5:
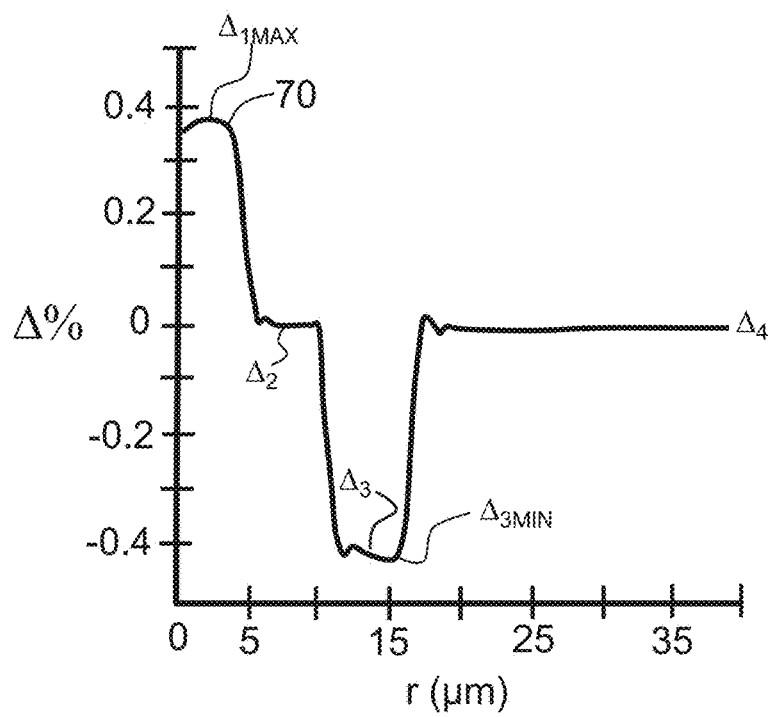
FIG. 5 is a plot of a measured core-cladding refractive index profile (Δ% vs radius r (microns, μm)) of an exemplary embodiment of the fiber disclosed herein.
Figure 6:
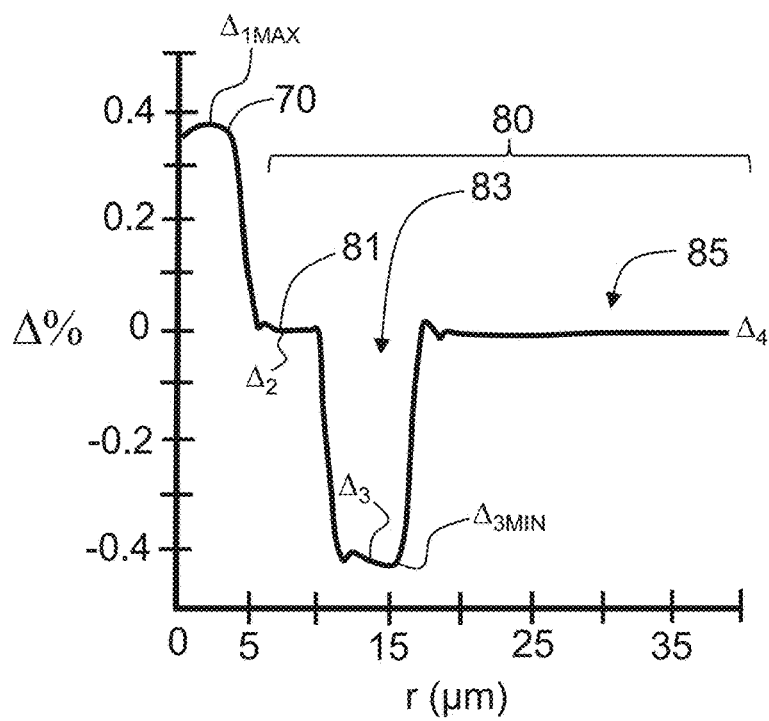
FIG. 6 is a plot of a measured core-cladding refractive index profile (Δ% vs radius r (microns, μm)) of another exemplary embodiment of the fiber disclosed herein.

In the profile of FIG. 3, the second inner cladding region 83 may be referred to herein as a rectangular trench and may have a constant refractive index that is less than the refractive indices of the first inner cladding region 81 and the outer cladding region 85. The trench shown in FIG. 3, for example, may be established by incorporating Fluorine as a downdopant, to provide relative refractive index $\Delta_{3MIN}$. The core 70 may have the highest refractive index in the profile. The core 70 may include a lower index region at or near the centerline (known in the art as a "centerline dip"), as shown in FIGS. 5 and 6, introduced and discussed below. The core refractive index profile may be or may approximate a Gaussian profile, may be an α profile, may be a step index profile, or may be a rounded step index profile. The coated fiber 10B of FIG. 3 includes a primary coating 40 and a secondary coating 50 (not shown in FIG. 3).

FIG. 4 shows a modelled refractive index profile, also expressed in Δ% relative to pure silica glass, for an example fiber 10B having a core 70 with outer radius $r_1$ and relative refractive index $\Delta_1$, and a cladding 80 having a first inner cladding region 81 extending from radial position $r_1$ to radial position $r_2$ and having relative refractive index $\Delta_2$, a second inner cladding region 83 extending from radial position $r_2$ to radial position $r_3$ and having relative refractive index $\Delta_3$, and an outer cladding region 85 extending from radial position $r_3$ to radial position $r_4$ and having relative refractive index $\Delta_4$. In the profile of FIG. 4, the second inner cladding region 83 may be referred to herein as a rectangular trench and may have a constant refractive index that is less than the refractive indices of the first inner cladding region 81 and the outer cladding region 85. The trench shown in FIG. 4, for example, may be established by incorporating Fluorine as a downdopant, to provide relative refractive index $\Delta_{3MIN}$. In this embodiment the core 70 has have highest refractive index in the core-cladding profile. The core 70 may include a centreline dip. The coated fiber 10B of FIG. 4 includes a primary coating 40 and a secondary coating 50 (not shown in FIG. 4).

The refractive index profiles of the core and cladding may be achieved through control of the spatial distribution of dopants or modifiers in silica or silica-based glass. Updopants (e.g. $GeO_2$, $Al_2O_3$, $P_2O_5$, $TiO_2$, Cl, Br) may be used to create regions of increased refractive index and downdopants (e.g. F, $B_2O_3$, non-periodic voids) may be used to create regions of decreased refractive index. Regions of constant refractive index may be formed by not doping or by doping at a uniform concentration. Regions of variable refractive index may be formed through non-uniform spatial distributions of dopants. The core 70 may be updoped substantially with $GeO_2$, resulting in a refractive index delta (due to $GeO_2$) relative to pure silica given by $\Delta_{Ge}\%=0.0601*$wt. % $GeO_2$. The second inner cladding region 83 may be downdoped substantially with Fluorine, resulting in a refractive index delta (due to F) relative to pure silica given by $\Delta_F\%=-0.3053*$wt. % F.

The coated fiber may include regions interposed between the core 70 and first inner cladding region 81, or between the first inner cladding region 81 and the second inner cladding region 83, or between the second inner cladding region 83 and the outer cladding region 85, or between the outer cladding region 85 and the primary coating 90, or between the primary coating 90 and the secondary coating 100. The fiber may have a core 20, 70 with an outer radius $r_1$ and a relative refractive index $\Delta_1$ with a maximum value $\Delta_{1MAX}$ and a minimum value $\Delta_{1MIN}$, and a cladding 30, 60. The cladding may comprise a first inner cladding region having an outer radius $r_2$ and having relative refractive index $\Delta_2$ with a maximum value $\Delta_{2MAX}$ and a minimum value $\Delta_{2MIN}$, a second inner cladding region having an outer radius $r_3$ and having relative refractive index $\Delta_3$ with a maximum value $\Delta_{3MAX}$ and a minimum value $\Delta_{3MIN}$, an outer cladding region having an outer radius $r_4$ and having relative refractive index $\Delta_4$ with a maximum value $\Delta_{4MAX}$ and a minimum value $\Delta_{4MIN}$. The fiber comprises a primary coating having outer radius $r_5$, and a secondary coating having outer radius $r_6$, where $r_6>r_5>r_4>r_3>r_2>r_1$.

The core and cladding of the present coated fibers may be produced in a single-step operation or multi-step operation by methods which are well known in the art. Suitable methods include: the double crucible method, rod-in-tube procedures, and doped silica deposition processes, also commonly referred to as chemical vapor deposition ("CVD") or vapor phase oxidation. A variety of CVD processes are known and are suitable for producing the core and cladding layer used in the coated optical fibers of the present invention. They include external CVD processes, axial vapor deposition processes, modified CVD (MCVD), inside vapor deposition, and plasma-enhanced CVD (PECVD).

The glass portion 12 of the coated fibers may be drawn from a specially prepared, cylindrical preform which has been locally and symmetrically heated to a temperature sufficient to soften the glass, e.g., a temperature of about 2000° C. for a silica glass. As the preform is heated, such as by feeding the preform into and through a furnace, a glass fiber is drawn from the molten material. See, for example, U.S. Pat. Nos. 7,565,820; 5,410,567; 7,832,675; and 6,027,062; the disclosures of which are hereby incorporated by reference herein, for further details about fiber making processes.

The primary coating may have a lower modulus than the secondary coating. The primary coating may be formed from a primary composition that includes a curable oligomer. The curable primary composition may also include monomers, a polymerization initiator, and one or more additives. Unless otherwise specified or implied herein, the weight percent (wt %) of a particular component in a curable primary composition refers to the amount of the component present in the curable primary composition on an additive-free basis. Generally, the weight percents of the monomer(s), oligomer(s), and initiator(s) sum to 100%. When present, the amount of an additive is reported herein in units of parts per hundred (pph) relative to the combined amounts of monomer(s), oligomer(s), and initiator(s). An additive present at the 1 pph level, for example, is present in an amount of 1 g for every 100 g of combined monomer(s), oligomer(s), and initiator(s).

The oligomer of the curable primary composition may be a urethane acrylate oligomer, or a urethane acrylate oligomer that includes one or more urethane groups, or a urethane acrylate oligomer that includes one or more aliphatic urethane groups, or a urethane acrylate oligomer that includes a single urethane group, or a urethane acrylate oligomer that includes a single aliphatic urethane group. The urethane group may be formed from a reaction between an isocyanate group and an alcohol group.

The oligomer may be an acrylate-terminated oligomer. Preferred acrylate-terminated oligomers for use in the primary curable compositions include BR3731, BR3741, BR582 and KWS4131, from Dymax Oligomers & Coatings.; polyether urethane acrylate oligomers (e.g., CN986, available from Sartomer Company); polyester urethane acrylate oligomers (e.g., CN966 and CN973, available from Sartomer Company, and BR7432, available from Dymax Oligomers & Coatings); polyether acrylate oligomers (e.g., GENOMER 3456, available from Rahn AG); and polyester acrylate oligomers (e.g., EBECRYL 80, 584 and 657, available from Cytec Industries Inc.). Other oligomers are described in U.S. Pat. Nos. 4,609,718; 4,629,287; and 4,798,852, the disclosures of which are hereby incorporated by reference in their entirety herein.

The oligomer of the primary curable composition may include a soft block with a number average molecular weight (Mn) of about 4000 g/mol or greater. Examples of such oligomers are described in U.S. patent application Ser. No. 09/916,536, the disclosure of which is incorporated by reference herein in its entirety. The oligomers may have flexible backbones, low polydispersities, and/or may provide cured coatings of low crosslink densities.

The oligomers may be used singly, or in combination to control coating properties. The total oligomer content of the primary curable composition may be between about 5 wt % and about 95 wt %, or between about 25 wt % and about 65 wt %, or between about 35 wt % and about 55 wt %.

The monomer component of the primary curable composition may be selected to be compatible with the oligomer, to provide a low viscosity formulation, and/or to increase the refractive index of the primary coating. The monomer may also be selected to provide curable compositions having decreased gel times and low moduli. The primary curable composition may include a single monomer or a combination of monomers. The monomers may include ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof. The monomer component may include compounds having the general formula $R_2-R_1-O-(CH_2CH_3CH-O)_n-COCH=CH_2$, where $R_1$ and $R_2$ are aliphatic, aromatic, or a mixture of both, and n=1 to 10, or $R_1-O-(CH_2CH_3CH-O)_n-COCH=CH_2$, where $R_1$ is aliphatic or aromatic, and n=1 to 10. Representative examples include ethylenically unsaturated monomers such as lauryl acrylate (e.g., SR335 available from Sartomer Company, Inc., AGEFLEX FA12 available from BASF, and PHOTOMER 4812 available from IGM Resins), ethoxylated nonylphenol acrylate (e.g., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), lauryloxyglycidyl acrylate (e.g., CN130 available from Sartomer Company) and phenoxyglycidyl acrylate (e.g., CN131 available from Sartomer Company) and combinations thereof.

The monomer component of the primary curable composition may also include a multifunctional (meth)acrylate. As used herein, the term "(meth)acrylate" means acrylate or methacrylate. Multifunctional (meth)acrylates are (meth) acrylates having two or more polymerizable (meth)acrylate moieties per molecule. The multifunctional (meth)acrylate may have three or more polymerizable (meth)acrylate moieties per molecule. Examples of multifunctional (meth) acrylates include dipentaerythritol monohydroxy pentaacrylate (e.g., PHOTOMER 4399 available from IGM Resins); methylolpropane polyacrylates with and without alkoxylation such as trimethylolpropane triacrylate, ditrimethylolpropane tetraacrylate (e.g., PHOTOMER 4355, IGM Resins); alkoxylated glyceryl triacrylates such as propoxylated glyceryl triacrylate with propoxylation being 3 or greater (e.g., PHOTOMER 4096, IGM Resins); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), dipentaerythritol pentaacrylate (e.g., PHOTOMER 4399, IGM Resins, and SR399, Sartomer Company, Inc.), tripropyleneglycol di(meth)acrylate, propoxylated hexanediol di(meth)acrylate, tetrapropyleneglycol di(meth)acrylate, pentapropyleneglycol di(meth)acrylate. A multifunctional (meth)acrylate may be present in the primary curable composition at a concentration of from 0.05 wt % to 15 wt %, or from 0.1 wt % to 10 wt %.

The monomer component of the primary curable compositions may include an N-vinyl amide such as an N-vinyl lactam, or N-vinyl pyrrolidinone, or N-vinyl caprolactam. The N-vinyl amide monomer may be present in the primary curable composition at a concentration from 0.1-40 wt %, or from 2-10 wt %.

The curable primary coating composition may include one or more monofunctional (meth)acrylate monomers in an amount from 5-95 wt %, or from 30-75 wt %, or from 40-65 wt %. The curable primary coating composition may include one or more monofunctional aliphatic epoxy acrylate monomers in an amount from 5-40 wt %, or from 10-30 wt %.

The monomer component of the primary curable composition may include a hydroxyfunctional monomer. A hydroxyfunctional monomer is a monomer that has a pendant hydroxy moiety in addition to other reactive functionality such as (meth)acrylate. Examples of hydroxyfunctional monomers including pendant hydroxyl groups include caprolactone acrylate (available from Dow Chemical as TONE M-100); poly(alkylene glycol) mono(meth)acrylates, such as poly(ethylene glycol) monoacrylate, poly(propylene glycol) monoacrylate, and poly(tetramethylene glycol) monoacrylate (each available from Monomer, Polymer & Dajac Labs); 2-hydroxyethyl (meth)acrylate, 3-hydroxypropyl (meth)acrylate, and 4-hydroxybutyl (meth)acrylate (each available from Aldrich).

The hydroxyfunctional monomer may be present in an amount sufficient to improve adhesion of the primary coating to the optical fiber. The hydroxyfunctional monomer may be present in the primary curable composition in an amount between about 0.1 wt % and about 25 wt %, or in an amount between about 5 wt % and about 8 wt %. The use of the hydroxyfunctional monomer may decrease the amount of adhesion promoter necessary for adequate adhesion of the primary coating to the optical fiber. The use of the hydroxyfunctional monomer may also tend to increase the hydrophilicity of the primary coating. Hydroxyfunctional monomers are described in more detail in U.S. Pat. No. 6,563,996, the disclosure of which is hereby incorporated by reference in its entirety.

The total monomer content of the primary curable composition may be between about 5 wt % and about 95 wt %, or between about 30 wt % and about 75 wt %, or between about 40 wt % and about 65 wt %.

The monomer present in the primary curable composition may include an N-vinyl amide monomer at a concentration of 0.1 to 40 wt % or 2 to 10 wt % in combination with one or more difunctional urethane acrylate oligomers in an amount from 5 to 95 wt %, or from 25 to 65 wt % or from 35 to 55 wt %.

The primary coating composition may include one or more monofunctional (meth)acrylate monomers in an amount of from about 5 to 95 wt %; an N-vinyl amide monomer in an amount of from about 0.1 to 40 wt %; and one or more difunctional urethane acrylate oligomers that include a polyol reacted with an isocyanate to form a urethane, where the oligomer is present in an amount of from about 5 to 95 wt %. The polyol may be a polypropylene glycol and the isocyanate may be an aliphatic diisocyanate.

The primary coating composition may include one or more monofunctional (meth)acrylate monomers in an amount of from about 40 to 65% by weight; an N-vinyl amide monomer in an amount of from about 2 to 10% by weight; and one or more polypropylene glycol-based difunctional urethane acrylate oligomers in an amount of from about 35 to 60% by weight.

The glass transition temperature of the primary coating may influence the microbend performance of the fibers at low temperature. It may be desirable for the primary coating to have a glass transition temperature below the lowest projected use temperature of the coated optical fiber. The glass transition temperature of the primary coating may be −15° C. or less, or −25° C. or less, or −30° C. or less, or −40° C. or less. The glass transition temperature of the primary coating may be greater than −60° C., or greater than −50° C., or greater than −40° C. The glass transition temperature of the primary coating may be or between −60° C. and −15° C., or between −60° C. and −30° C., or between −60° C. and −40° C., or between −50° C. and −15° C., or between −50° C. and −30° C., or between −50° C. and −40° C.

The primary coating may have a lower modulus of elasticity than the secondary coating. A low modulus may allow the primary coating to protect the core and cladding by efficiently dissipating internal stresses that arise when the exterior of the fiber is bent or subjected to an external force. As used herein, in situ modulus of the primary coating is the modulus measured by the technique described below.

Primary In Situ Elastic Modulus

A six-inch fiber sample was used for the measurement of the in situ elastic modulus $E_P$ of the primary coating. A one-inch section from the center of the six-inch sample is window stripped and wiped with isopropyl alcohol. The sample is mounted on a sample holder/alignment stage equipped with 10 mm×5 mm aluminum tabs to which the sample is glued. The two tabs are set so that the 10 mm length is laid horizontally with a 5 mm gap between two tabs. The fiber is laid horizontally on the sample holder across the tabs. The coated end of the fiber is positioned on one tab and extended halfway into the 5 mm space between the tabs and the stripped glass is positioned over the other half of the 5 mm gap and on the other tab. The sample is lined up and then moved out of the way so that a small dot of glue can be applied to the half of each tab closest to the 5 mm gap. The fiber is then brought back over the tabs and centered. The alignment stage is then raised until the glue just touches the fiber. The coated end is then pulled through the glue such that the majority of the sample in the 5 mm gap between the tabs is stripped glass. The very tip of the coated end is left extended beyond the glue on the tab so that the region to be measured is left exposed. The sample is left to dry. The length of fiber fixed to the tabs is trimmed to 5 mm. The coated length embedded in glue, the non-embedded length (between the tabs), and the end-face primary diameter are measured.

Measurements can be performed on an instrument such as a Rheometrics DMTA IV at a constant strain of $9e^{-6}$ Hz for a time of forty-five minutes at room temperature (~21° C.). The gauge length is 15 mm. Force and the change in length are recorded and used for the calculation of primary modulus. Samples are prepared by removing any epoxy from the tabs that would interfere with the 15 mm clamping length to insure there is no contact with the fiber and that the sample is secured squarely to the clamps. Once the instrument force is zeroed out, the non-coated end is mounted to the lower clamp (measurement probe). The tab containing the coated end of the fiber is mounted to the upper (fixed) clamp. The test is then executed and the sample is removed once the analysis is complete.

The in situ modulus $E_P$ of the primary coating may be 0.30 MPa or less, or 0.25 MPa or less, or 0.20 MPa or less, or 0.19 MPa or less, or 0.18 MPa or less, or 0.17 MPa or less, or 0.16 MPa or less, or 0.15 MPa or less, or between 0.01 MPa and 0.35 MPa, or between 0.01 MPa and 0.30 MPa, or between 0.01 MPa and 0.20 MPa.

The primary curable composition may also include polymerization initiators, antioxidants, and other additives familiar to the skilled artisan.

The polymerization initiator may facilitate initiation of the polymerization process associated with the curing of the primary composition to form the primary coating. Polymerization initiators may include thermal initiators, chemical initiators, electron beam initiators, and photoinitiators. For many (meth)acrylate-based coating formulations, photoinitiators such as ketonic photoinitiating additives and/or phosphine oxide additives may be employed. When used in the photoformation of the primary coating of the present disclosure, the photoinitiator may be present in an amount sufficient to provide rapid ultraviolet curing.

Suitable photoinitiators may include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl) diphenyl phosphine oxide (LUCIRIN TPO, available from BASF (Munich, Germany)); ethoxy(2,4,6-trimethylbenzoyl)-phenylphosphine oxide (LUCIRIN TPO-L from BASF); and combinations thereof.

The photoinitiator component of the primary curable composition may consist of a single photoinitiator or a combination of two or more photoinitiators. The total photoinitiator content of the primary curable composition may be up to about 10 wt %, or between about 0.5 wt % and about 6 wt %.

In addition to monomer(s), oligomer(s), and polymerization initiator(s), the primary curable composition may include other additives such as an adhesion promoter, a strength additive, a reactive diluent, an antioxidant, a catalyst, a stabilizer, an optical brightener, a property-enhancing additive, an amine synergist, a wax, a lubricant, and/or a slip agent. Some additives may operate to control the polymerization process, thereby affecting the physical properties (e.g., modulus, glass transition temperature) of the polymerization product formed from the primary curable composition. Other additives may affect the integrity of the polymerization product of the primary curable composition (e.g., protect against de-polymerization or oxidative degradation). For example, the primary curable composition may include a carrier, as described in U.S. Pat. Nos. 6,326,416 and 6,539,152, the disclosures of which are hereby incorporated by reference herein.

It may be desirable to include an adhesion promoter in the primary curable composition. An adhesion promoter is a compound that may facilitate adhesion of the primary coating and/or primary composition to the cladding. Suitable adhesion promoters include alkoxysilanes, organotitanates, and zirconates. Representative adhesion promoters include 3-mercaptopropyl-trialkoxysilane (e.g., 3-MPTMS, available from Gelest (Tullytown, Pa.)); bis(trialkoxysilyl-ethyl) benzene; acryloxypropyltrialkoxysilane (e.g., (3-acryloxypropyl)-trimethoxysilane, available from Gelest), methacryloxypropyltrialkoxysilane, vinyltrialkoxysilane, bis(trialkoxysilylethyl)hexane, allyltrialkoxysilane, styrylethyltrialkoxysilane, and bis(trimethoxysilylethyl)benzene (available from United Chemical Technologies (Bristol, Pa.)); see U.S. Pat. No. 6,316,516, the disclosure of which is hereby incorporated by reference in its entirety herein.

The adhesion promoter may be present in the primary composition in an amount between about 0.02 pph to about 10 pph, or between about 0.05 pph and 4 pph, or between about 0.1 pph to about 2 pph, or between about 0.1 pph to about 1 pph.

The primary coating composition may also include a strength additive, as described in U.S. Published Patent Application No. 2003/0077059, the disclosure of which is hereby incorporated by reference herein in its entirety. Representative strength additives include mercapto-functional compounds, such as N-(tert-butoxycarbonyl)-L-cysteine methyl ester, pentaerythritol tetrakis(3-mercaptopropionate), (3-mercaptopropyl)-trimethoxysilane; (3-mercaptopropyl) trimethoxysilane, and dodecyl mercaptan. The strength additive may be present in the primary curable composition in an amount less than about 1 pph, or in an amount less than about 0.5 pph, or in an amount between about 0.01 pph and about 0.1 pph.

A representative antioxidant is thiodiethylene bis[3-(3,5-di-tert-butyl)-4-hydroxyphenyl) propionate] (e.g., IRGANOX 1035, available from BASF).

It may be desirable to include an optical brightener in the primary curable composition. Representative optical brighteners include TINOPAL OB (available from BASF); Blankophor KLA (available from Bayer); bisbenzoxazole compounds; phenylcoumarin compounds; and bis(styryl) biphenyl compounds. The optical brightener may be present in the primary curable composition at a concentration of 0.005 pph-0.3 pph.

It may also be desirable to include an amine synergist in the primary curable composition. Representative amine synergists include triethanolamine; 1,4-diazabicyclo[2.2.2]octane (DABCO), triethylamine, and methyldiethanolamine. The amine synergist may be present at a concentration of 0.02 pph-0.5 pph.

The secondary coating may protect the fiber from mechanical damage and the external environment. The secondary coating may be formed from a curable secondary composition that includes one or more monomers. The monomers may include ethylenically unsaturated compounds. The curable secondary composition may also include one or more oligomers, one or more polymerization initiators, and one or more additives as described more fully herein.

Unless otherwise specified or implied herein, the weight percent (wt %) of a particular component in a curable secondary composition refers to the amount of the component present in the curable secondary composition on an additive-free basis. Generally, the weight percents of the monomer(s), oligomer(s), and initiator(s) sum to 100%. When present, the amount of an additive is reported herein in units of parts per hundred (pph) relative to the combined amounts of monomer(s), oligomer(s), and initiator(s). An additive present at the 1 pph level, for example, is present in an amount of 1 g for every 100 g of combined monomer(s), oligomer(s), and initiator(s).

In order to reduce cost, the oligomer content urethane oligomer content, or urethane acrylate oligomer content of the secondary composition may be minimized. Relative to the prevailing secondary compositions known in the art, the oligomer content, urethane oligomer content, or urethane acrylate oligomer content of the present secondary composition is particularly low. Oligomers, urethane oligomers, or urethane acrylate oligomers may be present as a minority component or completely absent from the secondary composition of the present disclosure. Oligomers, urethane oligomers, or urethane acrylate oligomers may be present in the secondary composition in an amount of about 3 wt % or less, or in an amount of about 2 wt % or less, or in an amount of about 1 wt % or less. The secondary composition may also be devoid of oligomers, urethane oligomers, or urethane acrylate oligomers.

The monomer component of the curable secondary composition may include one or more monomers. The one or more monomers may be present in the secondary composition in an amount of 50 wt % or greater, or in an amount from about 75 wt % to about 99 wt %, or in an amount from about 80 wt % to about 99 wt % or in an amount from about 85 wt % to about 98 wt %.

The monomer component of the curable secondary composition may include ethylenically unsaturated compounds. The ethylenically unsaturated monomers may be monofunctional or polyfunctional. The functional groups may be polymerizable groups and/or groups that facilitate or enable crosslinking. In combinations of two or more monomers, the constituent monomers may be monofunctional, polyfunctional, or a combination of monofunctional and polyfunctional compounds. Suitable functional groups for ethylenically unsaturated monomers include, without limitation, (meth)acrylates, acrylamides, N-vinyl amides, styrenes, vinyl ethers, vinyl esters, acid esters, and combinations thereof.

Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine;

alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4066, IGM Resins); acrylamides such as diacetone acrylamide, isobutoxymethyl acrylamide, N,N'-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is alkyl group with 7 or more carbons.

Many suitable monomers are either commercially available or readily synthesized using reaction schemes known in the art. For example, most of the above-listed monofunctional monomers can be synthesized by reacting an appropriate alcohol or amide with an acrylic acid or acryloyl chloride.

Representative polyfunctional ethylenically unsaturated monomers include, without limitation, alkoxylated bisphenol A diacrylates, such as ethoxylated bisphenol A diacrylate, with the degree of alkoxylation being 2 or greater. The monomer component of the secondary composition may include ethoxylated bisphenol A diacrylate with a degree of ethoxylation ranging from 2 to about 30 (e.g. SR349 and SR601 available from Sartomer Company, Inc. West Chester, Pa. and Photomer 4025 and Photomer 4028, available from IGM Resins), or propoxylated bisphenol A diacrylate with the degree of propoxylation being 2 or greater; for example, ranging from 2 to about 30; methylolpropane polyacrylates with and without alkoxylation such as ethoxylated trimethylolpropane triacrylate with the degree of ethoxylation being 3 or greater; for example, ranging from 3 to about 30 (e.g., Photomer 4149, IGM Resins, and SR499, Sartomer Company, Inc.); propoxylated-trimethylolpropane triacrylate with the degree of propoxylation being 3 or greater; for example, ranging from 3 to 30 (e.g., Photomer 4072, IGM Resins and SR492, Sartomer); ditrimethylolpropane tetraacrylate (e.g., Photomer 4355, IGM Resins); alkoxylated glyceryl triacrylates such as propoxylated glyceryl triacrylate with the degree of propoxylation being 3 or greater (e.g., Photomer 4096, IGM Resins and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, IGM Resins, and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with the degree of ethoxylation being 2 or greater; for example, ranging from about 2 to 30; epoxy acrylates formed by adding acrylate to bisphenol A diglycidylether and the like (e.g., Photomer 3016, IGM Resins); and single and multi-ring cyclic aromatic or non-aromatic polyacrylates such as dicyclopentadiene diacrylate and dicyclopentane diacrylate.

In addition to functioning as a polymerizable moiety, monofunctional monomers may also be included in the curable secondary composition for other purposes. Monofunctional monomer components may, for example, influence the degree to which the cured product absorbs water, adheres to other coating materials, or behaves under stress.

The secondary composition may or may not include an oligomeric component. As indicated hereinabove, if present, oligomers may be present as a minor constituent in the secondary composition. One or more oligomers may be present in the secondary composition. One class of oligomers that may be included in the secondary composition is ethylenically unsaturated oligomers. When employed, suitable oligomers may be monofunctional oligomers, polyfunctional oligomers, or a combination of a monofunctional oligomer and a polyfunctional oligomer. If present, the oligomer component of the secondary composition may include aliphatic and aromatic urethane (meth)acrylate oligomers, urea (meth)acrylate oligomers, polyester and polyether (meth)acrylate oligomers, acrylated acrylic oligomers, polybutadiene (meth)acrylate oligomers, polycarbonate (meth)acrylate oligomers, and melamine (meth)acrylate oligomers or combinations thereof. The secondary composition may be free of urethane groups, urethane acrylate compounds, urethane oligomers, or urethane acrylate oligomers.

The oligomeric component the secondary composition may include a difunctional oligomer. A difunctional oligomer may have a structure according to formula (I) below:

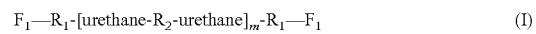

$$F_1-R_1-[\text{urethane-}R_2\text{-urethane}]_m-R_1-F_1 \quad (I)$$

where $F_1$ may independently be a reactive functional group such as acrylate, methacrylate, acrylamide, N-vinyl amide, styrene, vinyl ether, vinyl ester, or other functional group known in the art; $R_1$ may include, independently, $—C_{2-12}$ $O—$, $—(C_{2-4}—O)_n—$, $—C_{2-12}O—(C_{2-4}—O)_n—$, $—C_{2-12}$ $O—(CO—C_{2-5} O)_n—$, or $—C_{2-12} O—(CO—C_{2-5}—NH)_n—$ where n is a whole number from 1 to 30, including, for example, from 1 to 10; $R_2$ may be a polyether, polyester, polycarbonate, polyamide, polyurethane, polyurea, or combination thereof, and m is a whole number from 1 to 10, including, for example, from 1 to 5. In the structure of formula (I), the urethane moiety may be the residue formed from the reaction of a diisocyanate with $R_2$ and/or $R_1$. The term "independently" is used herein to indicate that each $F_1$ may differ from another $F_1$ and the same is true for each $R_1$.

The oligomer component of the curable secondary composition may include a polyfunctional oligomer. The polyfunctional oligomer may have a structure according to formula (II), formula (III), or formula (IV) set forth below:

$$\text{multiurethane-}(F_2-R_1-F_2)_x \quad (II)$$

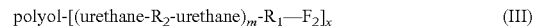

$$\text{polyol-}[(\text{urethane-}R_2\text{-urethane})_m-R_1-F_2]_x \quad (III)$$

$$\text{multiurethane-}(R_1-F_2)_x \quad (IV)$$

where $F_2$ may independently represent from 1 to 3 functional groups such as acrylate, methacrylate, acrylamide, N-vinyl amide, styrene, vinyl ether, vinyl ester, or other functional groups known in the art; $R_1$ can include $—C_{2-12} O—$, $—(C_{2-4} O)_n—$, $—C_{2-12} O—(C_{2-4}—O)_n—$, $—C_{2-12}$ $O—(CO—C_{2-5} O)_n—$, or $—C_{2-12} O—(CO—C_{2-5}—NH)_n—$ where n is a whole number from 1 to 10, including, for example, from 1 to 5; $R_2$ may be polyether, polyester, polycarbonate, polyamide, polyurethane, polyurea or combinations thereof, x is a whole number from 1 to 10, including, for example, from 2 to 5; and m is a whole number from 1 to 10, including, for example, from 1 to 5. In the structure of formula (II), the multiurethane group may be the residue formed from reaction of a multiisocyanate with $R_2$. Similarly, the urethane group in the structure of formula (III) may be the reaction product formed following bonding of a diisocyanate to $R_2$ and/or $R_1$.

Urethane oligomers may be prepared by reacting an aliphatic or aromatic diisocyanate with a dihydric polyether or polyester, most typically a polyoxyalkylene glycol such as a polyethylene glycol. Moisture-resistant oligomers may be synthesized in an analogous manner, except that polar polyethers or polyester glycols are avoided in favor of predominantly saturated and predominantly nonpolar aliphatic diols. These diols may include alkane or alkylene diols of from about 2-250 carbon atoms that may be substantially free of ether or ester groups.

Polyurea elements may be incorporated in oligomers prepared by these methods, for example, by substituting diamines or polyamines for diols or polyols in the course of synthesis. The presence of minor proportions of polyureas in the secondary coating composition is not considered detrimental to coating performance, provided that the diamines or polyamines employed in the synthesis are sufficiently non-polar and saturated as to avoid compromising the moisture resistance of the system.

The secondary coating compositions may also contain a polymerization initiator to facilitate polymerization (curing) of the secondary composition after its application to a glass fiber or a glass fiber previously coated with a primary or other layer. Polymerization initiators suitable for use in the compositions of the present invention may include thermal initiators, chemical initiators, electron beam initiators, microwave initiators, actinic-radiation initiators, and photoinitiators. For many acrylate-based coating formulations, photoinitiators, such as the known ketonic photoinitiating and/or phosphine oxide additives, may be used. When used in the compositions of the present invention, the photoinitiator may be present in an amount sufficient to provide rapid ultraviolet curing. The photoinitiator may be present in an amount ranging from about 0.5 wt % to about 10 wt %, or from about 1.5 wt % to about 7.5 wt %, or in an amount of about 3 wt %.

The amount of photoinitiator may be adjusted to promote radiation cure to provide reasonable cure speed without causing premature gelation of the coating composition. A desirable cure speed may be a speed sufficient to cause curing of the coating composition of greater than about 90%, or greater than 95%). As measured in a dose versus modulus curve, a cure speed for coating thicknesses less than about 75 microns may be, for example, less than 1.0 J/cm² or less than 0.5 J/cm².

Suitable photoinitiators may include, without limitation, 2,4,6-trimethylbenzoyl-diphenylphosphine oxide (e.g. Lucirin TPO); 1-hydroxycyclohexylphenyl ketone (e.g. Irgacure 184 available from BASF); (2,6-diethoxybenzoyl)-2,4,4-trimethylpentyl phosphine oxide (e.g. in commercial blends Irgacure 1800, 1850, and 1700, BASF); 2,2-dimethoxyl-2-phenyl acetophenone (e.g., Irgacure, 651, BASF); bis(2,4,6-trimethylbenzoyl)phenyl phosphine oxide (e.g., Irgacure 819, BASF); (2,4,6-triiethylbenzoyl)diphenyl phosphine oxide (e.g., in commercial blend Darocur 4265, BASF); 2-hydroxy-2-methyl-1-phenylpropane-1-one (e.g., in commercial blend Darocur 4265, BASF) and combinations thereof.

In addition to the above-described components, the secondary coating composition of the present invention may optionally include an additive or a combination of additives. Representative additives include, without limitation, antioxidants, catalysts, lubricants, low molecular weight non-crosslinking resins, adhesion promoters, and stabilizers. Additives may operate to control the polymerization process, thereby affecting the physical properties (e.g., modulus, glass transition temperature) of the polymerization product formed from the composition. Additives may affect the integrity of the polymerization product of the composition (e.g., protect against de-polymerization or oxidative degradation).

The secondary composition may include thiodiethylene bis(3,5-di-tert-butyl)-4-hydroxyhydrocinnamate (e.g., Irganox 1035, available from BASF) as an antioxidant. The secondary composition may include an acrylated acid adhesion promoter (such as Ebecryl 170 (available from UCB Radcure (Smyrna Ga.)). Other suitable materials for use in secondary coating materials, as well as considerations related to selection of these materials, are well known in the art and are described in U.S. Pat. Nos. 4,962,992 and 5,104,433, the disclosures of which are hereby incorporated by reference.

Even with low oligomer content, the present secondary compositions may result in a secondary coating material having high tensile strength and a high modulus of elasticity (Young's modulus). The secondary coating may have a higher modulus of elasticity and higher glass transition temperature than the primary coating. As used herein, in situ modulus of the secondary coating is the modulus measured by the technique described below.

Secondary In Situ Elastic Modulus

The secondary in situ elastic modulus $E_S$ is measured using fiber tube-off samples. To obtain a fiber tube-off sample, a 0.0055 inch Miller stripper is first clamped down approximately 1 inch from the end of the coated fiber. The one-inch region of fiber extending from the stripper is plunged into a stream of liquid nitrogen and held for 3 seconds. The fiber is then removed from the stream of liquid nitrogen and quickly stripped. The stripped end of the fiber is inspected to insure that the coating is removed. If coating remains on the glass, the sample is prepared again. The result is a hollow tube of primary and secondary coatings. The diameters of the glass, primary coating and secondary coating are measured from the end-face of the unstripped fiber.

To measure secondary in situ modulus, fiber tube-off samples can be run with an instrument such as a Rheometrics DMTA IV instrument at a sample gauge length 11 mm. The width, thickness, and length of the sample are determined and provided as input to the operating software of the instrument. The sample is mounted and run using a time sweep program at ambient temperature (21° C.) using the following parameters:
Frequency: 1 Rad/sec
Strain: 0.3%
Total Time=120 sec.
Time Per Measurement=1 sec
Initial Static Force=15.0 [g]
Static >Dynamic Force by=10.0 [%]

Once completed, the last five E' (storage modulus) data points are averaged. Each sample is run three times (fresh sample for each run) for a total of fifteen data points. The averaged value of the three runs is reported as the secondary in situ modulus.

The tensile strength of the polymerization product of the secondary composition of the present disclosure, when prepared in the form of cured rods, may be at least 50 MPa. When measured on cured coating rods at room temperature (~21° C.), the modulus of elasticity of the cured product of the secondary composition may be in the range from about 1400 MPa to about 2200 MPa, or in the range from about 1700 MPa to about 2100 MPa, or in the range from about 1600 MPa to about 3000 MPa. The in situ modulus of elasticity of the secondary coating may be 1200 MPa or greater, or 1500 MPa or greater, or 1800 MPa or greater, or 2100 MPa or greater, or 2400 MPa or greater, or 2700 MPa or greater.

Young's Modulus, Tensile Strength and % Elongation at Break

Coating compositions are prepared in the form of rod samples for tensile testing. Rods are prepared by injecting the curable compositions into Teflon® tubing having an inner diameter of about 0.025". The rod samples are cured using a Fusion D bulb at a dose of about 2.4 J/cm$^2$ (measured over a wavelength range of 225-424 nm by a Light Bug model IL390 from International Light). After curing, the Teflon® tubing is stripped away to provide rod samples of the coating composition. The cured rods were allowed to condition overnight at 23° C. and 50% relative humidity. Properties such as Young's modulus, tensile strength, and % elongation at break are measured using a tensile testing instrument (e.g., a Sintech MTS Tensile Tester, or an Instron Universal Material Test System) on defect-free rod samples with a gauge length of 51 mm, and a test speed of 250 mm/min. The properties are determined as an average of at least five samples, with defective samples being excluded from the average.

High modulus secondary coatings may offer better protection of the fiber against mechanical damage and better microbend performance. However, high speed processing of high modulus secondary coatings in the draw tower may be a challenge because of an increased tendency to of the draw process to generate defects such as flat spots and wind induced point defects (WIPD) in the secondary coating that ultimately compromise fiber performance.

During the development of oligomer-free coatings urethane-oligomer-free coatings and urethane-acrylate-oligomer-free coatings, it was found that removal of the oligomer from the formulation, without modifying other components, may result in a secondary coating with a modulus of higher than 2000 MPa. Such secondary coatings that may be difficult to process at high speeds in the draw tower. Accordingly, it may be desirable to compensate for the effect of removing the oligomer by formulating the secondary composition to include monomers with long flexible (e.g. ethoxylated) chains between functional groups. Long flexible chains may increase the distance between crosslinks, may decrease the crosslink density and may ultimately lower the modulus of the cured secondary coating. A potential drawback of such monomers is that they may have a lower glass transition temperature (Tg) and may tend to decrease the Tg of the cured secondary coating. Secondary coatings with low Tg may not be desirable because a low Tg may result in a material that is too soft at the time of application and may lead to defects during processing at high speed. Higher Tg secondary coatings may be harder at room temperature and may provide better mechanical protection to the optical fiber. If the Tg is too high, however, the coating may be sufficiently stiff to make the fiber more prone to defects during processing.

The secondary coating of the present disclosure may be designed to achieve a secondary coating with moderate Tg that imparts adequate mechanical protection and bend insensitivity to the optical fiber while still allowing the fiber to be processed defect-free in high speed draw towers. Tg can be measured using the technique that is now described.

Glass transition temperatures are measured using samples in the form of cured films (primary coating) or rods (secondary coating) formed from the coating composition. Glass transition temperatures are measured by determining the peak of the tan δ curves obtained from an instrument such as a Rheometrics DMTA IV in tension. The width, thickness, and length of the sample are input to the "Sample Geometry" section of the program. The sample is mounted and then cooled to approximately −85° C. Once stable, a temperature ramp is run using the following parameters:
Frequency: 1 Hz
Strain: 0.3%
Heating Rate: 2° C./min.
Final Temperature: 150° C.
Initial Static Force=20.0 [g]
Static >Dynamic Force by=10.0 [%]

Tg is defined as the maximum of the tan δ peak, where the tan δ peak is defined as:

$$\tan \delta = E''/E'$$

where E" is the loss modulus, which is proportional to the loss of energy as heat in a cycle of deformation and E' is the storage or elastic modulus, which is proportional to the energy stored in a cycle of deformation.

The Tg of cured rods prepared from the cured product of the secondary coating composition may be at least about 50° C. The glass transition temperature of the secondary coating may be at least 50° C., or at least 55° C., or at least 60° C., or between 55° C. and 65° C.

The secondary composition may be devoid of an oligomeric component, a urethane oligomeric component, or a urethane-acrylate oligomeric component, and the monomeric component may include ethoxylated(4) bisphenol-A diacrylate monomer, ethoxylated(30) bisphenol-A diacrylate monomer, and epoxy diacrylate monomer. The ethoxylated (4) bisphenol-A diacrylate monomer may be present in an amount ranging from about 50 wt % to about 90 wt %, or from about 60 wt % to about 80 wt %, or and from about 70 wt % to about 75 wt %. The ethoxylated(30) bisphenol-A diacrylate monomer may be present in an amount ranging from about 5 wt % to about 20 wt %, or from about 7 wt % to about 15 wt %, or from about 8 wt % to about 12 wt %. The epoxy diacrylate monomer may be present in an amount of ranging from about 5 wt % to about 25 wt, or from about 10 wt % to about 20 wt %, or from about 12 wt % to about 18 wt %.

The secondary composition may be devoid of an oligomeric component, a urethane oligomeric component, or a urethane-acrylate oligomeric component, and the monomeric component may include ethoxylated(4) bisphenol-A diacrylate monomer, ethoxylated(10) bisphenol-A diacrylate monomer, and epoxy diacrylate monomer. The ethoxylated (4) bisphenol-A diacrylate monomer may be present in an amount ranging from about 30 wt % to about 80 wt %, or from about 40 wt % to about 70 wt %, or from about 50 wt % to about 60 wt %. The ethoxylated(10) bisphenol-A diacrylate monomer may be present in an amount ranging from about 10 wt % to about 50 wt %, or from about 20 wt % to about 40 wt %, or from about 25 wt % to about 35 wt %. The epoxy diacrylate monomer may be present in an amount ranging from about 5 wt % to about 25 wt %, or from about 10 wt % to about 20 wt %, or from about 12 wt % to about 18 wt %.

The secondary composition may be devoid of an oligomeric component, a urethane oligomeric component, or a urethane-acrylate oligomeric component, and the monomeric component may include ethoxylated(4) bisphenol-A diacrylate monomer, ethoxylated(10) bisphenol-A diacrylate monomer, ethoxylated(30) bisphenol-A diacrylate monomer, and epoxy diacrylate monomer. The ethoxylated(4) bisphenol-A diacrylate monomer may be present in an amount ranging from about 40 wt % to about 80 wt %, or from about 60 wt % to about 70 wt %. The ethoxylated(10) bisphenol-A diacrylate monomer may be present in an amount ranging from about 1 wt % to about 30 wt %, or from about 5 wt % to about 10 wt %. The ethoxylated(30) bisphenol-A diacrylate monomer may be present in an amount ranging from about 5 wt % to about 20 wt %, or in an amount of about 10 wt %. The epoxy diacrylate monomer may be present in an amount ranging from about 5 wt % to about 25 wt %, or in an amount of about 15 wt %.

The secondary composition may be devoid of an oligomeric component, a urethane oligomeric component, or a urethane-acrylate oligomeric component, and the monomeric component may include ethoxylated (10) bisphenol A diacrylate monomer, tripropylene glycol diacrylate monomer, ethoxylated (4) bisphenol A diacrylate monomer, and epoxy diacrylate monomer. The ethoxylated (10) bisphenol A diacrylate monomer may be present in an amount ranging from about 10 wt % to about 50 wt %. The tripropylene glycol diacrylate monomer may be present in an amount from about 5 wt % to about 40 wt %. The ethoxylated (4) bisphenol A diacrylate monomer may be present in an amount from about 10 wt % to about 55 wt %. The epoxy diacrylate monomer may be present in an amount up to about 15 wt %.

The secondary composition may comprise from about 40 wt % to about 80 wt % of ethoxylated (4) bisphenol A monomer, from about 0 wt % to about 30% of ethoxylkated (10) bisphenol A monomer, from about 0 wt % to about 25% wt % of ethoxylated (30) bisphenol A monomer, from about 5 wt % to 18 wt % of epoxy acrylate, from about 0 wt % to 10 wt % of tricyclodecane dimethanoldiacrylate monomer, from about 0.1 wt % to 40% of one or more photoinitiators, from about 0 pph to 5 pph by weight of slip additive; and from 0 pph to about 5 pph by weight of an antioxidant. The secondary composition may further comprise 3% or less oligomer, or 1% or less oligomer, or may be devoid of oligomer. The epoxy acrylate may be an epoxy acrylate monomer. The epoxy acrylate may be bisphenol A epoxy diacrylate. The epoxy acrylate may be an unmodified epoxy acrylate, for example an epoxy acrylate which is not modified with fatty acid, amine, acid, or aromatic functionality. Such compositions may have a viscosity at 45° C. of at least about 3 Poise and when cured, may exhibit a Young's modulus of from about 1400 MPa to about 2100 MPa. The compositions may exhibit a glass transition temperature of at least about 55° C. The monomeric component may include an alkoxylated bisphenol A diacrylate monomer having at least 10 alkoxy groups.

The primary and secondary curable compositions may be applied to the glass portion of the coated fiber after it has been drawn from the preform. The primary and secondary compositions may be applied immediately after cooling. The curable compositions may then be cured to produce the coated optical fiber. The method of curing may be thermal, chemical, or radiation induced, such as by exposing the applied curable composition on the glass fiber to ultraviolet light, actinic radiation, microwave radiation, or an electron beam, depending upon the nature of the coating composition(s) and polymerization initiator being employed. It may be advantageous to apply both a primary curable composition and a secondary curable composition in sequence following the draw process. Methods of applying dual layers of curable compositions to a moving glass fiber are disclosed in U.S. Pat. Nos. 4,474,830 and 4,585,165, the disclosures of which are hereby incorporated by reference herein. The primary curable composition may alternatively be applied and cured to form the primary coating material before applying and curing the secondary curable composition to form the secondary coating.

Example Fibers

Various example coated fibers 10 in accordance with the present disclosure are now described and modeled to illustrate one or more advantageous features disclosed herein.

The coated fibers 10 modeled for these examples included a glass fiber with a diameter of 125 microns, but the results are equally applicable to glass fibers with diameters of 90 microns or smaller. The core of the glass fiber had a radius ranging between 3.6 to 5.4 microns and may be made by modifying silica with $GeO_2$ to increase the index of the core relative to the cladding. The cladding surrounded the core, extended to a radius of 62.5 microns and included an inner cladding region and an outer cladding region where the inner cladding region had a lower index than the outer cladding. The lower index of the inner cladding region relative to the outer cladding may be achieved by doping the inner cladding with the downdopant fluorine. Alternatively, the higher index of the outer cladding region relative to the inner cladding region may be achieved by doping the outer cladding with updopants such as chlorine, germania, alumina, titania, silicon oxynitride, phosphorus, etc. Exemplary refractive index profiles will be discussed more fully hereinbelow.

Representative curable compositions A-H for the primary coating are shown in Table II below.

TABLE II

| Illustrative Primary Coating Compositions | | | | | | | | |
|---|---|---|---|---|---|---|---|---|
| Component | A | B | C | D | E | F | G | H |
| Photomer 4066 (wt %) | 41.5 | 0 | 61.5 | 41.5 | 46.5 | 46.5 | 45.5 | 47 |
| Photomer 4960 (wt %) | 0 | 41.5 | 0 | 0 | 0 | 0 | 0 | 0 |
| BR3741 (wt %) | 55 | 55 | 35 | 55 | 50 | 50 | 50 | 50 |
| N-vinyl caprolactam (wt %) | 2 | 2 | 2 | 2 | 2 | 2 | 2 | 1.5 |
| TPO (wt %) | 1.5 | 1.5 | 1.5 | 1.5 | 1.5 | 1.5 | 2.5 | 1.5 |
| (3-acryloxypropyl) trimethoxysilane (pph) | 1 | 1 | 1 | 1 | 1 | 0.8 | 0.8 | 0.8 |
| Irganox 1035 (pph) | 1 | 1 | 1 | 1 | 1 | 1 | 1 | 1 |
| Pentaerythritol mercaptopropionate (pph) | 0.03 | 0.03 | 0.03 | 0.03 | 0.03 | 0.03 | 0.03 | 0.03 |
| Uvitex OB (pph) | 0.05 | 0 | 0 | 0 | 0 | 0 | 0 | 0 |

Photomer 4066 is an ethoxylated nonyl phenol acrylate available from IGM Resins. Photomer 4960 is a propoxylated nonyl phenol acrylate available from IGM Resins. BR3741 is an aliphatic polyether urethane acrylate oligomer available from Dymax Oligomers and Coatings. N-vinyl caprolactam is available from ISP Technologies, Inc. TPO ((2,4,6-trimethylbenzoyl)diphenyl phosphine oxide) is a photoinitiator available from BASF. (3-acryloxypropyl) trimethoxysilane is an adhesion promoter available from Gelest. IRGANOX 1035 ((thiodiethylene bis[3-(3,5-di-tert-butyl)-4-hydroxyphenyl) propionate]) is an antioxidant available from BASF. Pentaerythritol mercaptopropionate is an adhesion promoter stabilizer available from Aldrich. UVITEX OB ($C_{26}H_{26}N_2O_2S$, CAS No. 7128-64-5) is an optical brightener available from BASF.

To prepare the primary composition, the oligomer and monomer(s) may be blended together for at least 10 minutes at 60° C. Photoinitiator(s) and additives may then be added, and blending may be continued for one hour. Finally, the adhesion promoter may be added, and blending may be continued for 30 minutes. The resulting solution may then be applied to the glass portion of the fiber and UV-cured to form a primary coating.

Representative curable compositions J-L for the secondary coating are shown in Table II below.

TABLE III

| Illustrative Secondary Coating Compositions | | | |
|---|---|---|---|
| Component | J | K | L |
| SR601/Photomer4028 (wt %) | 72 | 52 | 72 |
| CD9038 (wt %) | 10 | 0 | 10 |
| Photomer3016 (wt %) | 15 | 15 | 15 |
| SR602 (wt %) 30 wt % | 0 | 30 | 0 |
| Irgacure 184 (wt %) | 1.5 | 1.5 | 1.5 |
| TPO (wt %) | 1.5 | 1.5 | 1.5 |
| DC190 Fluid slip additive (pph) | 0 | 0 | 1 |
| Irganox 1035 (pph) | 0.5 | 1 | 1 |

SR601/Photomer 4028 is an ethoxylated (4)bisphenol A diacrylate monomer available from Sartomer or IGM Resins. CD9038 is an ethoxylated (30)bisphenol A diacrylate monomer available from Sartomer. Photomer 3016 is an epoxy diacrylate monomer available from IGM Resins. SR602 is an ethoxylated (10)bisphenol A diacrylate monomer available from Sartomer. IRGACURE 184 (1-hydroxy-cyclohexylphenyl ketone) is a photoinitiator available from BASF. TPO ((2,4,6-trimethylbenzoyl)-diphenyl phosphine oxide) is a photoinitiator available from BASF. DC190 is a fluid slip additive available from Dow Corning. IRGANOX 1035 (thiodiethylene bis(3,5-di-tert-butyl)-4-hydroxyhydrocinnamate) is an antioxidant available from BASF.

Secondary compositions may be prepared with the listed components using commercial blending equipment. The monomer components may be weighed, introduced into a heated kettle, and blended together at a temperature within the range of from about 50° C. to 65° C. Blending may then be continued until a homogenous mixture is obtained. Next, the photoinitiator may be weighed and introduced into the homogeneous solution while blending. Finally, the remaining components may be weighed and introduced into the solution while blending. Blending may be continued until a homogeneous solution is again obtained. The homogeneous solution may then be applied to the primary coating or primary composition of the fiber and cured with UV radiation to form a secondary coating.

Two coated fibers embodiments 10 (fiber 10A, Example A and fiber 10B, Example B) having properties consistent with the coatings achievable by curing the primary and secondary compositions listed in Tables II and III were manufactured and then evaluated. The schematic cross-section of these coated fibers is shown in FIG. 2B. The manufactured (example A and B) fibers include a core 70, a cladding 80, a primary coating 90 and a secondary coating 100. Cladding 80 includes first inner cladding region 81, second inner cladding region 83, and outer cladding region 85. Example A fiber 10B includes a core 70 with core radius $r_1$=4.7 microns, a glass cladding 80 with an outer diameter $2r_4$ of about 72 microns, a primary coating 90 with an outer diameter of $2r_5$ of about 125 microns, and secondary coating 100 with an outer diameter $2r_6$=of 155 microns. The core was updoped with germania, the first inner cladding was comprised of essentially pure silica, the second inner cladding was downdoped with fluorine, and the outer cladding was comprised of essentially pure silica. Other parameters of example 1 fiber are as follows:

$\Delta_{1MAX}$=0.38%
$r_2$=9.25 microns
$r_3$=14.62 microns
$\Delta_{3MIN}$=−0.42%
$V_3$=−52.4%-sq. microns The measured relative refractive index profile plot (expressed as Δ% relative to pure silica) for the core and cladding of the Example A fiber is shown in FIG. 5

An example fiber includes a core 70 with core radius $r_1$=of 5.2 microns, a glass cladding 80 with an outer diameter $2r_4$=80 microns, a primary coating 90 with an outer diameter of $2r_5$=125 microns, and secondary coating 100 with an outer diameter $2r_6$=of 155 microns. The core was updoped with germania, the first inner cladding was comprised of essentially pure silica, the second inner cladding was downdoped with fluorine, and the outer cladding was comprised of essentially pure silica.

The measured refractive index profile of the Example B fiber 10B is shown in FIG. 6, which shows the aforementioned centerline dip at r=0. Other parameters of example 2C fiber are as follows:

$\Delta_{1MAX}$=0.38%
$r_2$=10.36 microns
16.47 microns
$\Delta_{3MIN}$=−0.42%
$V_3$=−66.9%-sq. microns The relative refractive index profile plot (expressed as Δ% relative to pure silica) for the core and cladding of the Example B fiber 10B is shown in FIG. 6.

Table IV depicts measured parameters/attributes of the manufactured fiber embodiments according to examples A and B.

TABLE IV

| Fiber Performance Data. | | |
|---|---|---|
| Measured Attribute | Example A fiber (10A) | Example B fiber (10B) |
| Total Length (m) | 20000 | 15075 |
| Average Core-Clad Concentricity (microns) | 0.08 | 0.09 |
| Cladding Diameter (microns) | 71.84 ± 0.04 | 80.37 ± 0.06 |
| MFD 1310 (microns) | 8.52 | 8.80 |
| MFD 1550 (microns) | 9.59 | 9.89 |
| Fiber cutoff wavelength (nm) | 1168 | 1309 |
| Attenuation at 1310 nm (dB/km) | 0.393 | 0.372 |
| Attenuation at 1550 nm (dB/km) | 0.467 | 0.227 |
| Attenuation at 1625 nm (dB/km) | 0.908 | 0.248 |

TABLE IV-continued

Fiber Performance Data.

| Measured Attribute | Example A fiber (10A) | Example B fiber (10B) |
|---|---|---|
| 1x10mm macrobend at 1300 nm (dB/turn) | 0.041 | 0.02 |
| 1x10mm macrobend at 1550 nm (dB/turn) | 0.24 | 0.1 |
| 1x10mm macrobend at 1625 nm (dB/turn) | 0.3 | 0.19 |

Figure 7A:
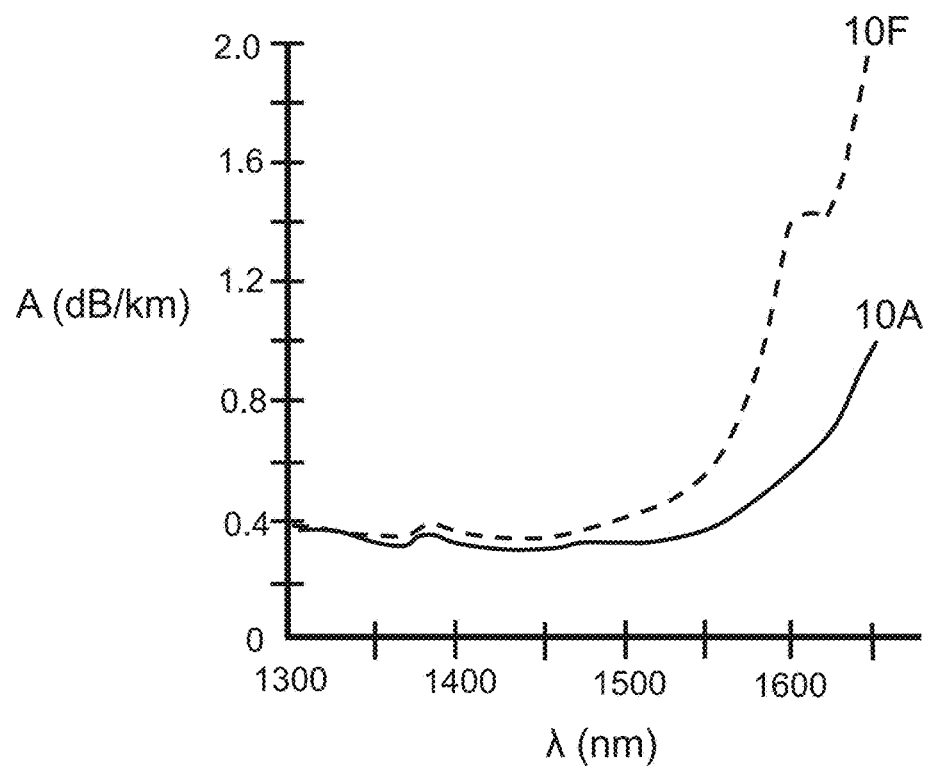
FIG. 7A depicts a measured optical attenuation A (db/km) vs. wavelength λ (nm) for the example optical fiber (10A) corresponding to FIG. 5, and for a comparative fiber (10F).

FIG. 7A depicts attenuation Δ (dB/km) vs. wavelength λ (nm) for the Example A fiber (fiber 10A) embodiment and for a comparative fiber 10F. The comparative fiber 10F had the following parameters: core having a step index profile, $\Delta_{1MAX}$=0.35% and a core radius of 4.7 microns, a cladding diameter of 80.0 microns, a primary coating diameter of 110 microns, and a secondary coating diameter of 165 microns. This fiber 10F has a MFD at 1310 nm wavelength of 9 microns, and a fiber cutoff wavelength of 1200 nm. The attenuation was measured with the fibers deployed on shipping spools. FIG. 7A illustrates that the example A fiber 10A provides significantly better performance (lower attenuation) for all wavelengths between 1325 and 1650 nm, and far better performance at wavelengths between 1550 to 1650 nm.

Figure 7B:
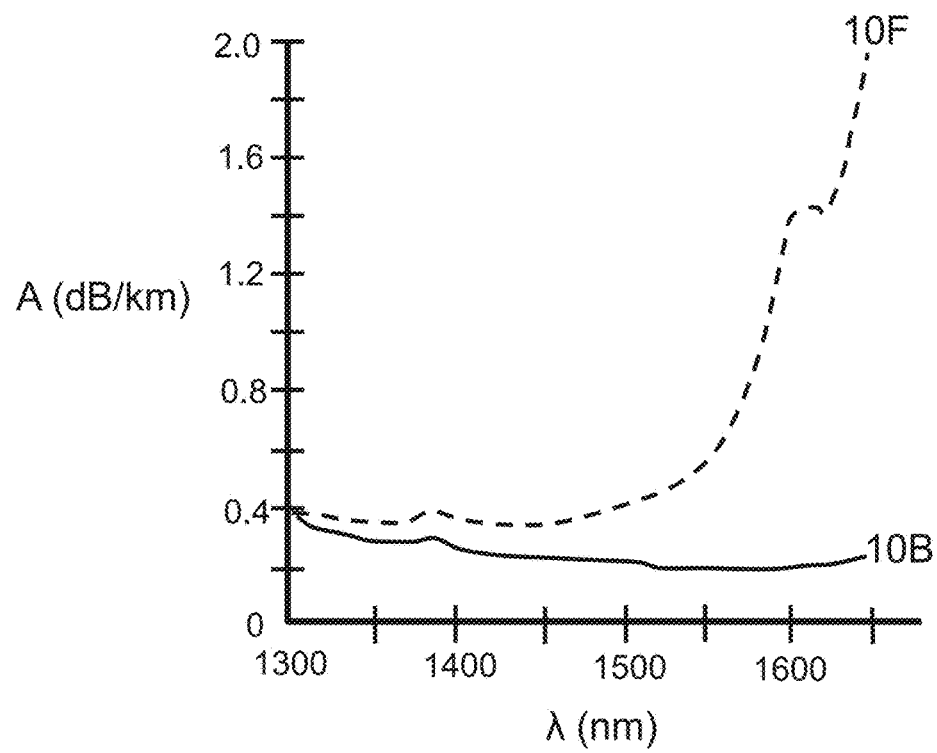
FIG. 7B depicts the measured attenuation A (dB/km) vs. wavelength λ (nm) for the example fiber (10B) corresponding to FIG. 6, and for the same comparative fiber (10F) shown in FIG. 7A.

FIG. 7B depicts the attenuation Δ (dB/km) vs. wavelength λ (nm) for the Example B fiber embodiment (fiber 10B) and for the comparative fiber 10F described above. FIG. 7B illustrates that example B fiber 10B provides significantly better performance (lower attenuation) for all wavelengths between 1325 and 1650 nm, and far better performance at wavelengths between 1450 nm to 1650 nm.

Figure 8:
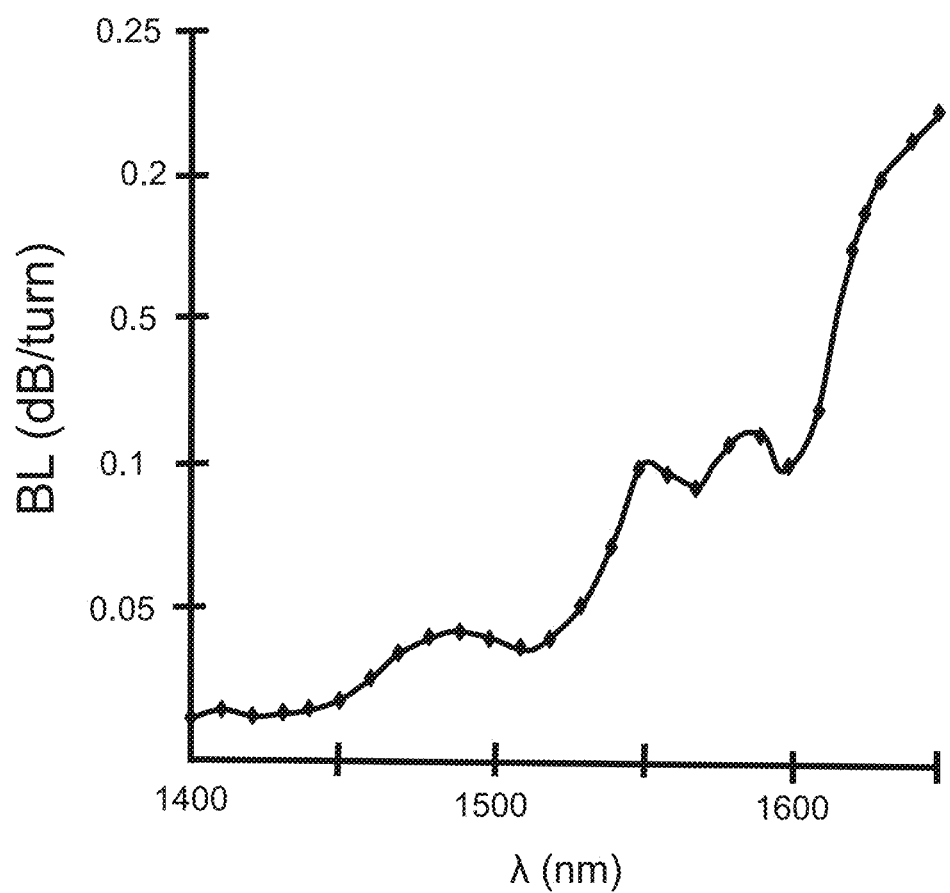
FIG. 8 is a plot of the measured macrobend induced loss BL (dB/turn) versus wavelength λ (nm) when the example fiber corresponding to FIG. 6 was wrapped around a mandrel with a diameter of 10 mm.

FIG. 8 illustrates macrobend induced loss BL (dB/turn) vs. wavelength λ (nm) for the example B fiber 10B described above. The macrobend induced loss was measured when the example B fiber was wrapped two times around a mandrel having a diameter of 10 mm. The measured macrobend-induced attenuation is 0.1 dB/turn at a wavelength of 1550 nm and 0.19 dB/turn at a wavelength of 1625 nm.

High-Density Optical Fiber Cable Ribbon Cable Interconnect

Figure 9:
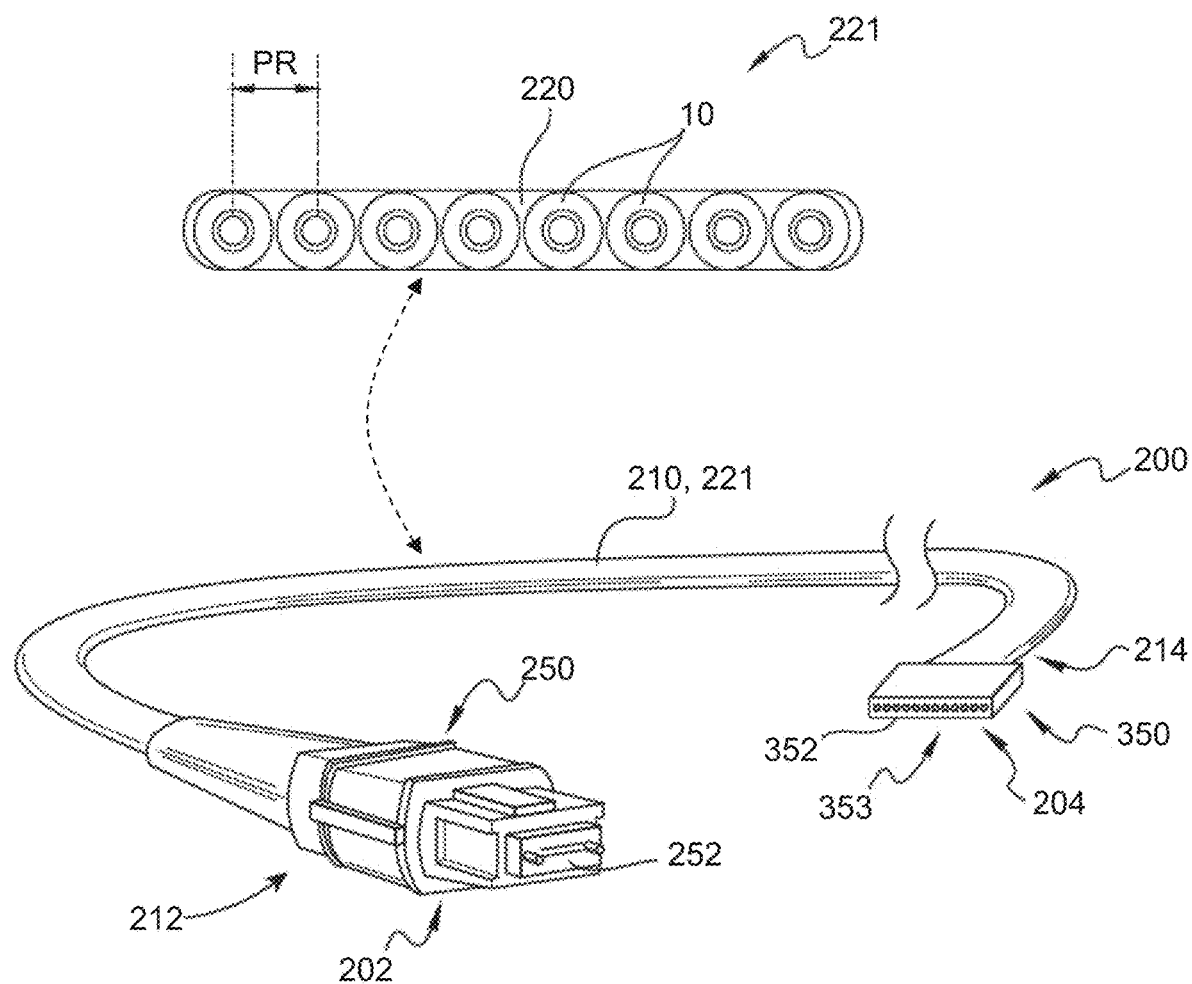
FIG. 9 is a perspective view of an example high-density optical fiber ribbon cable interconnect that includes a ribbon cable that carries the fibers disclosed herein, with the ribbon cable terminated at one end by a standard optical fiber connector and at the other end by a high-density optical fiber connector.

FIG. 9 is an elevated view of an example high-density optical fiber ribbon cable interconnect ("ribbon cable interconnect") 200 that employs the fibers 10 disclosed herein. The ribbon cable interconnect 200 has a first end 202 and a second end 204 and comprises a ribbon cable 210 constituted by at least one fiber ribbon 221 having a first end 212 adjacent the first end 202 and a second end 214 adjacent the second end 204. The fiber ribbon 221 has an outer jacket 220, as shown in the close-up inset. The outer jacket 220 can be formed of a polymer and can comprise one or more layers (e.g., matrix layers).

As best seen in the close-up inset of FIG. 9, the fiber ribbon 221 comprises a plurality of the fibers 10 disclosed herein. In one example, the fiber ribbon 221 comprises multiples of 8 small diameter fibers 10, e.g., 8, 12, 16, 24, etc. Portions of the outer jacket 220 can be removed to expose one or more of the fibers 10 (e.g., end sections 16), so that in an example, the outer jacket 220 surrounds the fibers 10 except for one or more select sections. In such an embodiment, the fiber ribbon 221 can comprise one or more bonded sections that include the outer jacket 220 and one or more unbonded sections that do not include the outer jacket 220 or that do not include the entire outer jacket 220 (e.g., less than all matrix layer(s)). The fibers 10 in the fiber ribbon 221 have a period PR, as shown in the close-up inset of FIG. 9.

In examples, one or more fiber ribbons 221 are used to form the ribbon cable 210. Example configurations of ribbon cables that can be formed using one or more fiber ribbons 221 are disclosed in U.S. Pat. No. 9,389,382 B2, entitled "fiber optic ribbon cable and ribbon," which is incorporated by reference herein. In some applications, it may be advantageous to use the one or more fiber ribbons 221 to form a ribbon cable 210, such as when an optical connection needs to be made over a substantial distance that could put the one or more fiber ribbons at risk.

With continuing reference to FIG. 9, the first end 212 of the fiber ribbon 221 or ribbon cable 210 is terminated by a first optical fiber connector ("first connector") 250, which defines the first end 202 of the ribbon cable interconnect 200. The first connector 250 has an end face ("connector end face") 252. In an example, the first connector 250 comprises a standard optical fiber connector, such an MPO connector. The second end 214 of the ribbon 221 or ribbon cable 221 is terminated by a second connector 350 having a connector end face 352. An example of a high-density second connector 350 based on a fiber array unit (FAU) is described in greater detail below.

Fiber Array Unit (FAU)

Figure 10A:
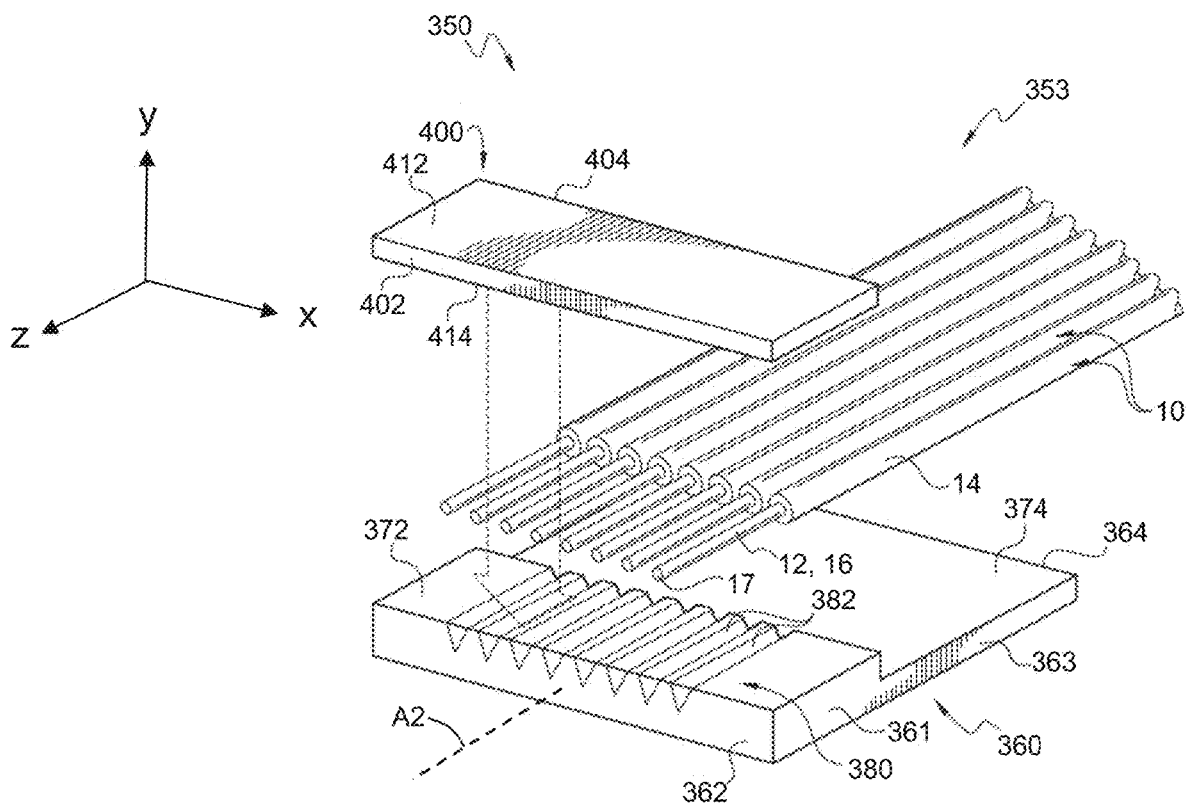
FIG. 10A is an exploded perspective view of an example method of forming a high-density FAU using the fibers disclosed herein.

FIG. 10A is an exploded front elevated view of an example method of forming a high-density FAU ("FAU") 353. The FAU 353 includes a support substrate 360 having a front-end section 361 with a front end 362, a back-end section 363 with a back end 364, and a central axis $\Delta_2$ that runs in the z-direction. The front-end section 361 has a substantially planar top surface 372 while the back-end section 363 has a substantially planar top surface 374. In an example, the top surface 372 of the front-end section 361 is elevated relative to the top surface 374 of the back-end section 363. The front-end section 361 includes an array 380 of grooves 382 formed in the planar top surface 372 and that run parallel to the central axis $\Delta_2$. In an example, the grooves 382 are V-grooves as shown. In an example, the support substrate 360 is made of glass, such as silica glass.

Figure 10B:
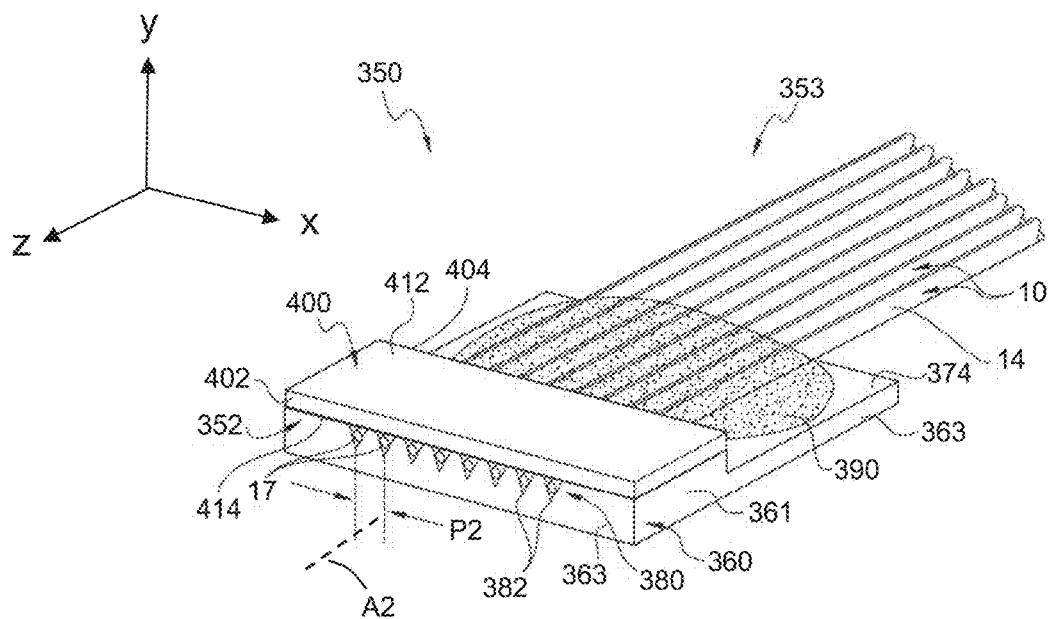
FIG. 10B shows the assembled high-density FAU of FIG. 10A.

FIG. 10A shows the fibers 10, which in an example extracted from the fiber ribbon 221 (not shown; see FIG. 9). Each of the fibers 10 has the aforementioned end section 16 with an end face 17 (see also FIG. 1). The end section 16 is shown stripped of the protective coating 14 to expose the glass section 12. The grooves 380 of the front-end section 361 of the support substrate 360 are sized to accommodate the bare glass end sections 16 of the fibers 10 while the back-end section 363 accommodates the coated sections 14 of the fibers. Once the end sections 16 of the fibers 10 are supported in the grooves 380, then a bonding agent (e.g. epoxy) 390 can be applied to the fibers at the back-end section 363, as shown in FIG. 10B. A cover 400 having a front end 402, a back end 404, a top surface 412, and a bottom surface 414 is then placed over the top of the array 380 of the grooves 382 to secure the end sections 16 of the fibers 10 in the front-end section 361 of the support substrate 360. The cover 400 is held in place by the adhesive 390 contacting the back end 404 of the cover. The bonding agent 390 can also be added to the grooves 380. In an example, the cover 400 is made of glass, such as silica glass.

FIG. 10B shows the resulting FAU 353, with the end faces 17 of the fibers 10 residing substantially at the front end 362 of the support substrate 260. The FAU 353 supports the fibers 10 at a pitch P2 at the end face 352.

Figure 10C:
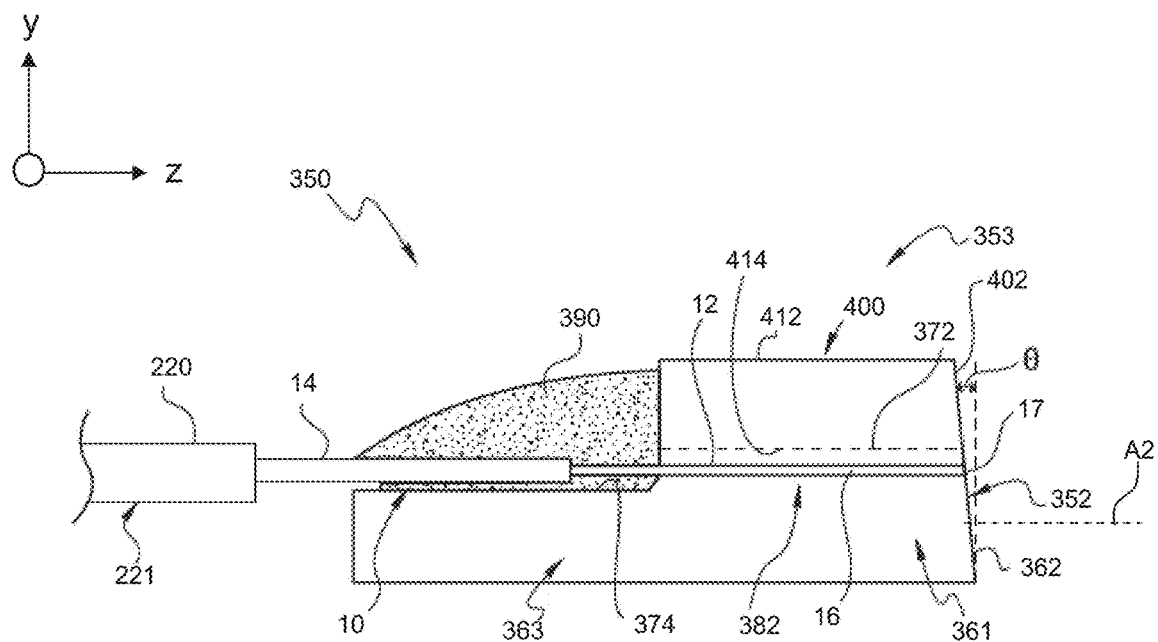
FIG. 10C is a cross-sectional view of the assembled high-density FAU of FIG. 10B.

FIG. 10C is y-z cross-sectional view of the second end 214 of the ribbon 221 or ribbon cable 210 showing the FAU 353 and one of the fibers 10 supported therein. In an example, the front end 362 of the support substrate 360, the front end 402 of the cover and the end face 17 of the fiber are angled by an angle θ up to about 8 degrees relative to the x-y plane (i.e., the vertical plane VP) to reduce reflection losses.

Figure 10D:
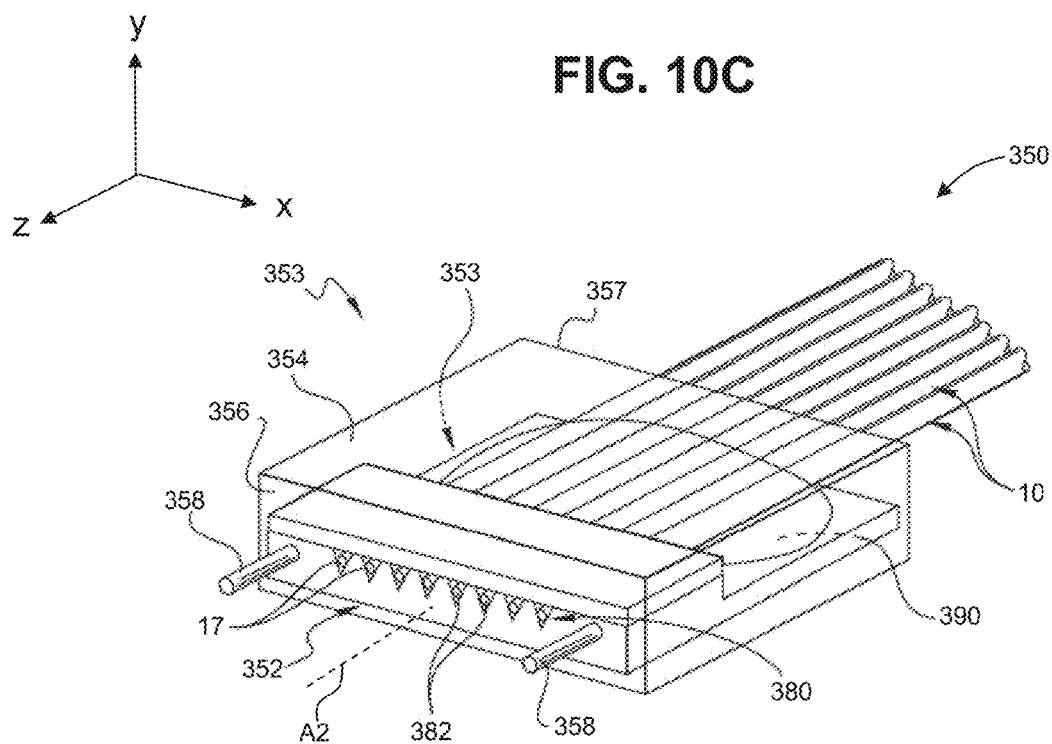
FIG. 10D is similar to FIG. 10C and shows the high-density FAU in combination with a connector housing to form a high-density optical interface device (optical connector).

FIG. 10D is similar to FIG. 10B and illustrates an example high-density second connector 350 formed by at least partially enclosing the support substrate 360 and cover 400 of the FAU 353 within a connector housing 354 having a front end 356 and aback end 357. In an example, the FAU 353 at least one alignment feature 358, which is shown by way of example as alignment pins that extend from the front end 356 of the connector housing to define a plug connector configuration. The alignment features 358 could also be alignment holes for receiving alignment pins, thereby defining a receptacle connector configuration.

In an example, the front end 362 of the support substrate 360 resides at or proximate to the front end 356 of the connector housing 354 while the fibers 10 extend from the back end 357 of the connector housing 354. In another example, the front end 362 of the support substrate 360 can extend from the front end 356 of the connector housing 354.

Figure 11A:
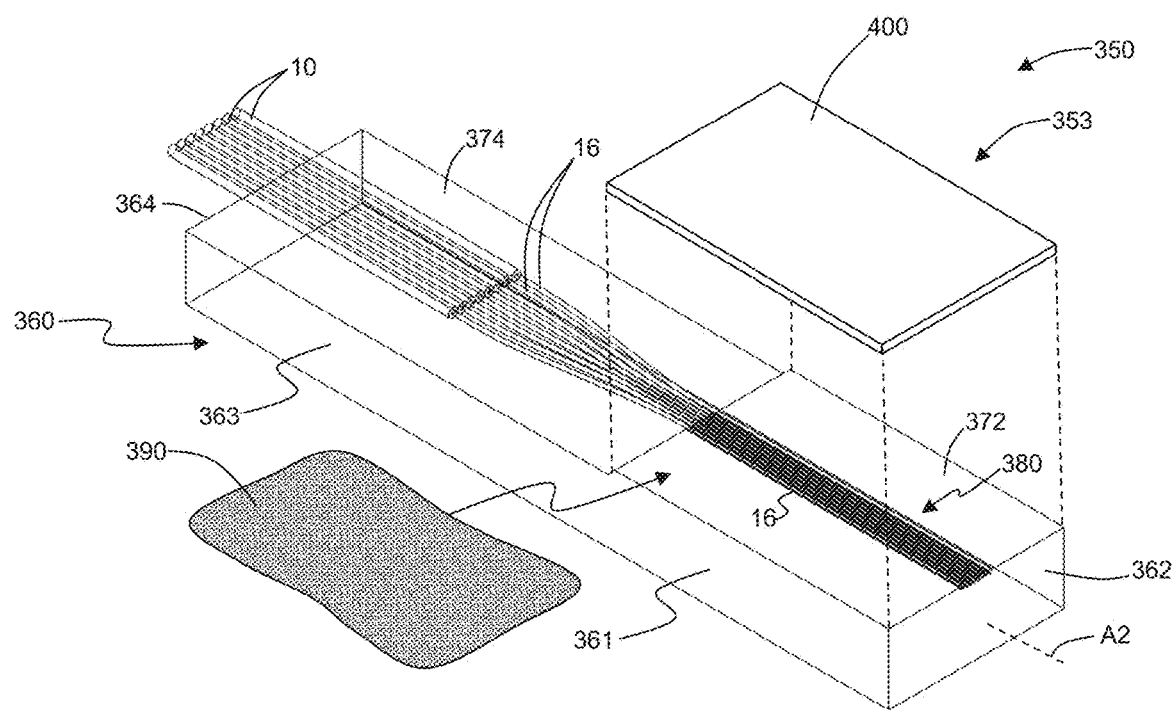
FIG. 11A is perspective and partially exploded view of another example of a high-density FAU illustrating an example fan-in configuration of the fibers.
Figure 11B:
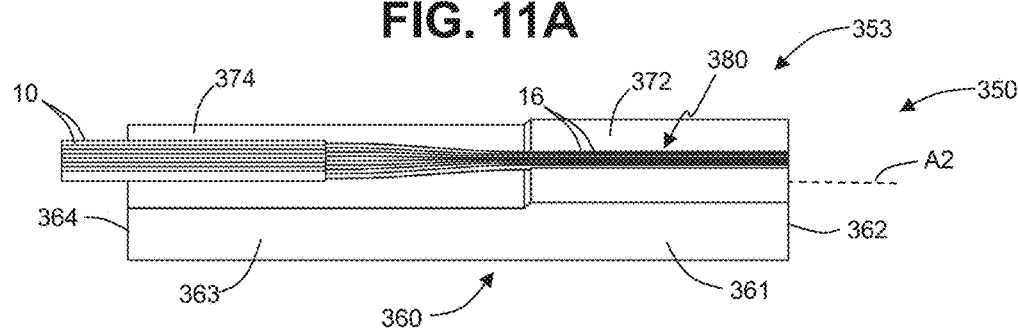
FIG. 11B is another perspective view of the high-density FAU of FIG. 11A but without the cover.
Figure 11C:
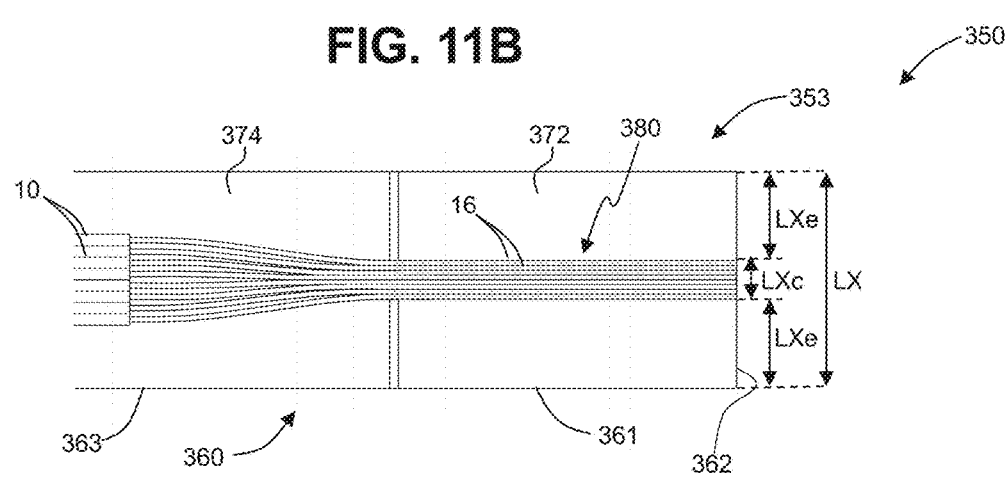
FIG. 11C is a top view of the fanned-in fibers on the support substrate of the high-density FAU.
Figure 12A:
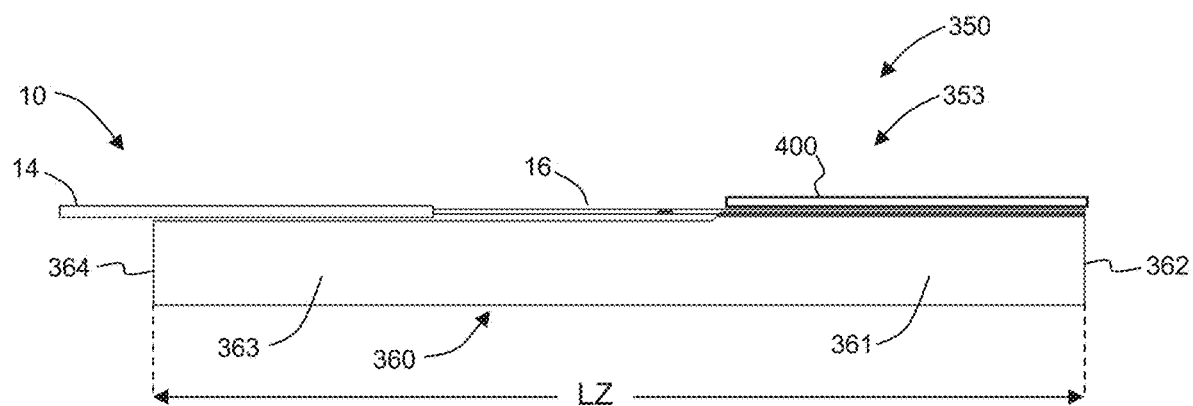
FIG. 12A is a side view of the high-density FAU of FIG. 11A.
Figure 12B:
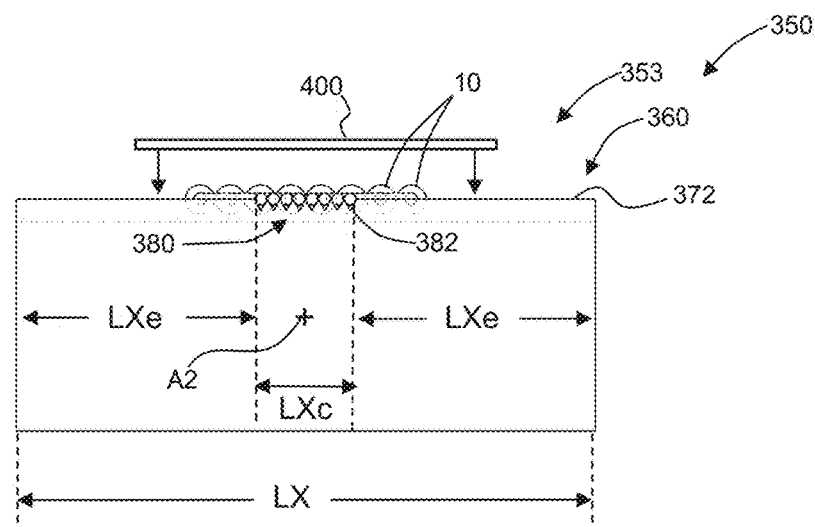
FIG. 12B is a front-end view of the high-density FAU of FIG. 11A.

FIG. 11A is an elevated and partially exploded view of an example configuration of the FAU 353 as disclosed herein. FIG. 11B is another elevated view of the FAU 353 without the cover 400. FIG. 11C is a top-down view of the FAU 353 without the cover 400. FIG. 12A is a side view of the FAU 353, while FIG. 12B is a front-end view of the FAU.

The support substrate 360 is has dimensions LX, LXe, LXc, LY and LZ as shown. LZ is an axial length, LX is a width and LY is a height, while LXe is an "edge distance" (from the side of the support substrate to the nearest groove) and LXc is a center length, i.e., a length of the grooved section along the front end 362 of the support substrate. Example values for these dimensions include LX=2.5 mm, LXe=1.06 mm, LXc=0.4 mm, LY=1.25 mm and LZ=6 mm. In an example, each of the dimensions can be in a range of +/−25% of the given value or +/−20% of the given value or +/−10% of the given value. In an example, the axial length of the front section 361 in the z-direction is smaller than that of the back section 363 (e.g., about ⅓ the size). In an example, LZ is in the range from 4 mm to 8 mm, LX is in the range from 2 mm to 4 mm, and LY is in the range from 1 mm to 4 mm. In an example, LXc can be in the range from 0.3 mm to 1 mm.

Figure 12C:
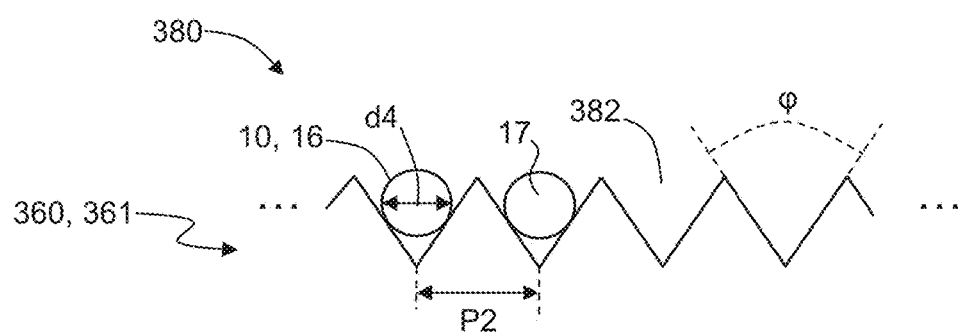
FIG. 12C is a close-up view of the grooves of the support substrate of the high-density FAU of FIG. 11A illustrating an example groove configuration.

With reference to FIG. 12C, an example value for the pitch P2 is 0.055 mm for fibers 10 having a diameter d4=0.05 mm (50 microns). Generally, the pitch P2≥d4=$2r_4$, where d4 is the diameter of the glass portion 12 of each fiber 10 and $r_4$ is the radius of the glass portion. An example groove angle φ is about 60°, though other groove angles Y can be effectively employed as well.

The example configuration of the FAU 353 of FIGS. 11A-11C and 12A-12C shows a "fan-in" configuration wherein the glass end sections 16 of the fibers 10 start out spaced apart at the back-end section 363 and converge so that they are substantially side-by-side at the front-end section 361 supported by the V-grooves 82 therein. This fan-in configuration can provide the minimum value for the pitch P2, namely P2=d4.

Figure 13A:
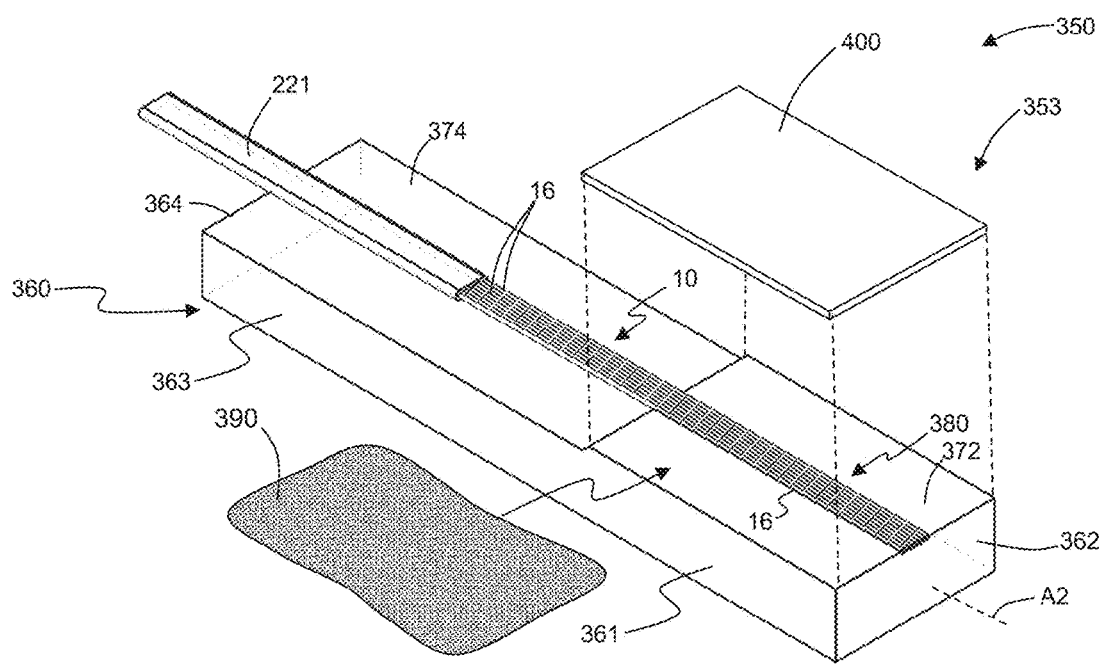
FIG. 13A is perspective, partially exploded view of an example high-density FAU similar to that of FIG. 11A wherein the fibers run substantially straight into the substrate grooves of the front-end section.
Figure 13B:
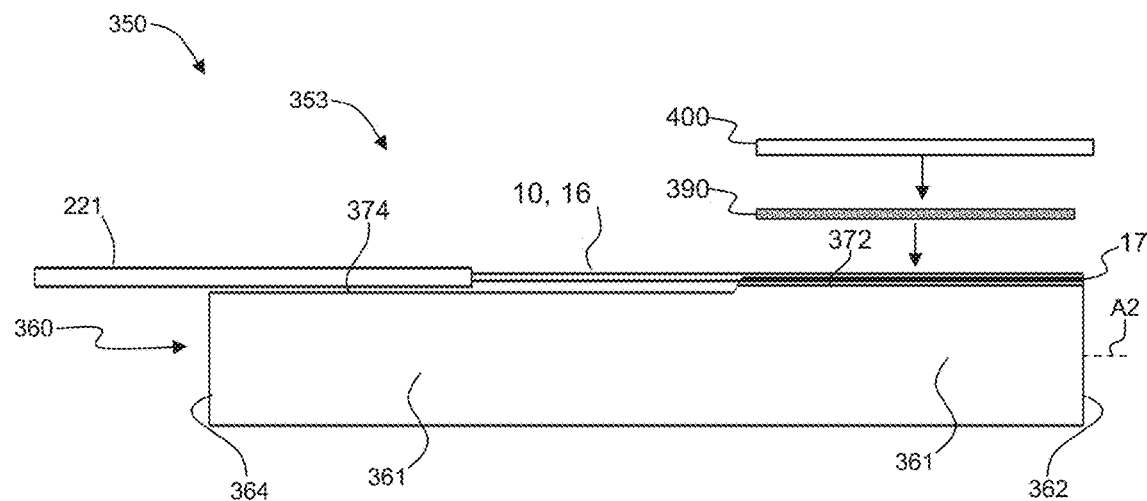
FIG. 13B is a side partially exploded view of the example high-density FAU of FIG. 13A
Figure 14A:
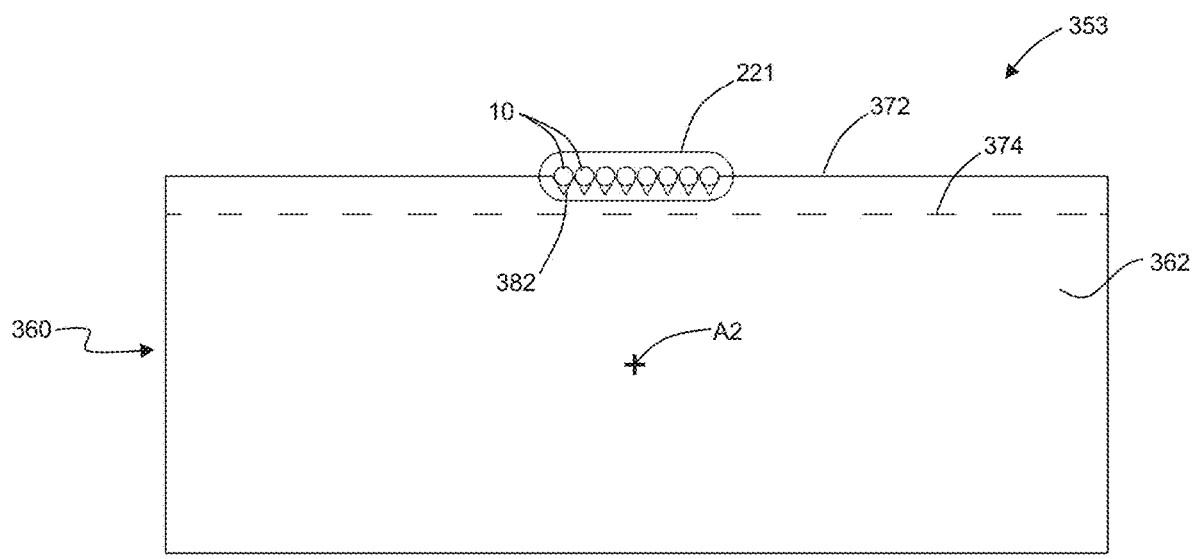
FIG. 14A is an end-on view of the high-density FAU of FIG. 13A, with the cover omitted for ease of illustration.
Figure 14B:
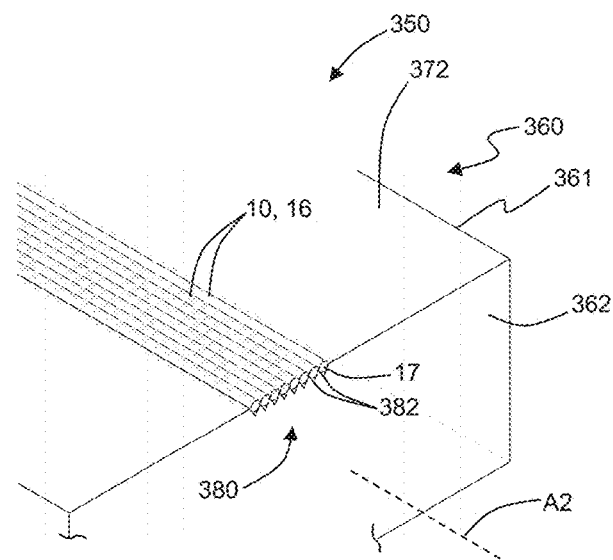
FIG. 14B is a close-up perspective view of the end portion of the high-density FAU of FIG. 13A.

FIGS. 13A and 13B are similar to FIGS. 11A and 12A and illustrate another configuration for the FAU 353 wherein the bare fiber sections 12 of the fibers 10 run substantially straight into the grooves 382 of the front section 361 from the fiber ribbon 221, which is supported on the back-end section 362. FIG. 14A is front-end view of the FAU 353 without the cover and FIG. 14B is a close-up elevated view of the front end of the FAU of FIG. 14A. Note that the fiber pitch P2=d4.

Example FAUs with Interleaved Fibers

Figure 15A:
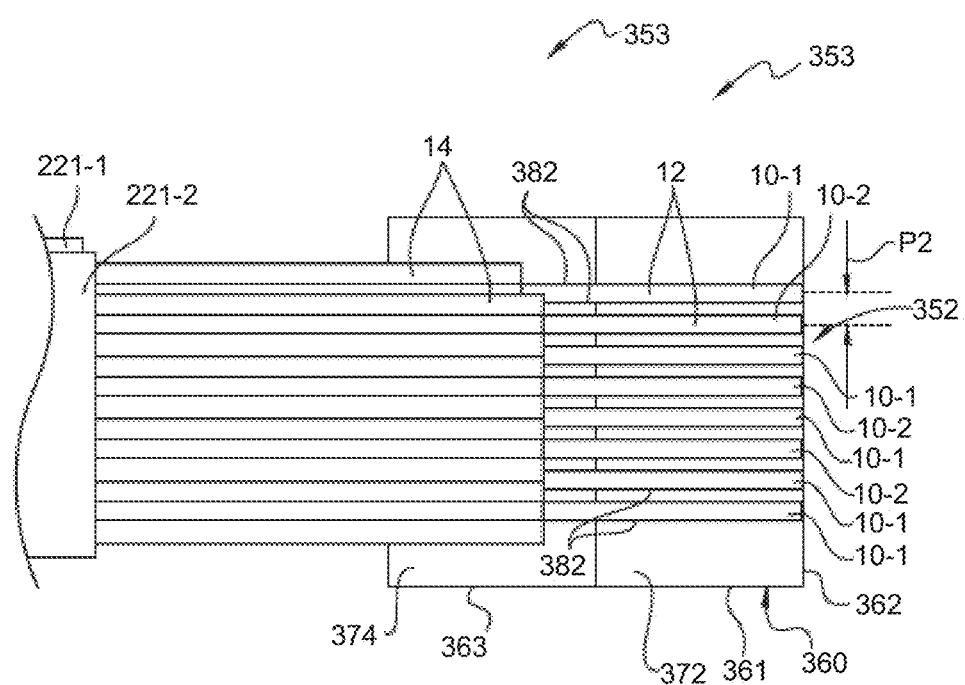
FIG. 15A is a top view of an example high-density interconnect that illustrates an example of how the fibers from two different ribbons can be interleaved and supported within the high-density connector assembly.

FIG. 15A is a top-down view that illustrates an example embodiment of how two sets of fibers 10 (denoted 10-1 and 10-2) of respective first and second ribbons 221-1 and 221-2 can be interleaved when forming the FAU 353. As part of the interleaving process in this example and the examples below, when starting with two fiber ribbons 221-1 and 222-2, the outer jacket 220 and coating sections 14 of the fibers 10 are removed from the end section 16 of each of the fibers 10-1 and 10-2 to expose the respective glass sections 12. This process can be performed using commercially available mechanical or thermal strippers.

Figure 15B:
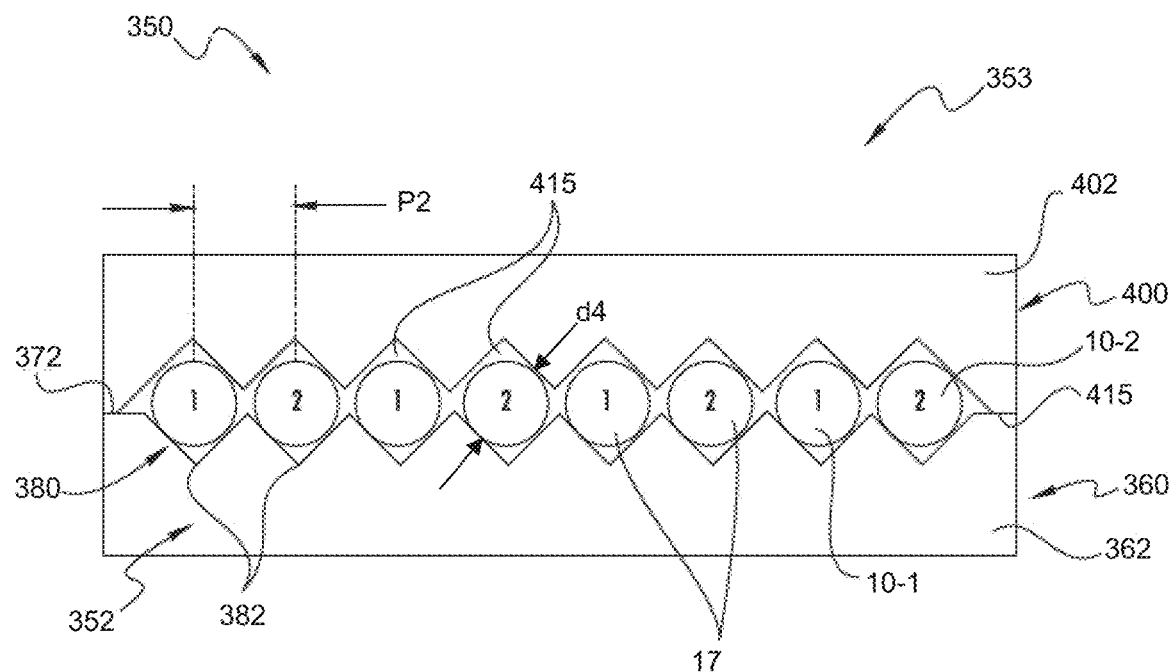
FIG. 15B is an end-on view of the example high-density interconnect showing the interleaved fibers and also showing an example where the cover plate includes grooves.

Continuing with the present example, the glass sections 12 of the fibers 10-1 and 10-2 are interleaved in the grooves 382 of the support substrate 360 to define the high-density second connector 350 introduced in FIG. 9. FIG. 15B is a close-up end-on view of the second connector 350 and FAU 353. In the example shown, the glass sections 12 of the interleaved fibers 10-1 and 10-2 are supported by the support substrate 360 at "½ pitch" P2, i.e., wherein the glass sections 12 have a center-to-center spacing that is approximately one-half of the pitch of ribbons 221-1 and 221-2 or ribbon cables 210-1 and 210-2. The cover 400 is shown by way of example as having grooves 415 in the bottom surface 414 and sized to engage the end sections 16 of the Fibers 10. The interleaved (interdigitated) fibers 10-1 and 10-2 are denoted as "1" and "2" respectively in the end-on view for ease of illustration. Using this same approach, the fibers 10 of three or more fiber ribbons 221 can be interleaved to form example FAUs 353 and high-density second connectors 350.

Figure 15C:
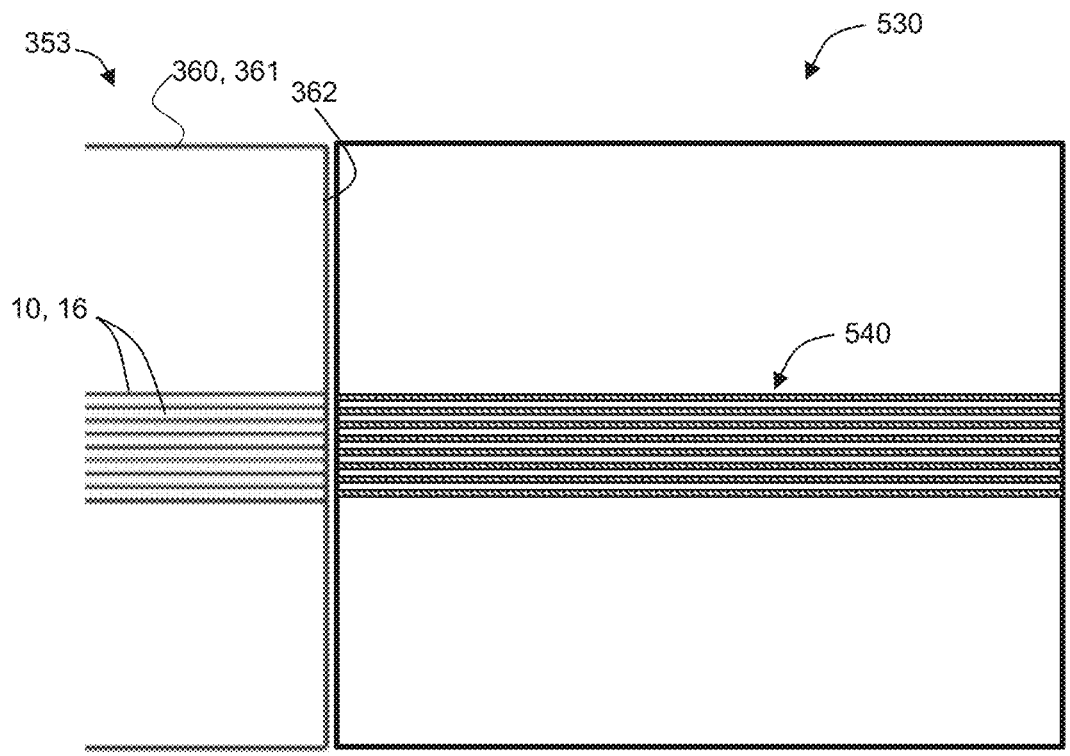
FIG. 15C is a top view of an end-portion of an example high-density FAU shown operably arranged relative to a photonic device in the form of a planar lightwave circuit (PLC) that includes optical waveguides.

FIG. 15C is a top-down view of the front-end portion of the FAU 353 as operably disposed adjacent a photonic device 510 that supports an array of optical waveguides 540 having the same pitch P2 as the fibers 10 of the FAU. This illustrates an example configuration for performing high-density end-to-end optical coupling between the fibers 10 disclosed herein and optical waveguides 540 of a photonic device.

Optical Data Transmission System

Figure 16A:
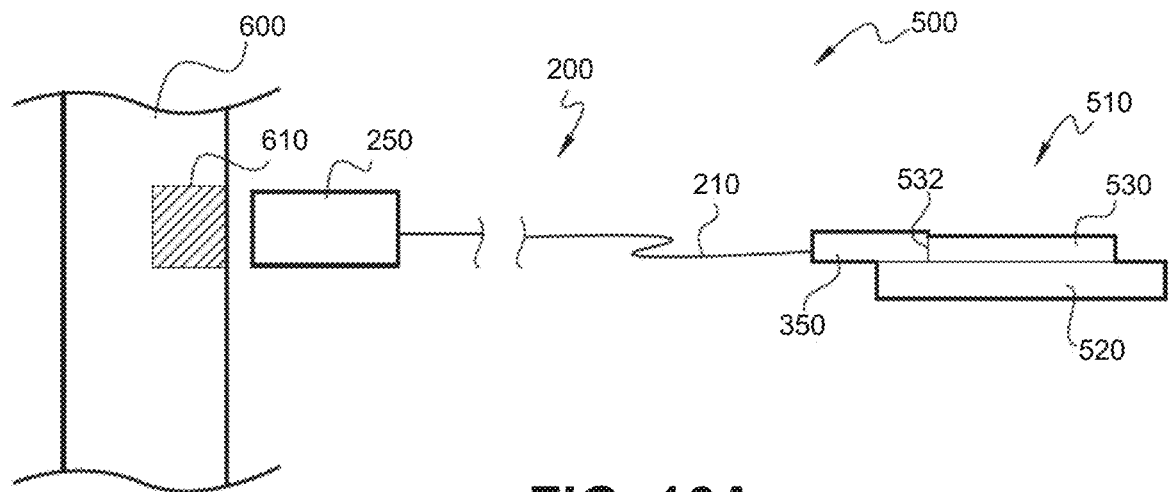
FIG. 16A is a schematic diagram of an example optical data transmission system that employs the ribbon interconnect disclosed herein.

FIG. 16A is a schematic diagram of an optical data transmission system 500. The optical data transmission system 500 comprises a photonic device 510, a telecommunications device 600 having a connector receptacle 610, and the ribbon cable interconnect 200 as disclosed herein.

Figure 16B:
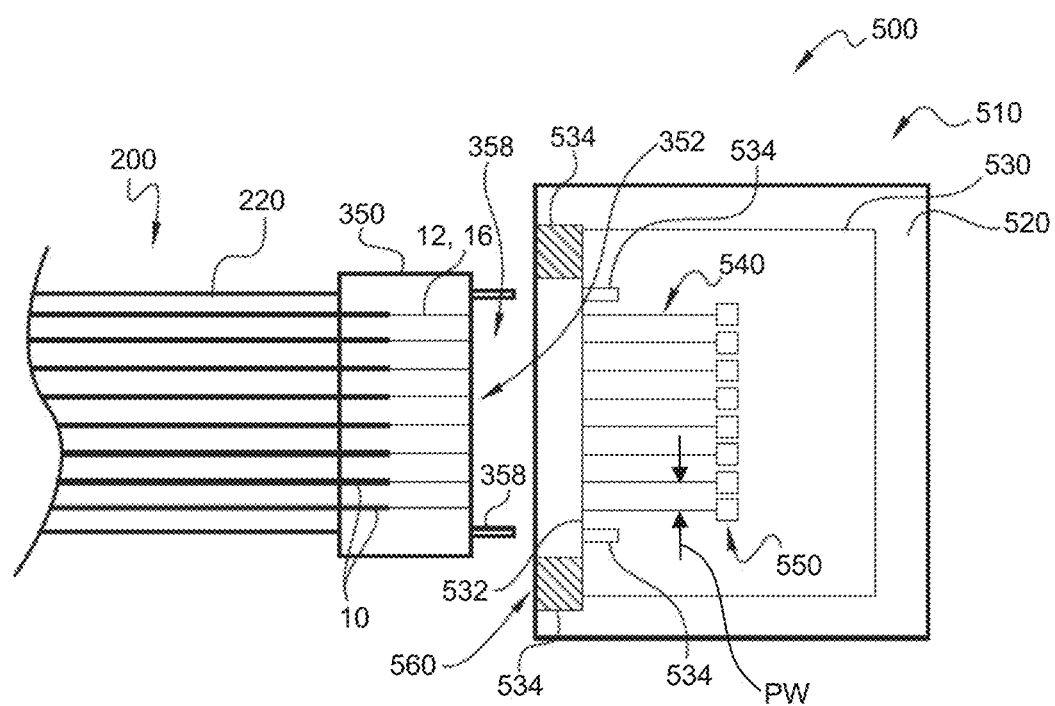
FIG. 16B is a close-up top view of an example photonic device and photonic chip having optical waveguides and active photonic elements.

FIG. 16B is a top-down view of an example photonic device 510. The example photonic device 510 includes a circuit board 520 having a top surface 522 and that operably supports a photonic chip 530, e.g., silicon-photonic chip. The photonic chip 530 operably supports an array of optical waveguides 540. As used herein, the term "photonic chip" means any component having optical waveguides 540. An example photonic chip can include a planar lightwave circuit (PLC). The photonic device 510 may further include additional drive circuitry (not shown) to control active optical components to effectuate the conversion of optical signals into electrical signals and vice-versa.

The photonic chip 530 may be fabricated from any material capable of having optical waveguides 540 disposed thereon or therein. As non-limiting examples, the photonic chip 530 may be fabricated from a glass-based material (e.g., glass, glass-ceramic, and fused silica) or a semiconductor material (e.g., silicon). The optical waveguides 540 may be configured as any known or yet-to-be-developed optical waveguides. Non-limiting example optical waveguides 540 include thin-film deposition, photolithographic masking and etching processes, laser written waveguides, ion-exchanged waveguides, channel waveguides, among others. It should be understood that the optical waveguides 540 may be suitably configured for the operations of the photonic chip 530 and are merely schematically depicted in a straight-line configuration.

FIG. 16B also shows the FAU-based second connector 350 at the second end of the ribbon interconnect 200 in position to operably engage the photonic device 510. The photonic chip 530 has a front end 532 at which the optical waveguides 540 can terminate. Eight optical waveguides 540 are shown by way of example. The optical waveguides 540 are shown by way of example as operably connected to respective active photonic elements 550, which in an example can comprise optical transceivers, optical light sources (e.g., a vertical-cavity surface-emitting lasers or VCSELs) or optical detectors. In an example, the photonic chip 530 is configured to generate and/or receive optical data signals using the active photonic elements 550 and the optical waveguides 540. In an example, the photonic chip 530 can comprise a first sub-chip (e.g., a PLC) that includes the optical waveguides 540 and a second sub-chip that includes the active photonic elements 550.

Figure 16C:
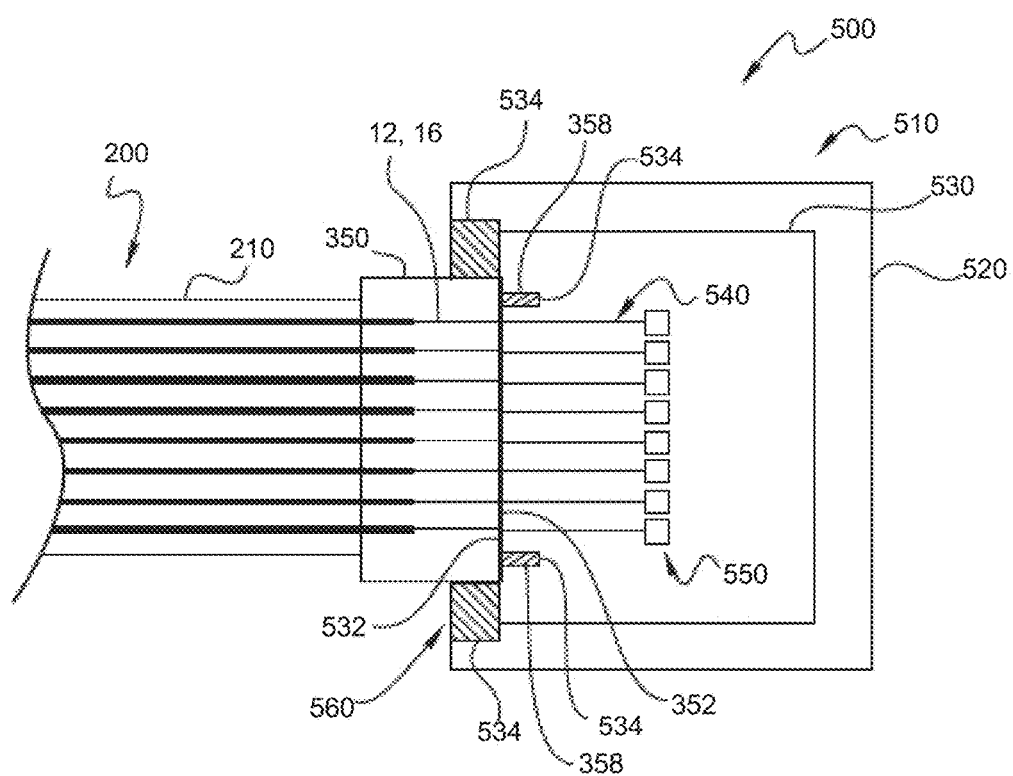
FIG. 16C is similar to FIG. 16B and shows the high-density connector assembly of the ribbon interconnect operably coupled to the photonic device so that the fibers are in optical communication with the optical waveguides.

The front-end 532 of the photonic chip 530 can include one or more alignment features 534, which are shown by way of example as alignment holes. Also shown in FIG. 16B is the second connector 350 having one or more alignment features 358 that are complementary to the one or more alignment features 534 of the photonic device 510. The example alignment features 534 are shown in the form of alignment pins sized and configured to closely engage the alignment holes 534 when the second connector 350 is operably engaged with the photonic device 530, as shown in FIG. 16C. The photonic device 510 is shown as having additional alignment features 534 that help guide the second connector into position relative to the photonic chip 530.

The front end 532 of the photonic chip 530 and the alignment features 534 can comprise an optical connector 560 configured to receive the second connector 350 and that allows mating and de-mating of the second connector with the photonic device 510 to establish optical communication between the photonic chip 530 and the ribbon interconnect 200. The optical connector 560 can be configured as receptacle connector (as shown) or as a plug connector.

The optical waveguides 540 have a pitch PW that matches the pitch P2 of the fibers 10 of the second connector 350 (see FIG. 16B) so that when the second connector is operably engaged with the photonic device 510 (e.g., via the optical connector 560), the fibers are in optical communication with respective optical waveguides 540. The optical waveguides 540 have a high waveguide density, i.e., greater than that associated with standard connectors used in standard optical fiber cables because they need to match the high density of the fibers 10 of the FAU 353 of the second connector 350.

With reference again to FIG. 16A, at the other end of the ribbon interconnect 200, the first connector 250 is operably engaged with the connector receptacle 610 of the telecommunications device 600. The telecommunications device 600 can be a wide variety of standard telecommunication devices known in the art, such as a server, a fiber optic cable, an electronics panel in a data center, etc. The first connector has the aforementioned standard fiber density associated with industry standard telecommunication systems.

Figure 16D:
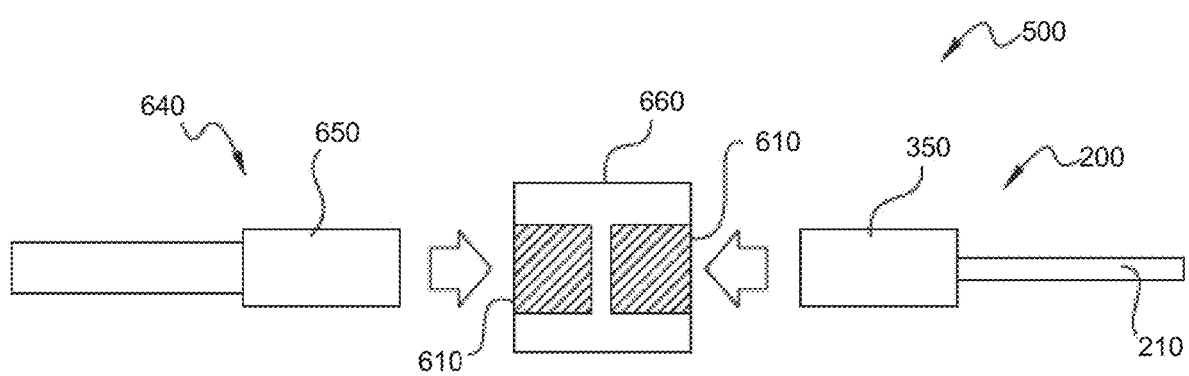
FIG. 16D shows an example of how the standard connector of the ribbon interconnect can be used to optically connect the fibers of the ribbon interconnect to optical fibers of a standard optical fiber cable by using an adapter that includes connector receptacles for standard connectors.

With reference now to FIG. 16D, in the example where the telecommunications device 600 is a fiber optic cable 640 terminated by a connector 650, the connector receptacle can be defined by a connector adapter 660 used to operably connect optical fiber cables as is known in the art. Thus, in an example, the ribbon interconnect 200 disclosed herein can be used to optically connect a photonic device having a high waveguide density to a remote telecommunications device having a standard fiber density, such as those associated with conventional MPO connectors.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:
1. A fiber array unit (FAU), comprising:
a) a support substrate having a substrate central axis, a first-end section with a first end and a substantially planar first surface, and a second-end section with a second end and a substantially planar second surface that is substantially parallel to the substantially planar first surface, wherein at least a portion of the substantially planar first surface includes substantially parallel grooves that run substantially in the direction of the substrate central axis;
b) a plurality of optical fibers supported by the support substrate, with each optical fiber having a glass end section with a diameter d4 and residing within one of the grooves of the substantially planar first surface to define a fiber pitch P2≥d4 at the front end of the front-end section;
c) a cover disposed on the first-end section and the glass end sections of the optical fibers; and
d) a bonding agent bonding the plurality of the optical fibers and the cover to the support substrate;
wherein each of the optical fibers comprises:
i) a core having an outer radius $r_1$;
ii) a cladding surrounding said core and having an outer radius $r_4$, wherein $r_4$ is less than 45 microns and wherein $d4=2r_4$;
iii) a primary coating surrounding said cladding and having an outer radius $r_5$ and a thickness tP>10 microns, an in situ modulus $E_P$, wherein $E_P$≤0.35 MPa, and a spring constant $\chi_P$≤1.6 MPa, where $\chi_P=2E_P\cdot r_4/tP$; and
iv) a secondary coating surrounding said primary coating and having an outer radius $r_6$ and a thickness $tS=r_6-r_5$, and an in situ modulus of 1200 MPa or greater, wherein tS>10 microns and said outer radius $r_6$≤85 microns;
v) a mode field diameter MFD greater than 8.2 microns at 1310 nm;
vi) a fiber cutoff wavelength of less than 1310 nm; and
vii) a bend loss, when wrapped around a mandrel having a diameter of 10 mm, of less than 1.0 dB/turn at a wavelength of 1550 nm.

2. The FAU according to claim 1, wherein tS>12 microns.

3. The FAU according to claim 1, wherein 24 microns ≤$r_4$≤45 microns.

4. The FAU according to claim 1, wherein 38 microns ≤$r_4$≤42 microns.

5. The FAU according to claim 1, wherein 30 microns ≤$r_4$≤35 microns.

6. The FAU according to claim 3, wherein $r_6$≤75 microns.

7. The FAU according to claim 3, wherein 75 microns ≤$r_6$≤85 microns.

8. The FAU according to claim 3, wherein 60 microns ≤$r_6$≤65 microns.

9. The FAU according to claim 1, wherein $\chi_P$≤1.3 MPa.

10. The FAU according to claim 1, wherein $\chi_P$≤1.0 MPa.

11. The FAU according to claim 1, wherein 0.5≤tP/tS≤1.5.

12. The FAU according to claim 1, wherein MFD is greater than 8.6 microns at 1310 nm.

13. The FAU according to claim 1, wherein said cladding includes a first inner cladding region having an outer radius $r_2$ and a relative refractive index $\Delta_2$, and a second inner cladding region surrounding said first inner cladding region and having an outer radius $r_3$, said second inner cladding region having a relative refractive index $\Delta_3$ with a minimum value $\Delta_{3MIN}$, wherein $\Delta_{3MIN}$<−0.2%.

14. The FAU according to claim 13, wherein said first inner cladding region is directly adjacent to said core and said relative refractive index $\Delta_2$ is substantially constant between said inner radius $r_1$ and said outer radius $r_2$.

15. The FAU according to claim 13, wherein −0.05≤$\Delta_2$≤0.5.

16. The FAU according to claim 1, wherein said fiber exhibits a bend loss, when turned about a mandrel having a diameter of 10 mm, of less than 0.5 dB/turn at a wavelength of 1550 nm.

17. The FAU according to claim 1, wherein said primary coating has an in situ elastic modulus of 0.3 MPa or less.

18. The FAU according to claim 1, wherein said secondary coating has an in situ elastic modulus of 1800 MPa or greater.

19. The FAU according to claim 1, wherein at least one of the substrate and the cover is made of glass.

20. The FAU according to claim 1, wherein the grooves comprise V-grooves.

21. The FAU according to claim 1, wherein the substantially planar first surface of the first-end section is elevated relative to the substantially planar second surface of the second-end section.

22. The FAU according to claim 1, further comprising a connector housing that at least partially encloses the support substrate and cover.

23. The FAU according to claim 1, further comprising an alignment feature at the first end of the first-end section.

24. The FAU according to claim 1, wherein the optical fibers have a fan-in configuration at the back-end section of the support substrate.

25. The FAU according to claim 1, wherein the optical fibers extend from a fiber ribbon.

26. The FAU according to claim 1, wherein the optical fibers extend from two or more fiber ribbons and wherein the optical fibers from the two or more fiber ribbons are interleaved at the front-end section of the support substrate.

* * * * *